United States Patent
Guan et al.

(10) Patent No.: US 11,533,067 B1
(45) Date of Patent: Dec. 20, 2022

(54) SELF-CONTAINED IN-PHASE AND QUADRATURE (IQ) IMAGE REJECTION CALIBRATION ON HETERODYNE TRANSCEIVERS IN MILLIMETER-WAVE PHASE ARRAY SYSTEM

(71) Applicant: Jariet Technologies, Inc., Redondo Beach, CA (US)

(72) Inventors: Claire Huinan Guan, Irvine, CA (US); Craig A. Hornbuckle, Rolling Hills Estates, CA (US)

(73) Assignee: JARIET TECHNOLOGIES, INC., Redondo Beach, CA (US)

( * ) Notice: Subject to any disclaimer, the term of this patent is extended or adjusted under 35 U.S.C. 154(b) by 0 days.

(21) Appl. No.: 17/396,500

(22) Filed: Aug. 6, 2021

(51) Int. Cl.
*H04B 1/00* (2006.01)
*H04B 1/16* (2006.01)
*H04B 17/21* (2015.01)
*H04B 17/11* (2015.01)
*H04B 1/04* (2006.01)

(52) U.S. Cl.
CPC ......... *H04B 1/0014* (2013.01); *H04B 1/0483* (2013.01); *H04B 1/1607* (2013.01); *H04B 17/11* (2015.01); *H04B 17/21* (2015.01)

(58) Field of Classification Search
CPC .... H04B 17/101; H04B 1/0475; H04B 17/21; H04B 17/14; H04B 1/0458; H04B 17/11; H04B 17/12; H04B 17/13; H04B 17/00; H04B 15/00; H04B 1/62; H04B 1/0014; H04B 1/0483; H04B 1/1607
See application file for complete search history.

(56) References Cited

U.S. PATENT DOCUMENTS

| | | | |
|---|---|---|---|
| 6,717,981 B1* | 4/2004 | Mohindra | H04B 1/0475 455/69 |
| 7,944,984 B1* | 5/2011 | Wu | H04L 27/364 375/261 |
| 8,135,055 B2 | 3/2012 | Kohlmann | |
| 8,559,488 B1* | 10/2013 | Smaini | H04B 1/40 375/259 |
| 8,957,800 B2 | 2/2015 | Lee et al. | |
| 2004/0203472 A1* | 10/2004 | Chien | H04L 27/0014 455/67.11 |
| 2006/0009171 A1* | 1/2006 | Xu | H04B 1/0475 455/114.2 |

(Continued)

*Primary Examiner* — Khanh C Tran
(74) *Attorney, Agent, or Firm* — Morgan, Lewis & Bockius LLP

(57) ABSTRACT

A millimeter-wave phase array system may include massive heterodyne transceivers as its building elements. A transceiver of each element may include an IQ image rejection heterodyne transmitter and a receiver. Each transmitter may include a single DAC, a Tx I channel, and a Tx Q channel. Each receiver may include an Rx I channel, an Rx Q channel, and a single ADC. For Tx IQ image rejection calibration, amplitude and phase offsets are determined, using both the Tx I and Tx Q channels from a first element and using only one of the Rx I or Rx Q channel from a second element. The IQ channel imbalances are compensated using the offsets in analog domain. A similar procedure is used for Rx IQ image rejection calibration with alternated signal path enabling. A frequency response variation of an RF front end is detected with a single path Tx/Rx channel setup.

20 Claims, 17 Drawing Sheets

(56) References Cited

U.S. PATENT DOCUMENTS

2006/0133548 A1* 6/2006 Oh .................. H03D 3/009
 375/346
2007/0298733 A1* 12/2007 Cole .................. H04B 17/101
 455/114.2

* cited by examiner

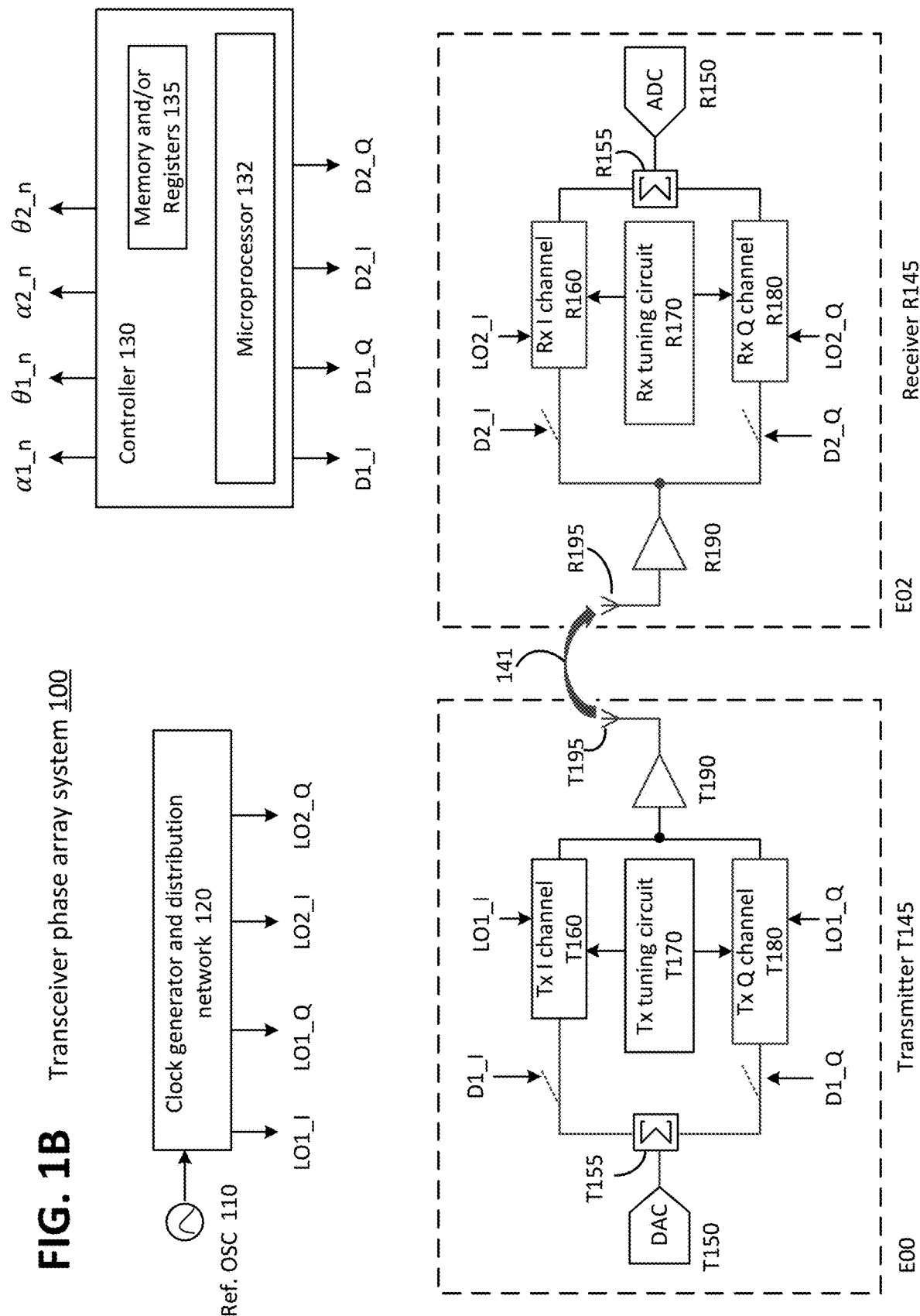
FIG. 1B Transceiver phase array system 100

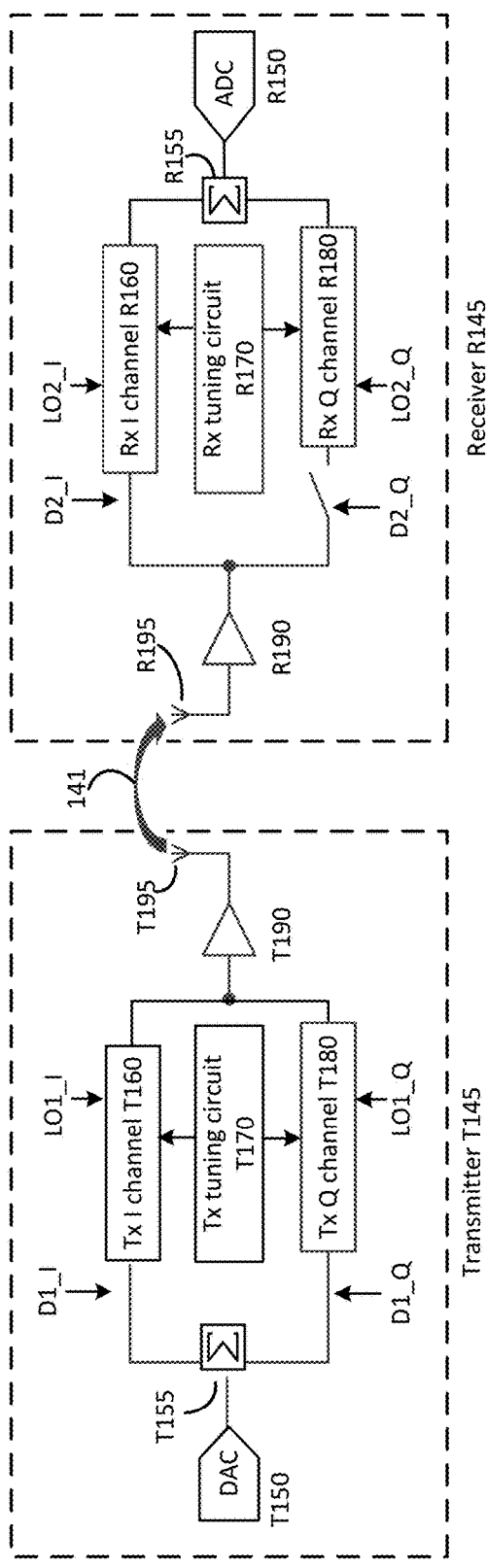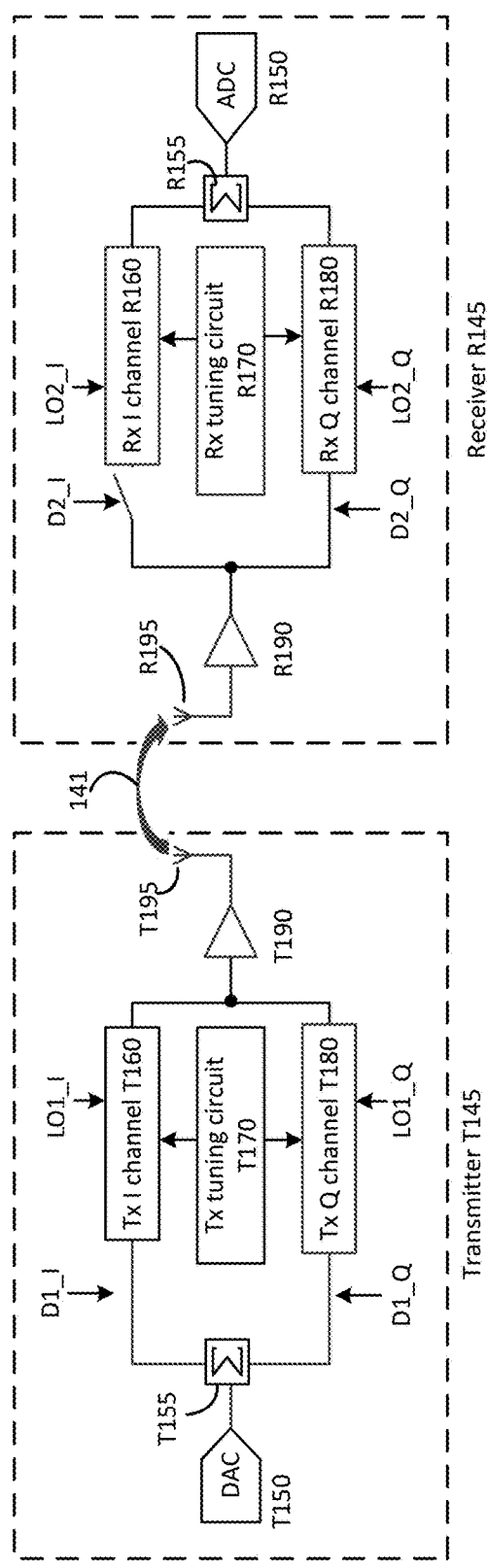

High-side injection:
F.RF_Main = F.TxLO − F.TxIF
F.RF_Img = F.TxLO + F.TxIF

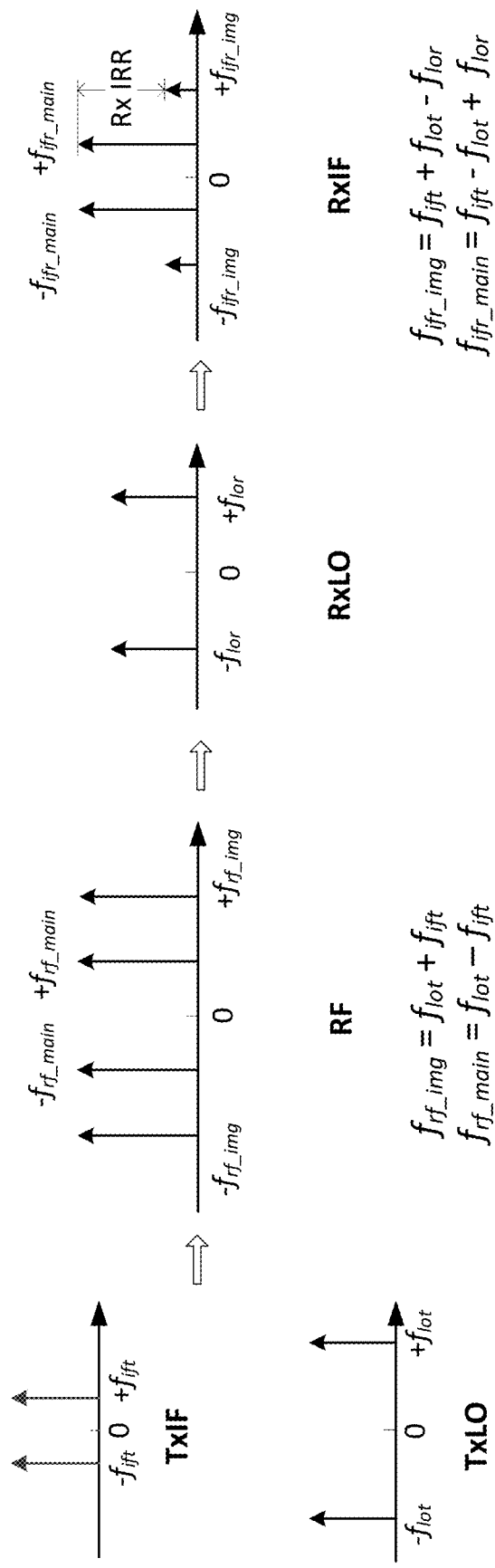

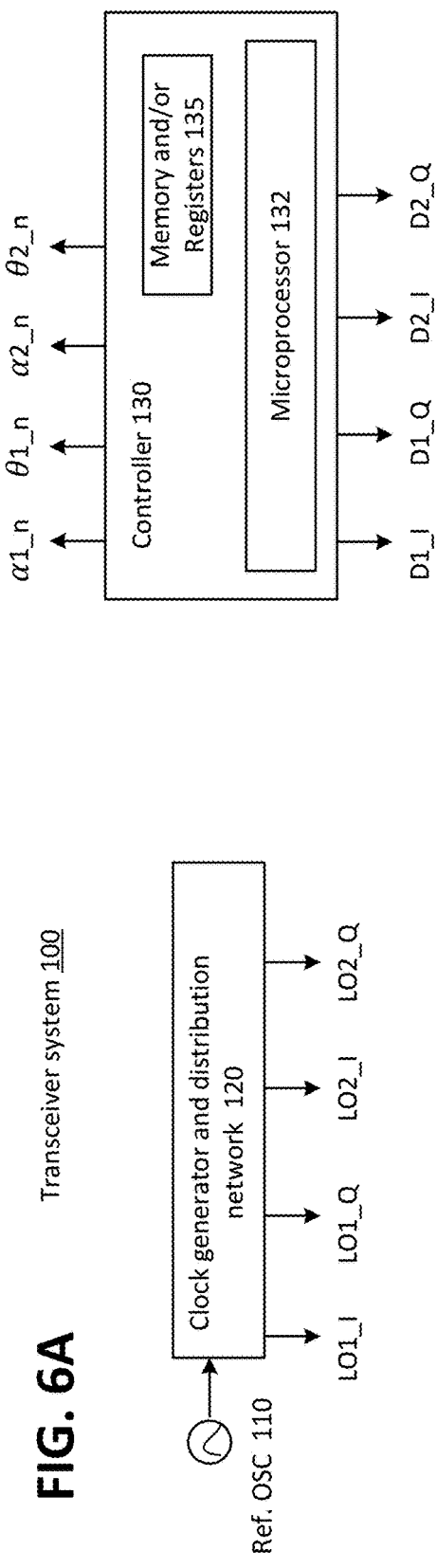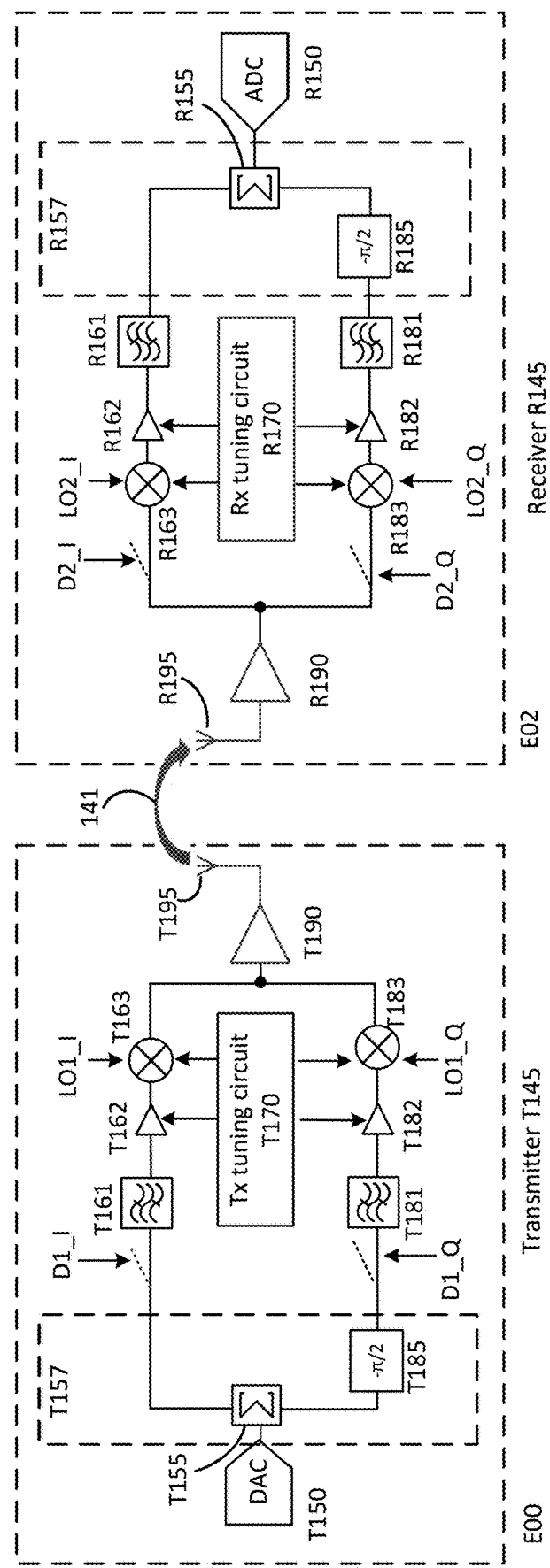
FIG. 6A

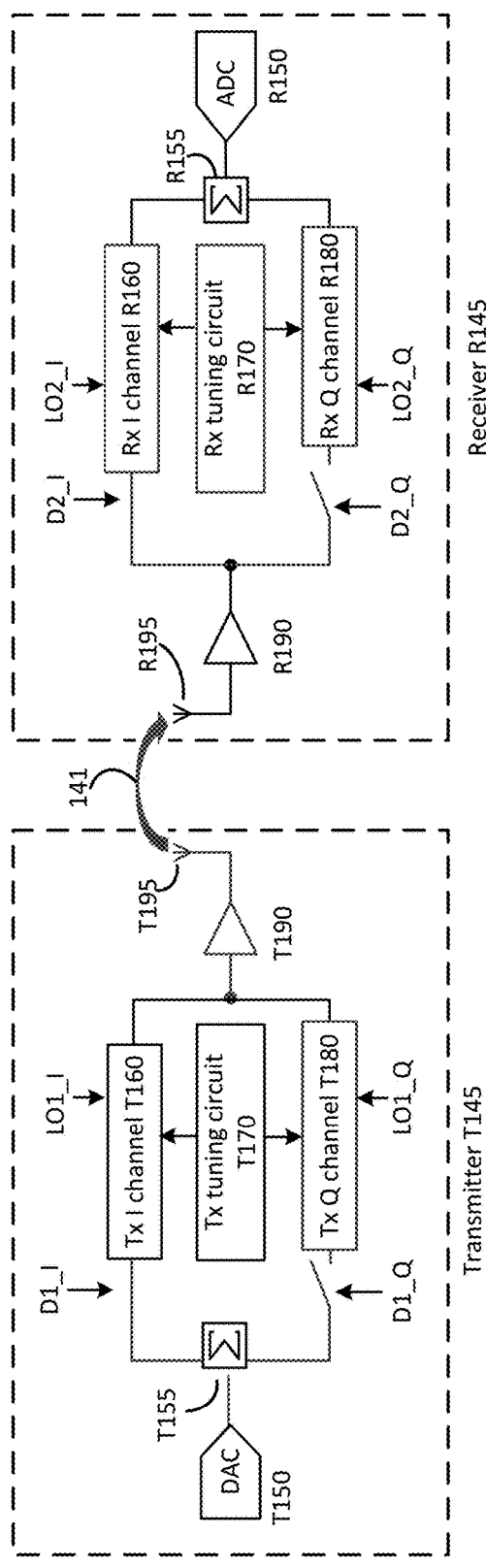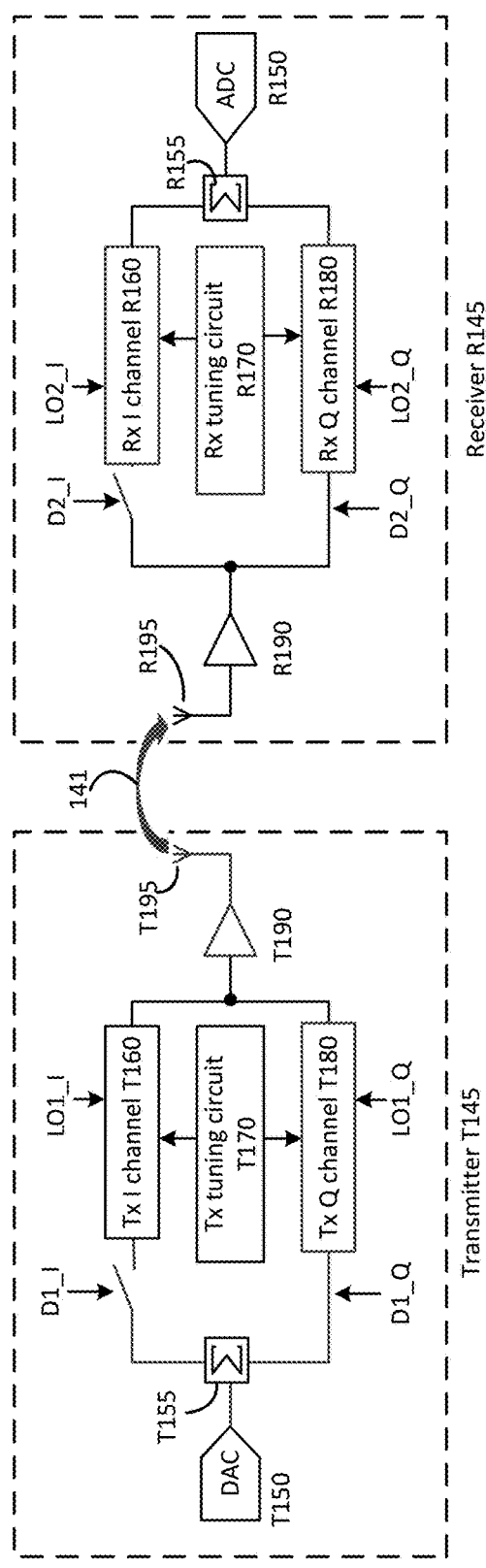
FIG. 9A
FIG. 9B

Providing a calibration signal having an intermediate frequency (R1210)

Generating, using one of the Tx I channel or the Tx Q channel, a Tx output signal based on the calibration signal and a Tx LO frequency (R1220)

Receiving the Tx output signal (R1230)

Generating, using both the Rx I channel and the Rx Q channel, an Rx output signal based on the Tx output signal, an Rx LO frequency, an Rx amplitude offset and an Rx phase offset (R1240)

Determining whether an Rx image rejection ratio is greater than an Rx threshold image rejection ratio (R1250)

When the Rx image rejection ratio is not greater than the Rx threshold image rejection ratio, updating the Rx amplitude offset and the Rx phase offset, and performing the Rx calibration operations (R1260)

FIG. 12B

Determining a Tx amplitude offset and a Tx phase offset for the transmitter of a first one of the plurality of elements, using both the Tx I channel and the Tx Q channel and using one of the Rx I channel or the Rx Q channel, wherein the other one of the Rx I channel or the Rx Q channel is disabled (1291)

wherein the Tx I and the Tx Q channels are within the transmitter of the first one of the plurality of elements,
wherein the Rx I and Rx Q channels are within the receiver of a second one of the plurality of elements,
wherein the second one is different from the first one, and
wherein the Tx amplitude offset and the Tx phase offset are for compensating an imbalance of the Tx I and Tx Q channels of the transmitter of the first one of the plurality of elements (1293)

FIG. 12C

SELF-CONTAINED IN-PHASE AND QUADRATURE (IQ) IMAGE REJECTION CALIBRATION ON HETERODYNE TRANSCEIVERS IN MILLIMETER-WAVE PHASE ARRAY SYSTEM

STATEMENT REGARDING FEDERALLY SPONSORED RESEARCH OR DEVELOPMENT

This invention was made with government support under contract number FA8650-19-C-7992 awarded by the United States Air Force. The government has certain rights in the invention.

TECHNICAL FIELD

The present description relates in general to transceivers, and more particularly to, for example, without limitation, self-contained in-phase and quadrature (IQ) image rejection calibration on heterodyne transceivers in massive millimeter-wave (mm-Wave) phase array systems.

BRIEF DESCRIPTION OF THE DRAWINGS

FIG. 1B illustrates an example of a transceiver phase array system with a transmitter/receiver pair for calibration.

FIGS. 2A, 2B, 2C and 2D illustrate examples of transmitter (Tx) calibration operations and receiver (Rx) calibration operations.

FIGS. 5A, 5B, 5C and 5D are examples illustrating a frequency plan for a receiver calibration mode.

FIGS. 6A and 6B illustrate examples of a transceiver system with a transmitter and a receiver.

FIGS. 9A and 9B illustrate example operations of a transceiver system during a process of determining a frequency response variation of an radio frequency (RF) front end.

FIG. 11 illustrates example iterations of a calibration process.

FIGS. 12A, 12B, and 12C illustrate example calibration operations.

Figure 1A:
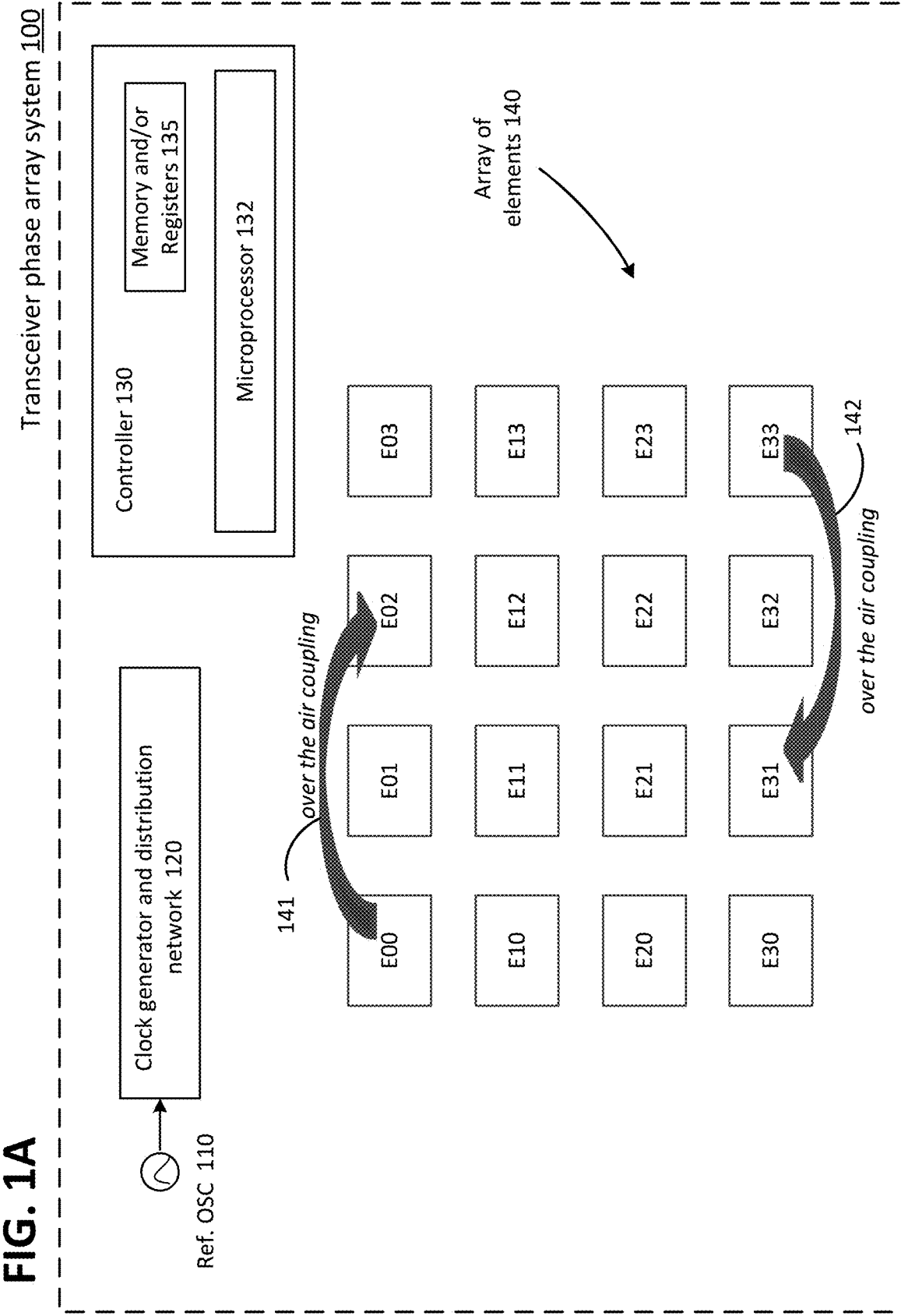
FIG. 1A illustrates an example of a transceiver phase array system.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive. Furthermore, for ease of illustration, the same or similar components are illustrated with the same or similar reference numbers. The descriptions provided with respect to a component with a given reference number in one or more figures may be applicable to a component with the same given reference number shown in one or more other figures unless stated otherwise or other descriptions are provided.

In one or more implementations, a balanced in-phase (I) and quadrature (Q) transceiver is essential to maintain a high fidelity of modulated signals and a reliable frequency translation without introducing extra noise or signal interference from the undesired image band. A millimeter-wave (mm-Wave) communication system demands a massive array implementation to counteract the escalating propagation loss at mm-Wave frequencies. A larger array size provides the higher array gain and wider signal dynamic range, as well as the increased IQ calibration overhead. A low complexity and fully self-contained IQ calibration scheme is thus desirable for the massive transceiver array system. In one or more implementations, a heterodyne transceiver with a single analog-to-digital converter (ADC) and a single digital-to-analog converter (DAC) combines the IQ signals of the transceiver in the analog domain. A high sampling rate ADC/DAC in an X band makes it feasible to choose a high intermediate frequency (IF), which is desirable to accommodate signals with an ultra-wide channel bandwidth (e.g., greater than 1 GHz) in an mm-Wave communication system. A high IF (e.g., a frequency between 1 GHz and 20 GHz) also relaxes the system requirement on the direct current (DC) offset, which can be eliminated with a low Q filtering design. In one or more implementations, the calibration scheme of the subject technology can thus correct the IQ imbalances without correcting any DC offset. However, the real-component only signal (without an image-component) in the digital domain complicates the procedure to decouple the amplitude and phase imbalance in the IQ calibration. In one or more aspects, the dedicated amplitude/phase compensation is essential to the full restoration of the modulated signal integrity. Due to the ultra-wideband operation of the mm-Wave system, the image filtering by a hardware front-end module is usually not available to relax the requirement on the IQ calibration accuracy. The frequency response variation that spans over signal and image range imposes a significant challenge in the IQ image calibration. In one or more implementations, it depends on an intrinsic balanced analog design and/or a fast converging calibration mechanism to realize a highly balanced IQ transceiver phase array system.

Numerous approaches calibrate an IQ imbalance in direct conversion transceivers, or low IF transceivers with duel ADC/DAC implementation. By examining the statistics of the I and Q data separately, or the IQ vector from a known input, the amplitude and phase imbalance can be identified accurately. The compensation is applied in a digital post-processing domain or in an analog IQ tuning blocks directly. IQ calibration in a heterodyne topology has limited means of accurate imbalance detection. A search for the optimal amplitude and phase compensation is a significant aspect of the efficient calibration.

One or more implementations of the subject technology provides a novel architecture of self-contained IQ calibration that is configured to correct the IQ imbalance in an mm-Wave superheterodyne transceiver array. In one or more examples, a transmitter may generate a calibration signal (or a test signal), which is looped back to a receiver, with a radio frequency (RF) signal coupled over the air at the antenna ports. A test signal can be (i) a single continuous wave (CW) tone for a narrow channel bandwidth application, or (ii) a two-tone signal or a modulated signal for a wide channel bandwidth application. The calibration differentiates the IQ imbalance from the transmitter and receiver path by alternating a signal path setup for real signal generation or receiving. Without the access to the separated IQ path information as is the case of a direct conversion topology, an approach of the subject technology uses a spectrum detection method to measure an image rejection ratio (IRR) directly. The high IF heterodyne topology creates a wide frequency span between a main signal and an image signal. The frequency response variation over the wide frequency span is well expected and should be normalized for the accurate IRR capture. Newton's method of optimization in search of a function minimal is used for the IRR optimization. It may use the simplified 1/IRR as a cost function to optimize the amplitude and phase separately in the iteration loop. By using separate and different frequency control of local oscillators (LOs) for a massive array, a transmitter LO (Tx LO) and a receiver LO (Rx LO) may be programmed and configured with a small frequency offset from each other. As a result, a Tx IRR and an Rx IRR can be obtained within a single ADC frequency spectrum capture. A small form factor of the mm-Wave component results in the close vicinity element placement in the array. The efficient RF coupling among antenna ports provides a highly dynamic signal range in the loopback path, which can be utilized to provide a fast convergence of Newton's method.

Transceiver System Overview

FIG. 1A illustrates an example of a transceiver system. One or more implementations of the subject technology can calibrate the IQ imbalance of a transmitter/receiver pair in each element of a massive transceiver array. Without the aid of a front-end image rejection filter, the heterodyne topology of the subject technology can provide an accurate analog magnitude and phase compensation. In one or more examples, a self-contained IQ calibration system (e.g., 100) includes functions of calibration control, test signal generation and loopback, and IQ impairment detection and compensation. A Tx-Rx loopback path configuration can provide a highly dynamic range for accurate IQ calibration. The IQ calibration process may include (a) generation of a calibration signal from a DAC with power level control, (b) generation of a Tx output signal that couples to an Rx path at Tx/Rx antenna ports, and (c) detection of an IQ signal by an ADC. The IQ imbalance from Tx and Rx paths may be isolated within the shared loopback path. Separated calibration can be provided in such a manner that when a transceiver system calibrates the Tx I and Tx Q channels, one of the Rx I channel or the Rx Q channel is turned off to disable receiving image rejection (e.g., to generate both the Rx intermediate frequency (IF) main signal and the Rx IF image signal without compensation), and when the transceiver system calibrates the Rx I and Rx Q channels, one of the Tx I channel or the Tx Q channel is turned off to generate both the RF main signal and the RF image signal without compensation and to provide these uncompensated signals to the receiver.

Referring to FIG. 1A, a transceiver system 100 may include a plurality of elements or an array of elements 140. In one or more implementations, the transceiver system 100 is a transceiver phase array system, where the array of elements 140 is part of a phase array. Each element may have a phase that is different from a phase of another element. The array may include elements such as E00, E01, E02, . . . , E33. Each element (e.g., E00, E01, . . . , or E33) may include a transmitter and a receiver. A calibration mode (e.g., a transmitter calibration mode or a receiver calibration mode) may utilize a transmitter of a first element (e.g., E00) and a receiver of a second element (e.g., E02) that is different from the first element (see, e.g., 1293 of FIG. 12C). The transmitter of the first element may transmit a transmitter (Tx) output signal (e.g., via a Tx antenna) to the receiver of the second element (e.g., via an Rx antenna) over the air. FIG. 1B illustrates example calibration modes that utilize a transmitter of the element E00 and a receiver of the element E02 where a Tx output signal is provided over an air coupling 141. Referring back to FIG. 1A, once the calibration of the transmitter of the element E00 and the receiver of the element E02 is completed, the transceiver system 100 may perform additional calibration operations using different transmitter/receiver pairs (e.g., a transmitter of the element E33 and a receiver of the element E31 where a Tx output signal is provided over an air coupling 142, and/or other transmitter/receiver pairs). The calibration operations may calibrate all or some of the transmitters and receivers within the transceiver system 100.

The transceiver system 100 may also include a clock generator and distribution network 120 that uses a reference oscillator 110, such as a voltage-controlled oscillator. In one or more examples, all components of the transceiver system 100 use clock signals (or local oscillator signals) derived from a single reference oscillator (e.g., the reference oscillator 110), not from multiple reference oscillators. In one or more examples, it is advantageous to use a single reference oscillator, rather than multiple reference oscillators, as the use of a single reference oscillator can minimize timing errors among the components within the transceiver system 100.

The transceiver system 100 may also include a controller 130. The controller 130 may include one or more controllers. A controller may include one or more processors or microprocessors (e.g., 132). The controller 130 may include memory and/or registers 135. The controller 130 may be configured to control various components of the transceiver system 100 and provide various signals, parameters and values to the components of the transceiver system 100.

Transceiver System Components

FIG. 1B illustrates an example of a transceiver system for transmitter and receiver calibration processes. A transceiver system 100 may include a transmitter T145, a receiver R145, a clock generator and distribution network 120, and a controller 130. For ease of illustration, in this example, the transmitter T145 is shown as a transmitter from the element E00, and the receiver R145 is shown as a receiver from the element E02 (see, e.g., 1293 of FIG. 12C). However, the transmitter T145 is not limited to a transmitter of the element E00, and the transmitter T145 may represent a transmitter of any other element. Similarly, the receiver R145 is not limited to a receiver of the element E02, and the receiver R145 may represent a receiver of any other element.

The transmitter T145 may include a digital-to-analog converter (DAC) T150, a transmitter in-phase (Tx I) channel T160, and a transmitter quadrature (Tx Q) channel T180. The transmitter T145 may also include a splitter T155 and a Tx tuning circuit T170. The transmitter T145 may further include a Tx amplifier (e.g., a power amplifier) T190 and a Tx antenna T195.

The receiver R145 may include a receiver in-phase (Rx I) channel R160, a receiver quadrature (Rx Q) channel R180 and an analog-to-digital converter (ADC) R150. The receiver R145 may include an Rx tuning circuit R170 and an Rx combiner R155. The receiver R145 may further include an Rx antenna R195 and an Rx amplifier (e.g., a low-noise amplifier (LNA)) R190.

In one or more examples, the DAC T150 is to be used for both the Tx I and Tx Q channels in that the transmitter T145 does not use two separate DACs for the Tx I and Tx Q channels. In one or more examples, the ADC R150 is to be used for both the Rx I and Rx Q channels in that the receiver R145 does not use two separate ADCs for the Tx I and Tx Q channels. The Tx I channel T160, the Tx Q channel T180, the Rx I channel R160, and the Rx Q channel R180 are configured to operate in an analog domain. The components shown in FIG. 1B are described below in connection with a calibration mode (e.g., a transmitter calibration mode and/or a receiver calibration mode).

Transmitter Calibration Mode

When the transceiver system 100 is in a transmitter calibration mode, the transceiver system may perform Tx calibration operations. The Tx calibration operations may include some or all of the following.

Figures 11, 12A:
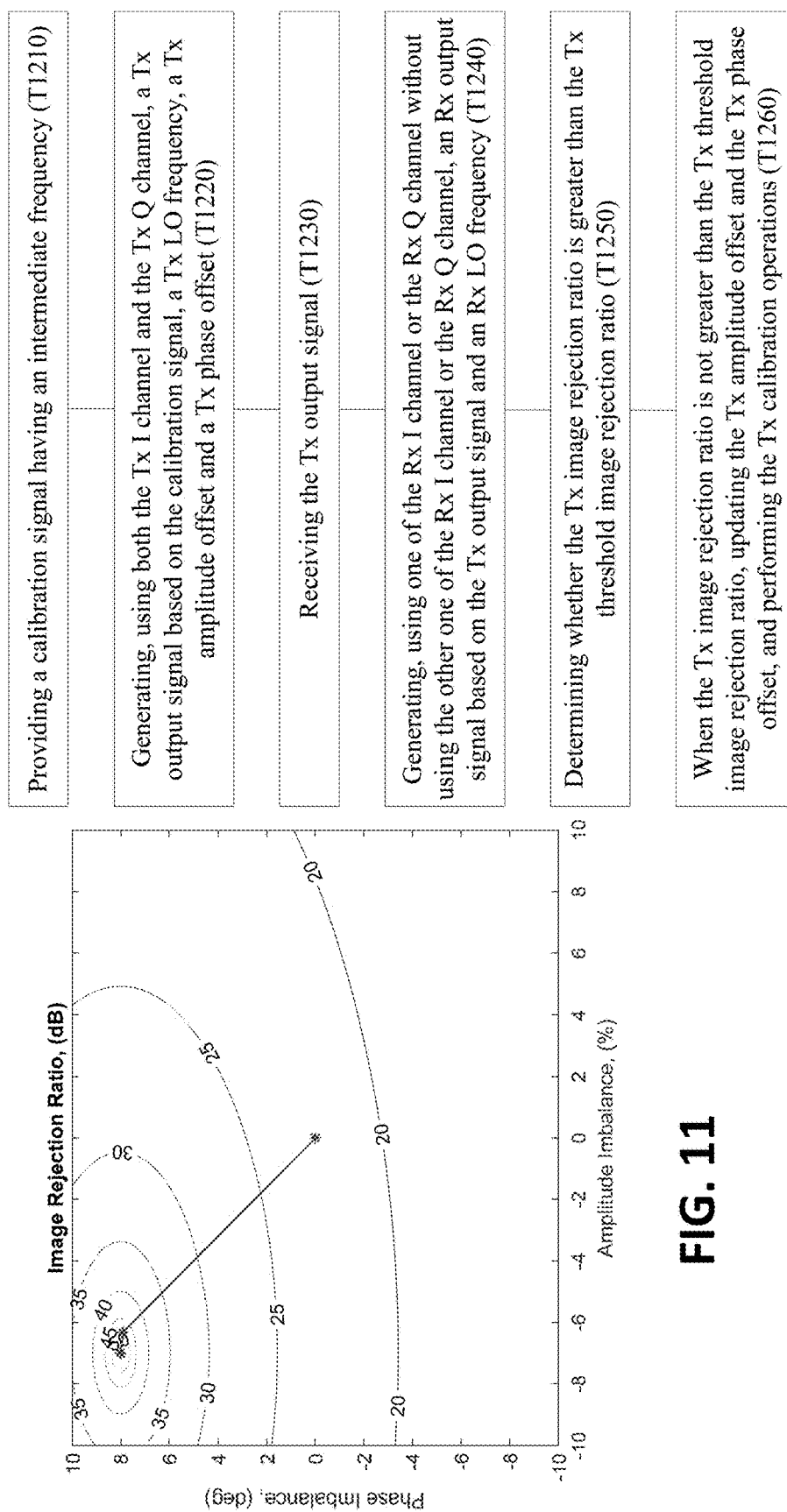

Referring to FIGS. 1B and 12A, the DAC T150 may provide a calibration signal for both the Tx I and Tx Q channels (see, e.g., T1210). This calibration signal may be (i) a single-tone CW for a narrow channel bandwidth application, or (ii) a two-tone CW or a modulated signal for a wide channel bandwidth application. In one example, the calibration signal is a real signal having an intermediate frequency (IF). In one or more implementations, an IF may be between 1 GHz and 20 GHz. The splitter T155 may receive the calibration signal from the DAC T150, split the signal and provide the split signal to the Tx I and Tx Q channels. In one or more examples, the signal provided to the Tx I channel is the same as the signal provided to the Tx Q channel in magnitude, frequency and phase, and each of these signals provided to the Tx I and Tx Q channels may be the same as the calibration signal provided by the DAC T150 in frequency and phase. The magnitude of each of these signals provided to the Tx I and Tx Q channels may be different from the magnitude of the calibration signal outputted by the DAC T150. For example, the magnitude of each of these signals provided to the Tx I and Tx Q channels may be less (e.g., 3 dB less, or more than 3 dB less) than the magnitude of the calibration signal outputted by the DAC T150.

Each of the Tx I and Tx Q channels is coupled to a respective output of the splitter T155, and the Tx I and Tx Q channels are arranged in parallel with each other. During a transmitter calibration mode, both the Tx I and Tx Q channels are enabled and operated. In one example, the controller 130 can enable or disable each of the Tx I and Tx Q channels using the control signals D1_I and D1_Q. During a transmitter calibration mode, the controller 130 may set the control signals D1_I and D1_Q to enable signals so that both the Tx I and Tx Q channels are enabled and operated (see, e.g., 1291).

During a transmitter calibration mode, the Tx I channel T160 may receive, from the clock generator and distribution network 120, a transmitter in-phase local oscillator (Tx I LO) signal (e.g., LO1_I) to up-convert a Tx I signal (which is a signal derived from the calibration signal), and the Tx Q channel T180 may receive, from the clock generator and distribution network 120, a Tx Q LO signal (e.g., LO1_Q) to up-convert a Tx Q signal (which is another signal derived from the calibration signal). A phase difference between the Tx I signal and the Tx Q signal is 90 degrees. The Tx I and Tx Q LO signals have the same Tx LO frequency. A phase difference between the Tx I LO signal and the Tx Q LO signal is 90 degrees.

In the transmitter calibration mode, the controller 130 may generate and provide, to the Tx tuning circuit T170, a Tx amplitude offset (e.g., $\alpha 1\_n$) and a Tx phase offset (e.g., $\theta 1\_n$) for each iteration of the Tx calibration operations, where n is a Tx iteration index (see, e.g., 1291). The Tx amplitude offset and the Tx phase offset are used for compensating an amplitude imbalance and a phase imbalance between the Tx I and Tx Q channels (see, e.g., 1291, 1293). For each iteration of the Tx calibration operations, the Tx tuning circuit T170 may generate and provide, to the Tx I channel, a Tx I amplitude adjustment and a Tx I phase adjustment, and generate and provide, to the Tx Q channel, a Tx Q amplitude adjustment and a Tx Q phase adjustment. The Tx tuning circuit T170 may generate the Tx I and Tx Q amplitude adjustments and the Tx I and Tx Q phase adjustments based on the Tx amplitude offset and the Tx phase offset.

The output signals of the Tx I and Tx Q channels may be combined to produce a combined Tx channel output signal. The Tx amplifier T190 may receive and amplify the combined Tx channel output signal to generate a Tx output signal. The Tx antenna T195 may transmit the Tx output signal over the air (via the air coupling 141). In this example, the Tx output signal is generated, using both Tx I and Tx Q channels, based on the calibration signal, the Tx LO frequency, the Tx amplitude offset and the Tx phase offset (see, e.g., T1220). A Tx output signal may include an RF main signal and an RF image signal. In one or more implementations, a frequency of an RF main signal may be between 20 GHz and 100 GHz.

The Rx antenna R195 may receive the Tx output signal (see, e.g., T1230). The Rx amplifier R190 may amplify the Tx output signal and provide the amplified Tx output signal to the Rx I and Rx Q channels R160 and R180. In one or more examples, each of the Rx I and Rx Q channels R160 and R180 receives the same amplified Tx output signal (e.g., the same in frequency, magnitude and phase) from the Rx amplifier R190.

Each of the Rx I and Rx Q channels R160 and R180 is coupled to a respective output of the Rx amplifier R190, and the Rx I and Rx Q channels are arranged in parallel with each other. During a transmitter calibration mode, one of the Rx I channel or the Rx Q channel is selected and operated, and the controller 130 disables the other one of the Rx I channel or the Rx Q channel. The controller 130 may set one of the control signals D2_I and D2_Q to an enable signal, and set the other one of the control signals D2_I and D2_Q to a disable signal so that the respective one of the Rx I channel or the Rx Q channel is selected and enabled for use, and the other one of the Rx I channel or the Rx Q channel is disabled. FIG. 2A illustrates an example of Tx calibration operations where both the Tx I and Tx Q channels T160 and T180 are enabled for use, the Rx I channel R160 is enabled for use, and the Rx Q channel R180 is disabled and not used, where the control signal D2_Q is a disable signal. FIG. 2B illustrates another example of Tx calibration operations where both the Tx I and Tx Q channels T160 and T180 are enabled for use, the Rx Q channel R180 is enabled for use, and the Rx I channel R160 is disabled and not used, where the control signal D2_I is a disable signal. Thus, during a transmitter calibration mode, one of the Rx I channel or the Rx Q channel is selected for the calibration operations while both the Tx I and Tx Q channels are used (see, e.g., 1291).

Returning to FIGS. 1B and 12A, during a transmitter calibration mode, the selected Rx channel (e.g., one of the Rx I channel or the Rx Q channel) may receive, from the clock generator and distribution network 120, an Rx selected LO signal, which is one of a receiver in-phase local oscillator (Rx I LO) signal (e.g., LO2_I) or an Rx Q LO signal (e.g., LO2_Q), to down-convert an Rx selected signal (which is a signal derived from the Tx output signal). The Rx I and Rx Q LO signals have the same Rx LO frequency. A phase difference between the Rx I LO signal and the Rx Q LO signal is 90 degrees. In one or more examples of the transmitter calibration mode, the controller 130 does not provide, to the Rx tuning circuit R170, any Rx amplitude offset (e.g., α2_n) or any Rx phase offset (e.g., θ2_n). Thus, during a transmitter calibration mode, the receiver does not perform Rx calibration operations.

The selected Rx channel may produce an Rx channel output signal based on the Tx output signal and the Rx LO frequency. As only one of the Rx I channel or the Rx Q channel is operational as the selected Rx channel, the Rx combiner R155 may receive the Rx channel output signal from the selected Rx channel and produce an Rx output signal, which is the same as the Rx channel output signal in this case. An Rx output signal includes an Rx IF main signal and an Rx IF image signal. In one or more examples of a transmitter calibration mode, an Rx output signal is generated, using only one of the Rx I and Rx Q channels, based on the Tx output signal and the Rx LO frequency without using any Rx amplitude offset or any Rx phase offset (see, e.g., T1240). The ADC R150 may convert the Rx output signal, in an analog form, to an Rx output signal, in a digital form. An Rx output signal, in a digital form, may include an Rx IF main signal and an Rx IF image signal, each in a digital form.

The controller 130 may receive the Rx IF main signal (in a digital form) and the Rx IF image signal (in a digital form) from the ADC R150 and determine a magnitude of the Rx IF main signal and a magnitude of the Rx IF image signal. The controller 130 may then determine a Tx image rejection ratio (Tx IRR), which is based on a magnitude difference between the Rx IF main signal and the Rx IF image signal (see, e.g., T1250). In one example, a Tx IRR comprises a magnitude difference between the Rx IF main signal and the Rx IF image signal. In another example, a Tx IRR is a magnitude difference between the Rx IF main signal and the Rx IF image signal. In yet another example, a Tx IRR is a magnitude difference between the Rx IF main signal and the Rx IF image signal, adjusted by an IRR correction factor (described later). When the Tx image rejection ratio is not greater than a Tx threshold image rejection ratio (Tx threshold IRR), the controller 130 updates the Tx amplitude offset and the Tx phase offset, and the Tx calibration operations are repeated using the updated Tx amplitude offset and the updated Tx phase offset (see, e.g., T1260). The Tx calibration operations may repeat until the Tx image rejection ratio becomes greater than the Tx threshold image rejection ratio (see, e.g., T1250, T1260). Thus, the Tx calibration operations may be completed when the Tx image rejection ratio becomes greater than the Tx threshold image rejection ratio.

Receiver Calibration Mode

When the transceiver system 100 is in a receiver calibration mode, the transceiver system may perform Rx calibration operations. The Rx calibration operations may include some or all of the following.

Referring to FIGS. 1B and 12B, the DAC T150 may provide a second calibration signal for both the Tx I and Tx Q channels (see, e.g., R1210). This second calibration signal may be (i) a single-tone CW for a narrow channel bandwidth application, or (ii) a two-tone CW or a modulated signal for a wide channel bandwidth application. In one example, the second calibration signal is a real signal having an intermediate frequency (IF). In one example, the second calibration signal is the same as the calibration signal in frequency, magnitude and phase. The splitter T155 may receive the second calibration signal from the DAC T150, split the signal and provide the split signal to the Tx I and Tx Q channels. In one or more examples, the signal provided to the Tx I channel is the same as the signal provided to the Tx Q channel in magnitude, frequency and phase, and each of these signals provided to the Tx I and Tx Q channels is the same as the second calibration signal provided by the DAC T150 in frequency and phase. The magnitude of each of these signals provided to the Tx I and Tx Q channels may be different from the magnitude of the second calibration signal outputted by the DAC T150.

During a receiver calibration mode, only one of the Tx I channel or the Tx Q channel is enabled and operated, and the controller 130 disables the other one of the Tx I channel or the Tx Q channel. The controller 130 may set one of the control signals D1_I and D1_Q to an enable signal, and set the other one of the control signals D1_I and D1_Q to a disable signal so that the respective one of the Tx I channel or the Tx Q channel is selected and enabled for use, and the other one of the Tx I channel or the Tx Q channel is disabled and not used.

During a receiver calibration mode, the selected Tx channel (e.g., one of the Rx I channel or the Rx Q channel) may receive, from the clock generator and distribution network 120, a Tx selected LO signal (e.g., LO1_I or LO1_Q) to up-convert a Tx selected signal (which is a signal derived from the second calibration signal). A phase difference between LO1_I and LO1_Q is 90 degrees. The Tx selected LO signal has the same Tx LO frequency. A phase difference between the Tx I LO signal and the Tx Q LO signal is 90 degrees. In one or more examples of the receiver calibration mode, the controller 130 does not provide, to the Tx tuning circuit T170, any Tx amplitude offset (e.g., α1_n) or any Tx phase offset (e.g., θ1_n). Thus, during a receiver calibration mode, the transmitter does not perform Tx calibration operations.

The selected Tx channel may produce a Tx selected channel output signal based on the second calibration signal and the Tx LO frequency. As only one of the Tx I channel or the Tx Q channel is operational as the selected Tx channel, the Tx amplifier T190 may receive and amplify the Tx selected channel output signal from the selected Tx channel and produce a second Tx output signal, which is the same as the Tx selected channel output signal in this case. A second Tx output signal may include a second RF main signal and a second RF image signal.

The Tx antenna T195 may transmit the second Tx output signal over the air (via the air coupling 141). In one or more examples of a receiver calibration mode, the second Tx output signal is generated, using only one of the Tx I and Tx Q channels, based on the second calibration signal and the Tx LO frequency without using any Tx amplitude offset or any Tx phase offset (see, e.g., R1220).

The Rx antenna R195 may receive the second Tx output signal (see, e.g., R1230). The Rx amplifier R190 may amplify the second Tx output signal and provide the amplified second Tx output signal to the Rx I and Rx Q channels R160 and R180. In one or more examples, each of the Rx I and Rx Q channels R160 and R180 receives the same amplified second Tx output signal (e.g., the same in frequency, magnitude and phase) from the Rx amplifier R190.

Each of the Rx I and Rx Q channels R160 and R180 is coupled to a respective output of the Rx amplifier R190, and the Rx I and Rx Q channels are arranged in parallel with each other. During a receiver calibration mode, both the Rx I channel and the Rx Q channel are enabled and operated. In one example, the controller 130 can enable or disable each of the Rx I and Rx Q channels using the control signals D2_I and D2_Q. During a receiver calibration mode, the controller 130 may set the control signals D2_I and D2_Q to enable signals so that both the Rx I and Rx Q channels are enabled to be used for Rx calibration operations.

Figure 2C:
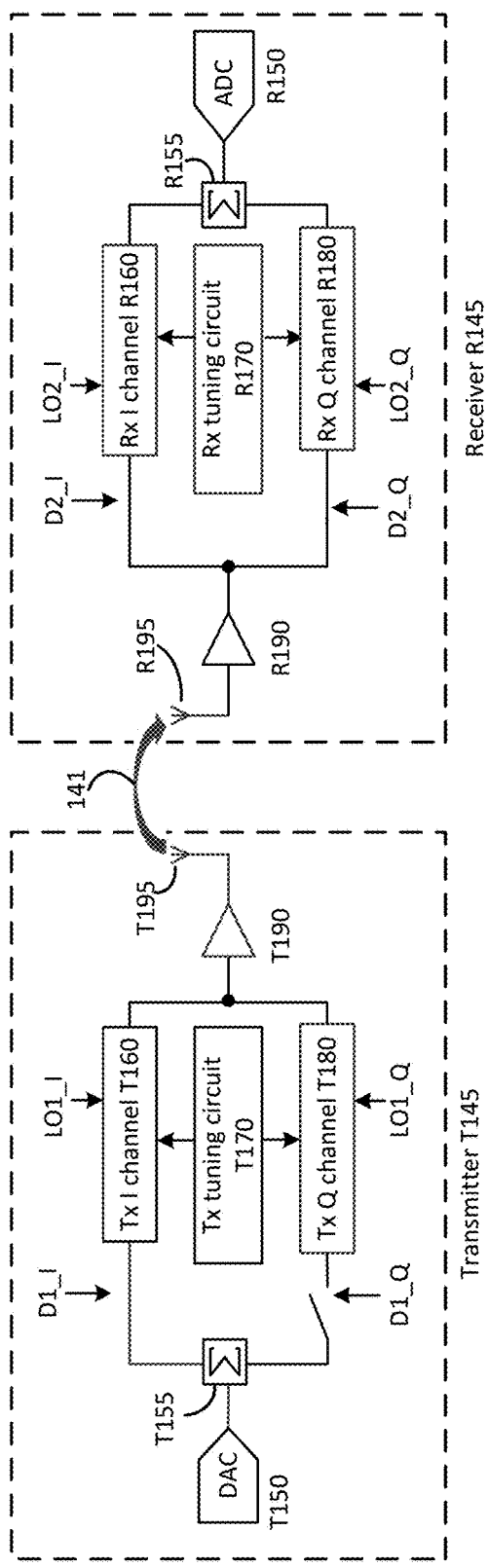
Figure 2D:
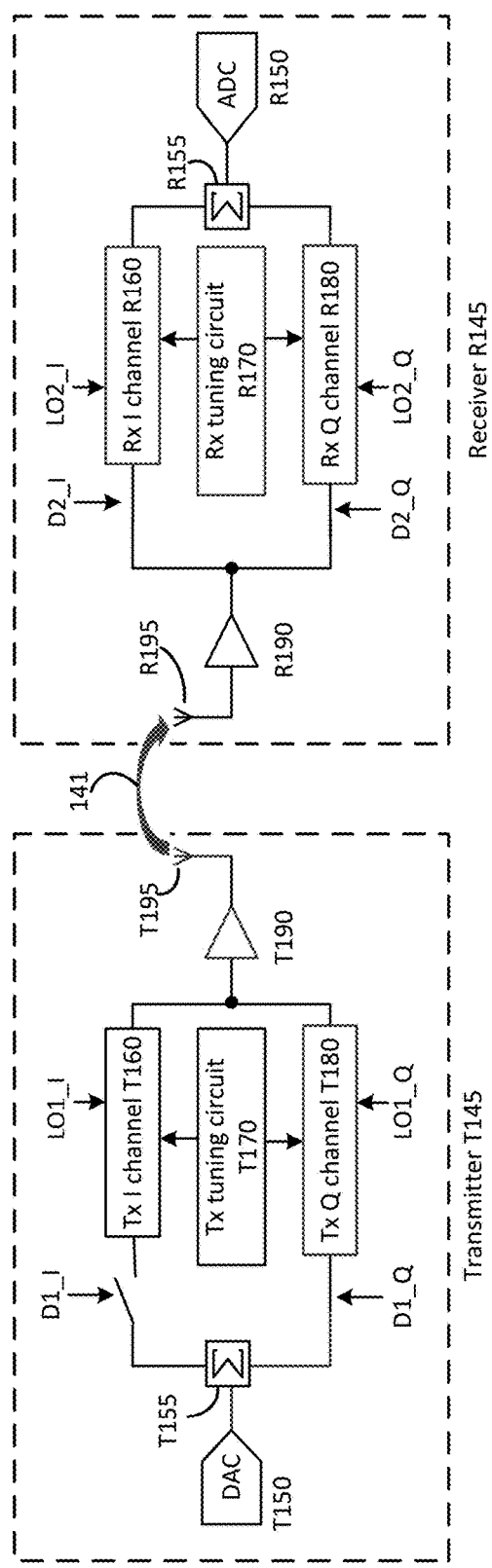

FIG. 2C illustrates an example of Rx calibration operations where the Tx I channel T160 is enabled for use, and the Tx Q channel T180 is disabled and not used, where the control signal D1_Q is a disable signal, and both the Rx I and Rx Q channels R160 and R180 are enabled for use. FIG. 2D illustrates another example of Rx calibration operations where the Tx Q channel T180 is enabled for use, and the Tx I channel T160 is disabled and not used, where the control signal D1_I is a disable signal, and both the Rx I and Rx Q channels R160 and R180 are enabled for use. Thus, during a receiver calibration mode, one of the Tx I channel or the Tx Q channel is selected for the calibration operations while both the Rx I and Rx Q channels are used.

Returning to FIGS. 1B and 12B, during a receiver calibration mode, the Rx I channel R160 may receive, from the clock generator and distribution network 120, an Rx I LO signal (e.g., LO2_I) to down-convert an Rx I signal (which is a signal derived from the second Tx output signal), and the Rx Q channel R180 may receive, from the clock generator and distribution network 120, an Rx Q LO signal (e.g., LO2_Q) to down-convert an Rx Q signal (which is a signal derived from the Tx output signal). The Rx I and Rx Q LO signals have the same Rx LO frequency. A phase difference between the Rx I LO signal and the Rx Q LO signal is 90 degrees.

In a receiver calibration mode, the controller 130 may generate and provide, to the Rx tuning circuit R170, an Rx amplitude offset (e.g., $\alpha2\_n$) and an Rx phase offset (e.g., $\theta2\_n$) for each iteration of the Rx calibration operations, where n is an Rx iteration index. The Rx amplitude offset and the Rx phase offset are used for compensating an amplitude imbalance and a phase imbalance between the Rx I and Rx Q channels. For each iteration of the Rx calibration operations, the Rx tuning circuit R170 may generate and provide, to the Rx I channel, an Rx I amplitude adjustment and an Rx I phase adjustment, and generate and provide, to the Rx Q channel, an Rx Q amplitude adjustment and an Rx Q phase adjustment. The Rx tuning circuit R170 may generate the Rx I and Rx Q amplitude adjustments and the Rx I and Rx Q phase adjustments based on the Rx amplitude offset and the Rx phase offset.

An Rx I channel R160 may generate an Rx I output signal, based on the second Tx output signal, the Rx LO frequency, the Rx amplitude offset and the Rx phase offset (see, e.g., R1240). An Rx Q channel may produce an Rx Q output signal, based on the second Tx output signal, the Rx LO frequency, the Rx amplitude offset and the Rx phase offset (see, e.g., R1240).

The Rx combiner R155 may combine the Rx I output signal and the Rx Q output signal to generate a second Rx output signal, which includes a second Rx IF main signal and a second Rx IF image signal (see, e.g., R1240). The ADC R150 may convert the second Rx output signal, in an analog form, to a second Rx output signal, in a digital form, which includes a second Rx IF main signal and a second Rx IF image signal, each in a digital form. The controller 130 may determine a magnitude of the second Rx IF main signal (in a digital form) and a magnitude of the second Rx IF image signal (in a digital form). The controller 130 may then determine an Rx image rejection ratio (Rx IRR), which is based on a magnitude difference between the second Rx IF main signal and the second Rx IF image signal (see, e.g., R1250). In one example, an Rx IRR comprises a magnitude difference between the Rx IF main signal and the Rx IF image signal. In another example, an Rx IRR is a magnitude difference between the Rx IF main signal and the Rx IF image signal. In yet another example, an Rx IRR is a magnitude difference between the Rx IF main signal and the Rx IF image signal, adjusted by an IRR correction factor (described later). When the Rx image rejection ratio is not greater than an Rx threshold image rejection ratio (Rx threshold IRR), the controller 130 updates the Rx amplitude offset and the Rx phase offset, and the Rx calibration operations are repeated using the updated Tx amplitude offset and the updated Tx phase offset (see, e.g., R1260). The Rx calibration operations may repeat until the Rx image rejection ratio becomes greater than the Rx threshold image rejection ratio (see, e.g., T1250, T1260). The Rx calibration operations may be completed when the Rx image rejection ratio becomes greater than the Rx threshold image rejection ratio.

In one or more implementations, because an IF used for the Tx/Rx calibration operations is high (e.g., a frequency between 1 GHz and 20 GHz), the Tx/Rx calibration operations can be performed without correcting any DC offset.

LO Signals, Control Signals and Amplitude & Phase Offsets for Different Sets of Elements Referring to FIGS. 1A and 1B, a clock generator and distribution network 120 may generate multiple sets of LO signals. Separate sets of LO signals may control different elements within the array of elements 140. In one or more examples, a clock generator and distribution network 120 may provide a first set of LO signals (e.g., LO1_I and LO1_Q) to a first set of elements (e.g., E00, E10, E20, E30, E01, E11, E21, E31) and provide a second set of LO signals (e.g., LO2_I and LO2_Q) to a second set of elements (e.g., E02, E12, E22, E32, E03, E12, E23, E33). The frequency of the first set of LO signals may be different from the frequency of the second set of LO signals. Hence, a transmitter/receiver pair for a transmitter/receiver calibration mode may be selected from a different set of elements so that the frequency of Tx I and Tx Q LO signals is different from the frequency of Rx I and Rx Q LO signals for the transmitter/receiver pair. For example, the transmitter T145 may be selected from the element E00 which uses a first set of LO signals, and the receiver R145 may be selected from the element E02 which uses a second set of LO signals. Within a given element, its transmitter and receiver receives LO signals from the same set of LO signals. For example, for the element E00, the Tx I and Tx Q LO signals for the transmitter within E00 may be LO1_I and LO1_Q, and the Rx I and Rx Q LO signals for the receiver within E00 may be also LO1_I and LO1_Q. Accordingly, in one or more examples, a transmitter/receiver pair for a transmitter/receiver calibration mode is selected from a different set of elements rather than from the same set of elements.

Still referring to FIGS. 1A and 1B, a controller 130 may generate multiple sets of control signals. In one or more examples, a controller 130 may provide a first set of control signals (e.g., D1_I and D1_Q) to a first set of elements (e.g., E00, E10, E20, E30, E01, E11, E21, E31) and provide a second set of control signals (e.g., D2_I and D2_Q) to a second set of elements (e.g., E02, E12, E22, E32, E03, E12, E23, E33). Similarly, a controller 130 may generate multiple sets of amplitude and phase offsets. In one or more examples, a controller 130 may provide a first set of amplitude and phase offsets (e.g., $\alpha 1\_n$ and $\theta 1\_n$) to a first set of elements (e.g., E00, E10, E20, E30, E01, E11, E21, E31) and provide a second set of amplitude and phase offsets (e.g., $\alpha 2\_n$ and $\theta 2\_n$) to a second set of elements (e.g., E02, E12, E22, E32, E03, E12, E23, E33). The assignment or association between the LO signals, control signals and amplitude and phase offsets, on the one hand, and the elements, on the other hand, is not limited to the above examples and may use other mappings between the LO signals, control signals and amplitude and phase offsets, on the one hand, and the elements, on the other hand.

Frequencies Utilized or Generated in a Transceiver System

FIGS. 3A, 3B, 3C and 3D are simplified examples illustrating frequencies utilized or generated in connection with a transceiver system 100. The frequencies illustrated in FIGS. 3A, 3B, 3C and 3D are based on a high side LO injection topology, with an LO frequency higher than the frequency of a main signal, but lower than the frequency of an image signal. When a low side LO injection topology (not shown) is utilized, the frequency of the main signal and the frequency of the image signal are swapped. In these figures, a horizontal axis represents a frequency, and a vertical axis represents an amplitude. These figures illustrate relative locations of the frequencies, and they are not to scale.

Figure 3A:
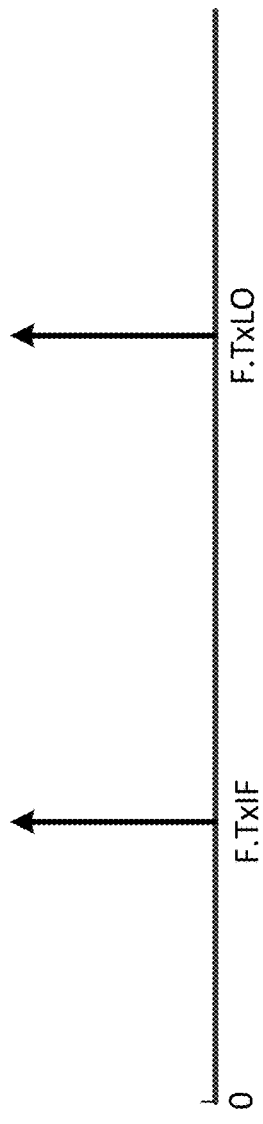
FIGS. 3A, 3B, 3C and 3D are simplified examples illustrating frequencies utilized or generated in connection with a transceiver system.

In FIG. 3A, an intermediate frequency (IF) is shown as F.TxIF. F.TxIF may be a frequency of the calibration signals produced by the DAC T150 during a transmitter calibration mode and during a receiver calibration mode. A local oscillator (LO) frequency for a transmitter (e.g., T145) is shown as F.TxLO. F.TxLO may be, for example, a frequency of a Tx I LO signal (e.g., LO1_I) or a frequency of a Tx Q LO signal (e.g., LO1_Q). In this example, F.TxIF is less than F.TxLO and is less than F.RxLO.

Figure 3B:
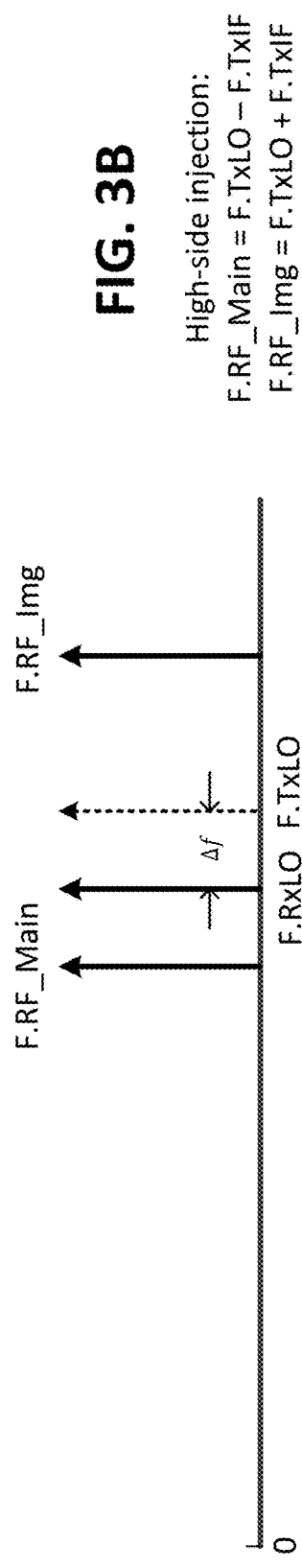

FIG. 3B illustrates an example of frequencies for an RF main signal and an RF image signal of a Tx output signal. An RF main signal may be any RF main signal (e.g., an RF main signal, a second RF main signal) during a transmitter or a receiver calibration mode. An RF image signal may be any RF image signal (e.g., an RF image signal, a second RF image signal) during a transmitter or a receiver calibration mode. A Tx output signal in this illustration may be any Tx output signal (e.g., a Tx output signal or a second Tx output signal transmitted by a Tx antenna T195) during a transmitter or a receiver calibration mode.

In FIG. 3B, a frequency of an RF main signal is depicted as F.RF_Main. A frequency of an RF image signal is depicted as F.RF_Img. A local oscillator (LO) frequency for a receiver (e.g., R145) is shown as F.RxLO. F.RxLO may be, for example, a frequency of an Rx I LO signal (e.g., LO2_I) or a frequency of an Rx Q LO signal (e.g., LO2_Q). In one or more examples, F.RxLO is different from F.TxLO. In this example, F.RxLO is less than F.TxLO (e.g., less than F.TxLO by $\Delta f$). In this example, F.RF_Main=F.TxLO−F.TxIF, and F.RF_Img=F.TxLO+F.TxIF. In another example, F.RxLO may be greater than F.TxLO. In another example, F.RF_Main=F.TxLO+F.TxIF, and F.RF_Img=F.TxLO−F.TxIF.

Figure 3C:

FIG. 3C illustrates an example of frequencies of an Rx IF main signal and an Rx IF image signal of an Rx output signal. An Rx IF main signal may be any Rx IF main signal (e.g., an Rx IF main signal, a second Rx IF main signal) during a transmitter or a receiver calibration mode. An Rx IF image signal may be any Rx IF image signal (e.g., an Rx IF image signal, a second Rx IF image signal) during a transmitter or a receiver calibration mode. An Rx output signal in this illustration may be any Rx output signal (e.g., an Rx output signal or a second Rx output signal provided by an Rx combiner R155) during a transmitter or a receiver calibration mode.

In FIG. 3C, a frequency of an Rx IF main signal is depicted as F.RxIF_Main. A frequency of an Rx IF image signal is depicted as F.RxIF_Img. In this example, F.RxIF_Main=F.TxIF−F.TxLO+F.RxLO, and F.RxIF_Img=F.TxIF+F.TxLO−F.RxLO. A frequency difference between F.RxIF_Main and F.RxIF_Img is $2*\Delta f$ (or twice the frequency difference between F.TxLO and F.RxLO). While these figures show an example where F.RF_Main is less than F.RF_Img, and F.RxIF_Main is less than F.RxIF_Img, in another example (not shown in FIG. 3B or 3C), F.RF_Main may be greater than F.RF_Img, and F.RxIF_Main may be greater than F.RxIF_Img.

In one or more implementations, because F.RxLO is different from F.TxLO, F.RxIF_Main is different from F.RxIF_Img, and, thus, both the Rx IF main signal and the Rx IF image signal (or both the second Rx IF main signal and the second Rx IF image signal) can be identified in one frequency spectrum (or in one ADC captured frequency spectrum). This can provide more reliable Tx and Rx image rejection ratios (Tx and Rx IRRs). In one or more examples, because a different set of LO signals controls different elements in the array of elements 140, it is feasible to produce F.RxLO that is different from F.TxLO.

FIGS. 3B and 3C illustrate an example where a single-tone CW signal is used as a calibration signal. In contrast, when a two-tone CW signal is used as a calibration signal (not shown in FIGS. 3B and 3C), there would be two RF main signals (at two different frequencies) and two RF image signals (at two different frequencies), instead of one RF main signal and one RF image signal, as shown in FIG. 3B. Similarly, for a two-tone CW signal used as a calibration signal, there would be two Rx IF main signals (at two different frequencies) and two Rx IF image signals (at two different frequencies), instead of one Rx IF main signal and one Rx IF image signal, as shown in FIG. 3C. The frequencies of the main and image signals for the case of a two-tone CW signal are not shown in FIGS. 3B and 3C.

Figure 3D:
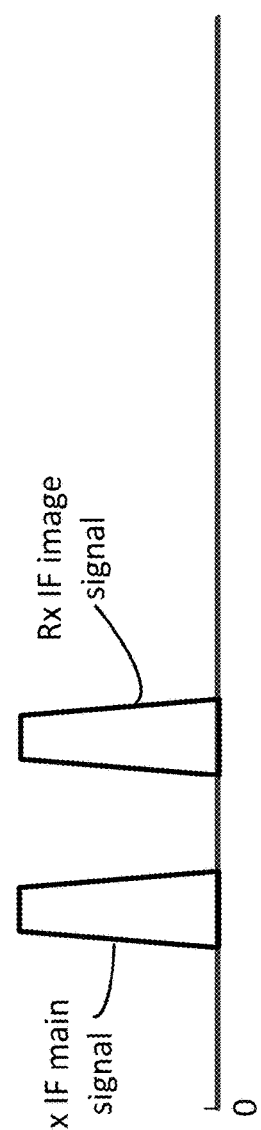

FIG. 3D illustrates an example, where a modulated signal is used as a calibration signal having a center frequency and a channel width. For the modulated calibration signal used as a calibration signal, there are an Rx IF main signal (with the channel bandwidth) and an Rx IF image signal (with the channel bandwidth). Similarly, for the modulated calibration signal used as a calibration signal, there would be an RF main signal (with the channel bandwidth) and an RF image signal (with the channel bandwidth). These are not shown in the figures. It should be noted that FIGS. 3A through 3D illustrate a positive frequency spectrum only, and the equivalent negative frequency spectrum is not shown for ease of understanding. The equivalent negative frequency spectrum would show the same frequencies as those shown for the positive frequency spectrum, except that they would be shown with negative frequencies. It should be noted that in one or more examples, regardless of the type of calibration signal used (e.g., a single-tone signal, a two-tone signal or a modulated signal), each of a Tx I LO signal, a Tx Q LO signal, an Rx I LO signal, and an Rx Q LO signal is a single-tone CW signal. A single-tone CW signal may be sometimes referred to as a single-tone signal, a single-tone CW or a single CW tone, and vice versa. A two-tone CW signal may be sometimes referred to as a two-tone signal or a two-tone CW, and vice versa.

FIGS. 4A, 4B, 4C and 4D are examples illustrating a frequency plan for a transmitter calibration mode. These figures illustrate equivalent positive and negative frequency spectrums. In these figures, a horizontal axis represents a frequency, and a vertical axis represents an amplitude. These figures illustrate relative locations of the frequencies, and they are not to scale. The frequencies illustrated in FIGS. 4A, 4B, 4C and 4D are based on a high side LO injection topology, with an LO frequency higher than the frequency of a main signal, but lower than the frequency of an image signal. When a low side LO injection topology (not shown) is utilized, the frequency of the main signal and the frequency of the image signal are swapped.

Figures 4A, 4B, 4C, 4D:
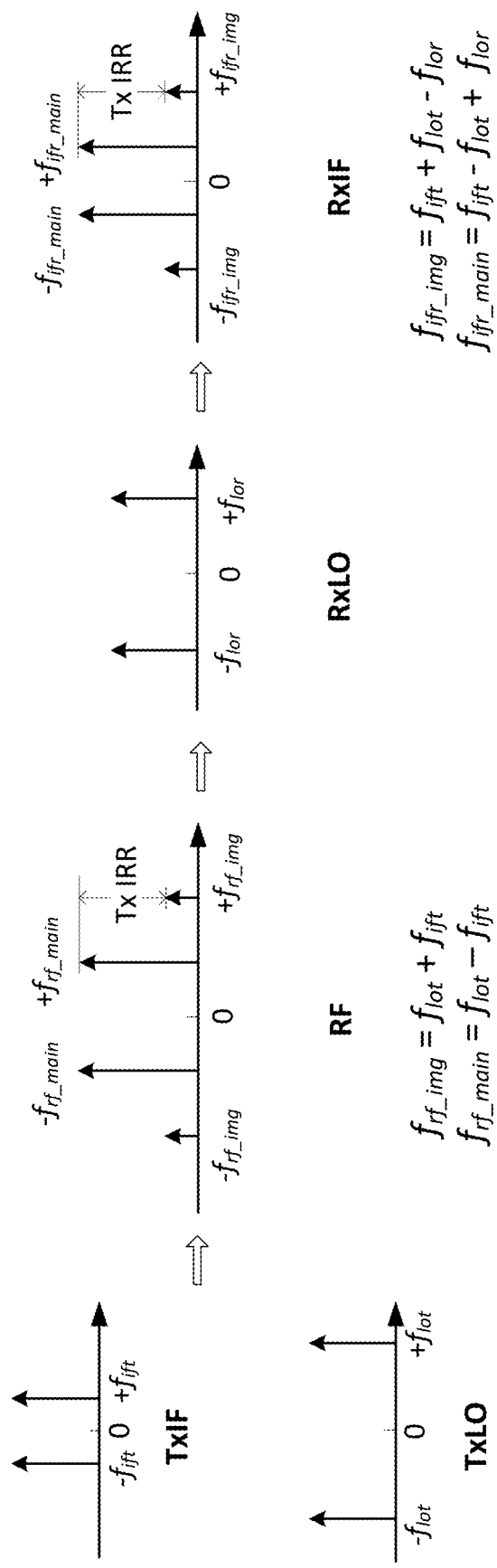
FIGS. 4A, 4B, 4C and 4D are examples illustrating a frequency plan for a transmitter calibration mode.

FIG. 4A illustrates an example of an intermediate frequency (IF) (e.g., $+f_{ift}$, $-f_{ift}$) for a transmitter (e.g., T145). During a transmitter calibration mode, a DAC T150 may generate a calibration signal having an IF. FIG. 4A also illustrates an example of a local oscillator (LO) frequency (e.g., $+f_{lot}$, $-f_{lot}$) for a transmitter (e.g., T145). The LO frequency may be a frequency of a Tx I LO signal (e.g., LO1_I) or a frequency of a Tx Q LO signal (e.g., LO1_Q).

FIG. 4B illustrates an example of frequencies for an RF main signal and an RF image signal of a Tx output signal. An RF main signal may be an RF main signal generated during a transmitter calibration mode. An RF image signal may be an RF image signal generated during a transmitter calibration mode. A Tx output signal in this illustration may be a Tx output signal transmitted by a Tx antenna T195 during a transmitter calibration mode.

In FIG. 4B, an example of a frequency of an RF main signal is depicted as $+f_{rf\_main}$ and $-f_{rf\_main}$. A frequency of an RF image signal is depicted as $+f_{rf\_img}$ and $-f_{rf\_img}$. A relationship between the frequencies may be expressed as: $f_{rf\_img}=f_{lot}+f_{ift}$ and $f_{rf\_main}=f_{lot}-f_{ift}$. A Tx image rejection ratio (Tx IRR) may comprise a magnitude difference between an RF main signal and an RF image signal.

In FIG. 4C, an example of a local oscillator (LO) frequency for a receiver (e.g., R145) is shown as $+f_{lor}$ and $-f_{lor}$. This LO frequency may be, for example, a frequency of an Rx I LO signal (e.g., LO2_I) or a frequency of an Rx Q LO signal (e.g., LO2_Q). In one or more examples, an LO frequency for a receiver (Rx LO frequency) is different from an LO frequency for a transmitter (Tx LO frequency). In one example, an Rx LO frequency is less than a Tx LO frequency. In another example, an Rx LO frequency is greater than a Tx LO frequency.

FIG. 4D illustrates an example of frequencies of an Rx IF main signal and an Rx IF image signal of an Rx output signal. An Rx IF main signal may be an Rx IF main signal generated during a transmitter calibration mode. An Rx IF image signal may be an Rx IF image signal generated during a transmitter calibration mode. An Rx output signal in this illustration may be an Rx output signal provided by an Rx combiner R155 during a transmitter calibration mode.

In FIG. 4D, a frequency of an Rx IF main signal is depicted as $+f_{ifr\_main}$ and $-f_{ifr\_main}$. A frequency of an Rx IF image signal is depicted as $+f_{ifr\_img}$ and $-f_{ifr\_img}$. A relationship between the frequencies may be expressed as: $f_{ifr\_img}=f_{ift}+f_{lot}-f_{lor}$ and $f_{ifr\_main}=f_{ift}-f_{lot}+f_{lor}$. A Tx image rejection ratio (Tx IRR) may comprise a magnitude difference between an Rx IF main signal and an Rx IF image signal.

FIGS. 5A, 5B, 5C and 5D are examples illustrating a frequency plan for a receiver calibration mode. These figures illustrate equivalent positive and negative frequency spectrums. In these figures, a horizontal axis represents a frequency, and a vertical axis represents an amplitude. These figures illustrate relative locations of the frequencies, and they are not to scale.

FIG. 5A illustrates an example of an intermediate frequency (IF) (e.g., $+f_{ift}$, $-f_{ift}$) for a transmitter (e.g., T145). During a receiver calibration mode, a DAC T150 may generate a calibration signal (e.g., a second calibration signal) having an IF. FIG. 5A also illustrates an example of a local oscillator (LO) frequency (e.g., $+f_{lot}$, $-f_{lot}$) for a transmitter (e.g., T145). The LO frequency may be a frequency of a Tx I LO signal (e.g., LO1_I) or a frequency of a Tx Q LO signal (e.g., LO1_Q).

FIG. 5B illustrates an example of frequencies for an RF main signal and an RF image signal of a Tx output signal. An RF main signal may be an RF main signal (e.g., a second RF main signal) generated during a receiver calibration mode. An RF image signal may be an RF image signal (e.g., a second RF image signal) generated during a receiver calibration mode. A Tx output signal in this illustration may be a Tx output signal (e.g., a second Tx output signal) transmitted by a Tx antenna T195 during a receiver calibration mode. In FIG. 5B, an example of a frequency of an RF main signal is depicted as $+f_{rf\_main}$ and $-f_{rf\_main}$. A frequency of an RF image signal is depicted as $-F_{rf\_img}$ and $-f_{rf\_img}$.

In FIG. 5C, an example of a local oscillator (LO) frequency for a receiver (e.g., R145) is shown as $+f_{lor}$ and $-f_{lor}$. for. This LO frequency may be, for example, a frequency of an Rx I LO signal (e.g., LO2_I) or a frequency of an Rx Q LO signal (e.g., LO2_Q). In one or more examples, an LO frequency for a receiver (Rx LO frequency) is different from an LO frequency for a transmitter (Tx LO frequency). In one example, an Rx LO frequency is less than a Tx LO frequency. In another example, an Rx LO frequency is greater than a Tx LO frequency.

FIG. 5D illustrates an example of frequencies of an Rx IF main signal and an Rx IF image signal of an Rx output signal. An Rx IF main signal may be an Rx IF main signal (e.g., a second Rx IF main signal) generated during a receiver calibration mode. An Rx IF image signal may be an Rx IF image signal (e.g., a second Rx IF image signal) generated during a receiver calibration mode. An Rx output signal in this illustration may be an Rx output signal (e.g., a second Rx output signal) provided by an Rx combiner R155 during a receiver calibration mode.

In FIG. 5D, a frequency of an Rx IF main signal is depicted as $+f_{ifr\_main}$ and $-f_{ifr\_main}$. A frequency of an Rx IF image signal is depicted as $+f_{ifr\_img}$ and $-f_{ifr\_img}$. A relationship between the frequencies may be expressed as: $f_{ifr\_img}=f_{ift}+f_{lot}-f_{lor}$ and $f_{ifr\_main}=f_{ift}-f_{lot}+f_{lor}$. An Rx image rejection ratio (Rx IRR) may comprise a magnitude difference between an Rx IF main signal and an Rx IF image signal.

FIGS. 4B, 4D, 5B and 5D show an example where the RF main signal is less than the RF image signal, and the Rx IF main signal is less than the Rx IF image signal. In another example, the RF main signal may be greater than the RF image signal, and the Rx IF main signal may be greater than the Rx IF image signal. In one or more examples, a Tx IRR may comprise a magnitude difference in power. For example, when a calibration signal is a single CW signal, a Tx IRR may comprise a magnitude difference (in power) between a magnitude (in power) of an Rx IF main signal and a magnitude (in power) of an Rx IF image signal. In another example, when a calibration signal is a two-tone signal, a Tx IRR may comprise a magnitude difference (in power) between a sum of the magnitudes (in power) of Rx IF main signals and a sum of the magnitudes (in power) of Rx IF image signals. In yet another example, when a calibration signal is a modulated signal, a Tx IRR may comprise a magnitude difference (in power) between the total magnitude (in power) of an Rx IF main signal having a channel width (see, e.g., FIG. 3D) and the total magnitude (in power) of an Rx IF image signal having the channel width (see, e.g., FIG. 3D). Similarly, an Rx IRR may comprise a magnitude difference in power, and the above examples may apply to an Rx IRR in a similar manner.

Further Details Regarding Transmitter and Receiver

Figure 6B:
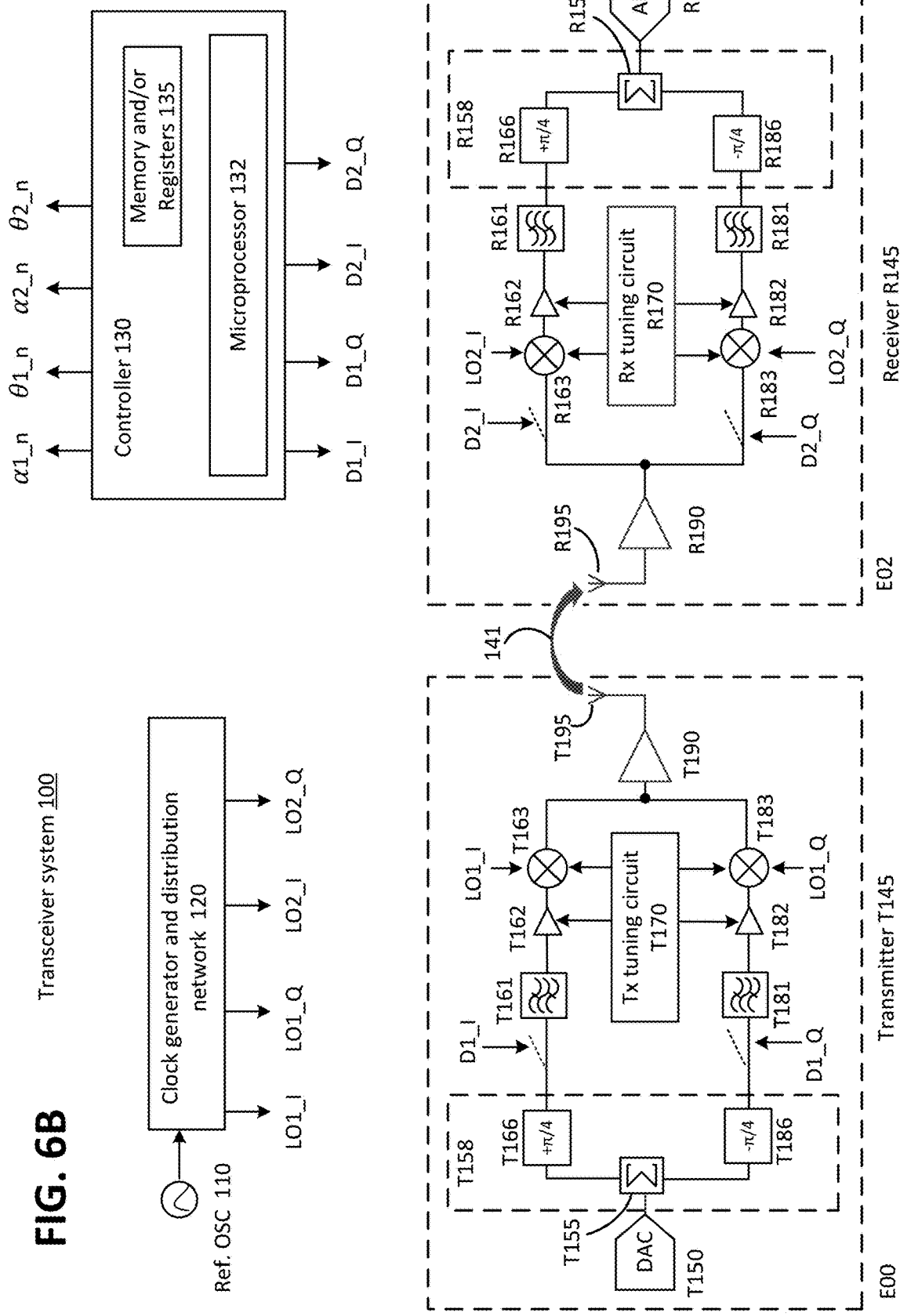

FIGS. 6A and 6B illustrate examples of a transmitter and a receiver. The descriptions provided with respect to FIGS. 1A through 5D are applicable to the components having the same reference numbers or same identifications in FIGS. 6A and 6B unless stated otherwise or other descriptions are provided.

In FIG. 6A, for a transmitter T145, a Tx I channel (e.g., T160 of FIG. 1B) may include a Tx I bandpass filter T161, a Tx I gain tuner T162 and a Tx I mixer T163 arranged sequentially. A Tx I gain tuner T162 may be configured with a Tx gain factor (TxG). A Tx Q channel (e.g., T180 of FIG. 1B) may include a Tx Q bandpass filter T181, a Tx Q gain tuner T182 and a Tx Q mixer T183 arranged sequentially. A Tx Q gain tuner T182 may be configured with a Tx gain factor (TxG). The Tx Q channel may also include a phase shifter T185 (e.g., −90 degree phase shifter). In one example, the splitter T155 and the phase shifter T185 may be implemented together using a polyphase filter T157.

For a receiver R145, an Rx I channel (e.g., R160 of FIG. 1B) may include an Rx I mixer R163, an Rx I gain tuner R162 and an Rx I bandpass filter R161. An Rx I gain tuner R162 may be configured with an Rx gain factor (RxG). An Rx Q channel (e.g., R180 of FIG. 1B) may include an Rx Q mixer R183, an Rx Q gain tuner R182, and an Rx Q bandpass filter R181. An Rx Q gain tuner R182 may be configured with an Rx gain factor (RxG). The Rx Q channel may also include a phase shifter R185 (e.g., −90 degree phase shifter). In one example, the Rx combiner R155 and the phase shifter R185 may be implemented together using a polyphase filter R157.

When the transceiver system 100 is in a transmitter calibration mode, the transceiver system may perform Tx calibration operations. The Tx calibration operations may include some or all of the following.

After the splitter T155 provides a split calibration signal to each of the Tx I and Tx Q channels T160 and T180, the phase shifter T185 may shift the phase of the split calibration signal so that a phase difference between the signals for the Tx I and Tx Q channels (e.g., a phase difference between the input signals of the Tx I and Tx Q mixers T163 and T183) is 90 degrees. In this example, the phase shifter T185 provides a phase shift of −90 degrees to the split calibration signal received by the Tx Q channel T180.

During a transmitter calibration mode, for a Tx I channel, a Tx I bandpass filter T161 filters the split calibration signal to produce a Tx I filtered calibration signal. A Tx I gain tuner T162 amplifies the Tx I filtered calibration signal to produce a Tx I amplified calibration signal, using a Tx I gain adjustment factor (TxIGA_n). For example, the Tx I filtered calibration signal is multiplied by TxIGA_n. TxIGA_n may be based on a Tx gain factor (TxG) and a Tx I amplitude adjustment (TxIAmpA_n). A Tx I mixer T163 may up-convert the Tx I amplified calibration signal using a Tx I LO signal (e.g., LO1_I) and a Tx I phase adjustment (TxIPhA_n) to produce a Tx I output signal. For the Tx Q channel, a Tx Q bandpass filter T181 filters the phase-shifted split calibration signal to produce a Tx Q filtered calibration signal. A Tx Q gain tuner T182 amplifies the Tx Q filtered calibration signal to produce a Tx Q amplified calibration signal, using a Tx Q gain adjustment factor (TxQGA_n). For example, the Tx Q filtered calibration signal is multiplied by TxQGA_n. TxQGA_n may be based on a Tx gain factor (TxG) and a Tx Q amplitude adjustment (TxQAmpA_n). A Tx Q mixer T183 may up-convert the Tx Q amplified calibration signal using a Tx Q LO signal (e.g., LO1_Q) and a Tx Q phase adjustment (TxQPhA_n) to produce a Tx Q output signal. The Tx I and Tx Q output signals may be combined to produce a combined Tx channel output signal. The Tx amplifier T190 may receive and amplify the combined Tx channel output signal to generate a Tx output signal, which is transmitted over the air. During a receiver calibration mode, only one of the Tx I channel or the Tx Q channel is enabled and used.

During a receiver calibration mode, for an Rx I channel, an Rx I mixer R163 may down-convert an amplified Tx output signal (e.g., an amplified second Tx output signal from the Rx amplifier R190) using an Rx I LO signal (e.g., LO2_I) and an Rx I phase adjustment (RxIPhA_n) to produce an Rx I down-converted signal. An Rx I gain tuner R162 amplifies the Rx I down-converted signal to produce an Rx I amplified signal, using an Rx I gain adjustment factor (RxIGA_n). For example, the Rx I down-converted signal is multiplied by RxIGA_n. RxIGA_n may be based on an Rx gain factor (RxG) and an Rx I amplitude adjustment (RxIAmpA_n). An Rx bandpass filter R161 may filter the Rx I amplified signal to produce an Rx I channel output signal. For an Rx Q channel, an Rx Q mixer R183 may down-convert an amplified Tx output signal (e.g., an amplified second Tx output signal from the Rx amplifier R190) using an Rx Q LO signal (e.g., LO2_Q) and an Rx Q phase adjustment (RxQPhA_n) to produce an Rx Q down-converted signal. An Rx Q gain tuner R182 amplifies the Rx Q down-converted signal to produce an Rx Q amplified signal, using an Rx Q gain adjustment factor (RxQGA_n). For example, the Rx Q down-converted signal is multiplied by RxQGA_n. RxQGA_n may be based on an Rx gain factor (RxG) and an Rx Q amplitude adjustment (RxQAmpA_n). An Rx bandpass filter R181 may filter the Rx Q amplified signal to produce an Rx Q filtered signal. A phase shifter R185 may phase shift the Rx Q filtered signal to produce an Rx Q channel output signal. The Rx combiner R155 may combine the Rx I channel output signal and the Rx Q channel output signal to generate an Rx output signal (e.g., a second Rx output signal). During a transmitter calibration mode, only one of the Rx I channel or the Rx Q channel is enabled.

In one or more examples, a Tx mixer (e.g., T163 and T183) is an up-converter, and its output may generate a form of an RF main signal and an RF image signal. In one or more examples, an Rx mixer (e.g., R163 and R183) is a downconverter, and its output may generate a form of an Rx IF main signal and an Rx IF image signal.

FIG. 6B illustrates another example of providing a phase difference between the Tx I and Tx Q channels of a transmitter and a phase difference between the Rx I and Rx Q channels of a receiver. In this example, a transmitter T145 includes two phase shifters T166 and T186. A Tx I channel includes the phase shifter T166 (e.g., providing a +45 degrees shift), and a Tx Q channel includes the phase shifter T186 (e.g., providing a −45 degrees shift) so that a phase difference between the Tx I and Tx Q channels (e.g., the phase difference between the input signals of the Tx I and Tx Q mixers T163 and T183) is 90 degrees. In one example, the splitter T155 and the phase shifters T166 and T186 may be implemented together using a polyphase filter T158.

In FIG. 6B, a receiver R145 includes two phase shifters R166 and R186. An Rx I channel includes the phase shifter R166 (e.g., providing a +45 degrees shift), and an Rx Q channel includes the phase shifter R186 (e.g., providing a −45 degrees shift) so that the phase shifters can introduce a phase difference of 90 degrees between the Rx I and Rx Q channels. In one example, phase shifters R166 and R186 and an Rx combiner R155 may be implemented together using a polyphase filter R158. Examples of the configuration, arrangements and locations of a phase shifter(s) are not limited to those shown in FIGS. 6A and 6B.

For a transmitter T145, a phase difference between a Tx I LO signal and a Tx Q LO signal is 90 degrees. The transmitter T145 may include one or more phase shifters having one or more phase shifts along one or both of the Tx I and Tx Q channels in a manner to produce the desired RF signal (e.g., an RF main signal) while minimizing the undesired RF signal (e.g., an RF image signal). For example, the one or more phase shifters (e.g., their phase shift amounts and their locations along one or both of the Tx I and Tx Q channels) may be configured in a manner that when Tx I and Tx Q output signals are combined at the output of the Tx I and Tx Q channels during a transmitter calibration mode, the Tx I and Tx Q RF main signals are added together while the Tx I and Tx Q RF image signals are subtracted from each other.

For a receiver R145, a phase difference between an Rx I LO signal and an Rx Q LO signal is 90 degrees. The receiver R145 may include one or more phase shifters having one or more phase shifts along one or both of the Rx I and Rx Q channels in a manner to produce the desired Rx IF signal (e.g., an Rx IF main signal) while minimizing the undesired Rx IF signal (e.g., an Rx IF image signal). For example, the one or more phase shifters (and their phase shift amounts and their locations) may be configured in a manner that when Rx I and Rx Q output signals are combined at the output of the Rx I and Rx Q channels during a receiver calibration mode, the Rx I and Rx Q RF main signals are added together while the Rx I and Rx Q RF image signals are subtracted from each other.

Simplified Example Signals for Transmitter and Receiver

Figure 7A:
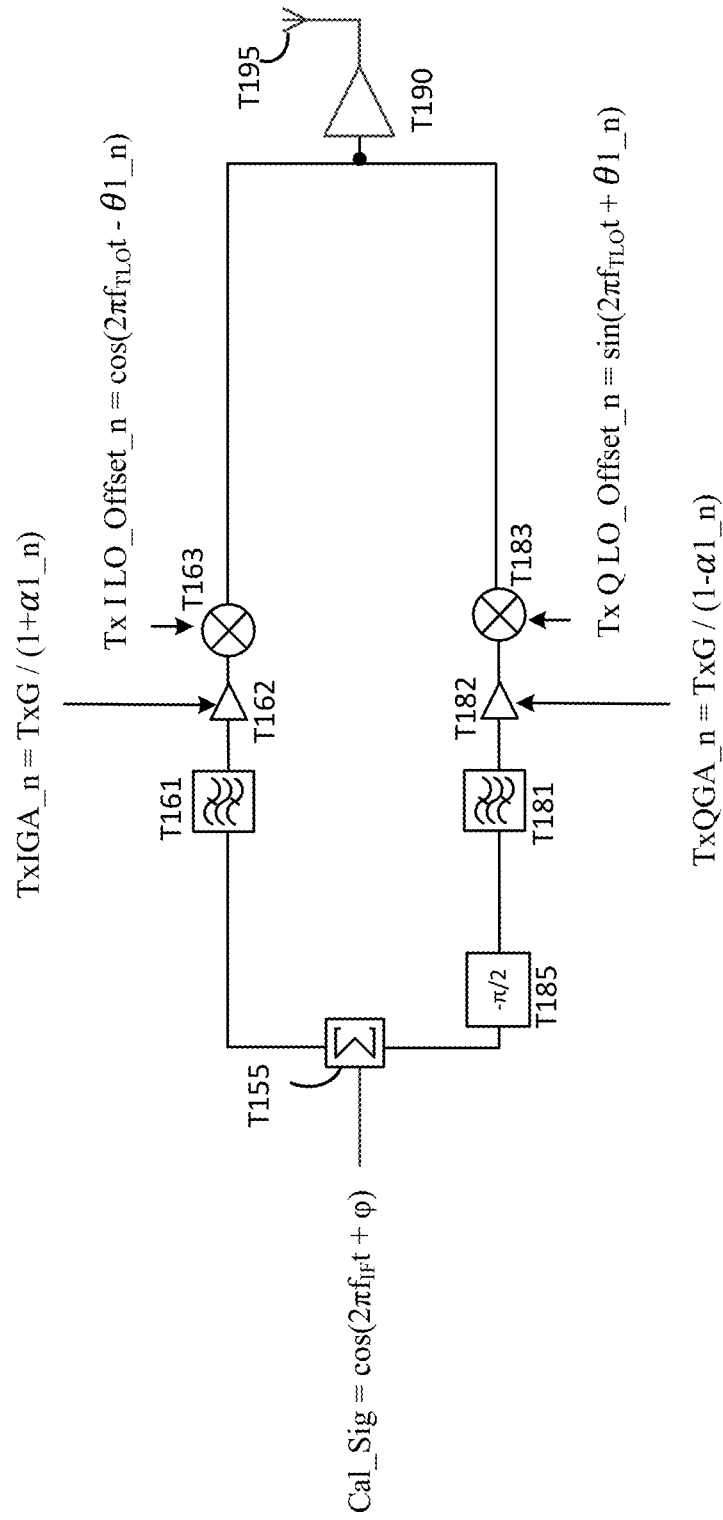
FIGS. 7A and 7B illustrate simplified example signals for a transmitter and a receiver.
Figure 7B:
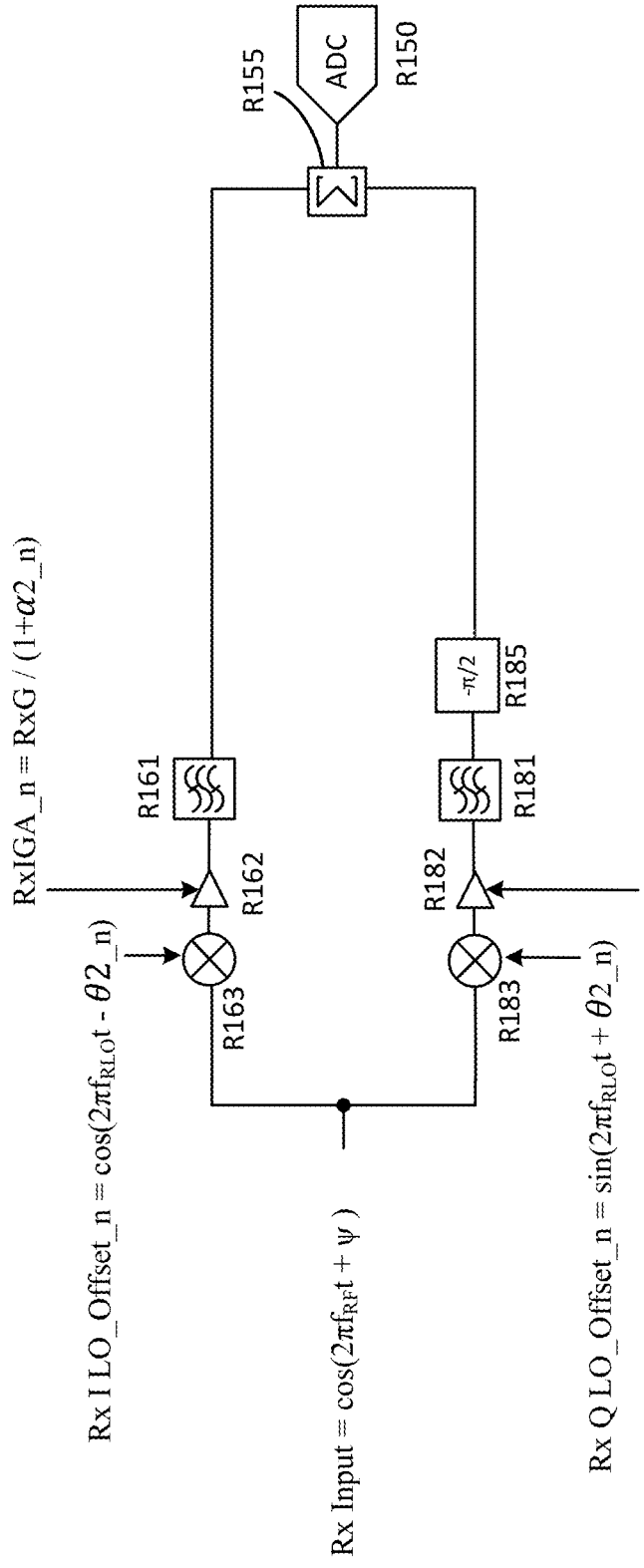

FIGS. 7A and 7B illustrate simplified example signals for a transmitter and a receiver. The equations do not show the amplitude of the signals for simplicity. FIG. 7A illustrates the following simplified example signals for a transmitter T145 during a transmitter calibration mode:

A calibration signal (e.g., from a DAC T150) may be represented as Cal_Sig=cos($2\pi f_{IF}t+\varphi$), where $f_{IF}$ is an intermediate frequency, t is time, and $\varphi$ is a phase;

A Tx I gain adjustment factor may be represented as TxIGA_n=TxG/(1+$\alpha1\_n$), where TxG is a Tx gain factor, a Tx I amplitude adjustment (TxIAmpA_n)=1/(1+$\alpha1\_n$), and $\alpha1\_n$ is a Tx amplitude offset. In this example, a Tx I gain impairment may be represented as {(1+$\alpha1\_n$)};

A Tx Q gain adjustment factor may be represented as TxQGA_n=TxG/(1−$\alpha1\_n$), where TxG is a Tx gain factor, a Tx Q amplitude adjustment (TxQAmpA_n)=1/(1−$\alpha1\_n$), and $\alpha1\_n$ is a Tx amplitude offset. In this example, a Tx Q gain impairment may be represented as {(1−$\alpha1\_n$)};

A Tx I LO signal with a Tx phase offset may be represented as: Tx I LO_Offset_n=cos($2\pi f_{TLO}t-\theta1\_n$), where $f_{TLO}$ is a Tx LO frequency (e.g., Tx I LO frequency, Tx Q LO frequency), and a Tx I phase adjustment (TxIPhA_n)=−$\theta1\_n$. In this example, a Tx I phase impairment may be represented as {+$\theta1\_n$}; and A Tx Q LO signal with a Tx phase offset may be represented as: Tx Q LO_Offset_n=sin($2\pi f_{TLO}t+\theta1\_n$), where $f_{TLO}$ is a Tx LO frequency (e.g., Tx I LO frequency, Tx Q LO frequency), and a Tx Q phase adjustment (TxQPhA_n)=+$\theta1\_n$. In this example, a Tx Q phase impairment may be represented as {−$\theta1\_n$}.

In another example, Tx I and Tx Q LO signals with a Tx phase offset may be represented as: Tx I LO_Offset_n=cos($2\pi f_{TLO}t$); and Tx Q LO_Offset_n=sin($2\pi f_{TLO}t+2\theta1\_n$), where filo is a Tx LO frequency, a Tx I phase adjustment (TxIPhA_n)=0, and a Tx Q phase adjustment (TxQPhA_n)=+$2\theta1\_n$. In this example, a Tx I phase impairment may be represented as 0, and a Tx Q phase impairment may be represented as {−$2\theta1\_n$}.

In yet another example, Tx I and Tx Q LO signals with a Tx phase offset may be represented as: Tx I LO_Offset_n=cos($2\pi f_{TLO}t-2\theta1\_n$); and Tx Q LO_Offset_n=sin($2\pi f_{TLO}t$), where $f_{TLO}$ is a Tx LO frequency, a Tx I phase adjustment (TxIPhA_n)=−$2\theta1\_n$, and a Tx Q phase adjustment (TxQPhA_n)=0. In this example, a Tx I phase impairment may be represented as {+$2\theta1\_n$}, and a Tx Q phase impairment may be represented as 0.

FIG. 7B illustrates the following simplified example signals for a receiver R145 during a receiver calibration mode:

An Rx input signal (e.g., a signal from an Rx amplifier R190; a signal derived from a second Tx output signal) may be represented as Rx Input=cos($2\pi f_{RF}t+\psi$), where $f_{RF}$ is a frequency of an RF main signal or a frequency of an RF image signal (or $f_{RF}$ is a frequency of a second RF main signal or a frequency of a second RF image signal), t is time, and $\psi$ is a phase;

An Rx I gain adjustment factor may be represented as RxIGA_n=RxG/(1+$\alpha2\_n$), where RxG is an Rx gain factor, an Rx I amplitude adjustment (RxIAmpA_n)=1/(1+$\alpha2\_n$), and $\alpha2\_n$ is an Rx amplitude offset. In this example, an Rx I gain impairment may be represented as {(1+$\alpha2\_n$)};

An Rx Q gain adjustment factor may be represented as RxQGA_n=RxG/(1−$\alpha2\_n$), where RxG is an Rx gain factor, an Rx Q amplitude adjustment (RxQAmpA_n)=1/(1−$\alpha2\_n$), and $\alpha2\_n$ is an Rx amplitude offset. In this example, an Rx Q gain impairment may be represented as {(1−$\alpha2\_n$)};

An Rx I LO signal with an Rx phase offset may be represented as: Rx I LO_Offset_n=cos($2\pi f_{RLO}t-\theta2\_n$), where $f_{RLO}$ is an Rx LO frequency (e.g., Rx I LO frequency, Rx Q LO frequency), and an Rx I phase adjustment (RxIPhA_n)=−$\theta2\_n$. In this example, an Rx I phase impairment may be represented as {+$\theta2\_n$}; and An Rx Q LO signal with an Rx phase offset may be represented as: Rx Q LO_Offset_n=sin($2\pi f_{RLO}$t+θ2_n), where $f_{RLO}$ is an Rx LO frequency (e.g., Rx I LO frequency, Rx Q LO frequency), and an Rx Q phase adjustment (RxQPhA_n)=+θ2_n. In this example, an Rx Q phase impairment may be represented as {−θ2_n}.

In another example, Rx I and Rx Q LO signals with an Rx phase offset may be represented as: Rx I LO_Offset_n=cos($2\pi f_{RLO}$t); and Rx Q LO_Offset_n=sin($2\pi f_{RLO}$t+2θ2_n), where $f_{RLO}$ is an Rx LO frequency, an Rx I phase adjustment (RxIPhA_n)=0, and an Rx Q phase adjustment (RxQPhA_n)=+2θ2_n. In this example, an Rx I phase impairment may be represented as 0, and an Rx Q phase impairment may be represented as {−2θ1_n}.

In yet another example, Rx I and Rx Q LO signals with an Rx phase offset may be represented as: Rx I LO_Offset_n=cos($2\pi f_{RLO}$t−2θ2_n); and Rx Q LO_Offset_n=sin($2\pi f_{RLO}$t), where $f_{RLO}$ is an Rx LO frequency, an Rx I phase adjustment (RxIPhA_n)=−2θ1_n, and an Rx Q phase adjustment (RxQPhA_n)=0. In this example, an Rx I phase impairment may be represented as {+2θ1_n}, and an Rx Q phase impairment may be represented as 0.

For ease of understanding, the following cosine and sine equations can be used to illustrate a simplified concept of adding Tx I and Tx Q RF main signals and minimizing Tx I and Tx Q RF image signals at the outputs of the Tx I and Tx Q channels.

$$\cos(x)\cos(y) = \frac{1}{2}[\cos(x-y) + \cos(x+y)]$$

$$\sin(x)\sin(y) = \frac{1}{2}[\cos(x-y) - \cos(x+y)]$$

For a transmitter calibration mode, x may be considered to comprise $f_{TLO}$, and y may be considered to comprise $f_{IF}$. The cos(x)cos(y) equation may be considered to represent a function of a Tx I mixer, and the sin(x)sin(y) equation may be considered to represent a function of a Tx Q mixer. As shown in the above equations, at the outputs of the Tx I and Tx Q channels, the Tx I and Tx Q RF main signals would be added together, and the Tx I and Tx Q RF image signals would be subtracted from each other.

Similarly, for a receiver calibration mode, at the outputs of the Rx I and Rx Q channels, the Rx I and Rx Q IF main signals would be added together, and the Rx I and Rx Q IF image signals would be subtracted from each other.

Tx/Rx Image Rejection Ratio and Updating Tx/Rx Amplitude and Phase Offsets

Figures 8A, 8B:
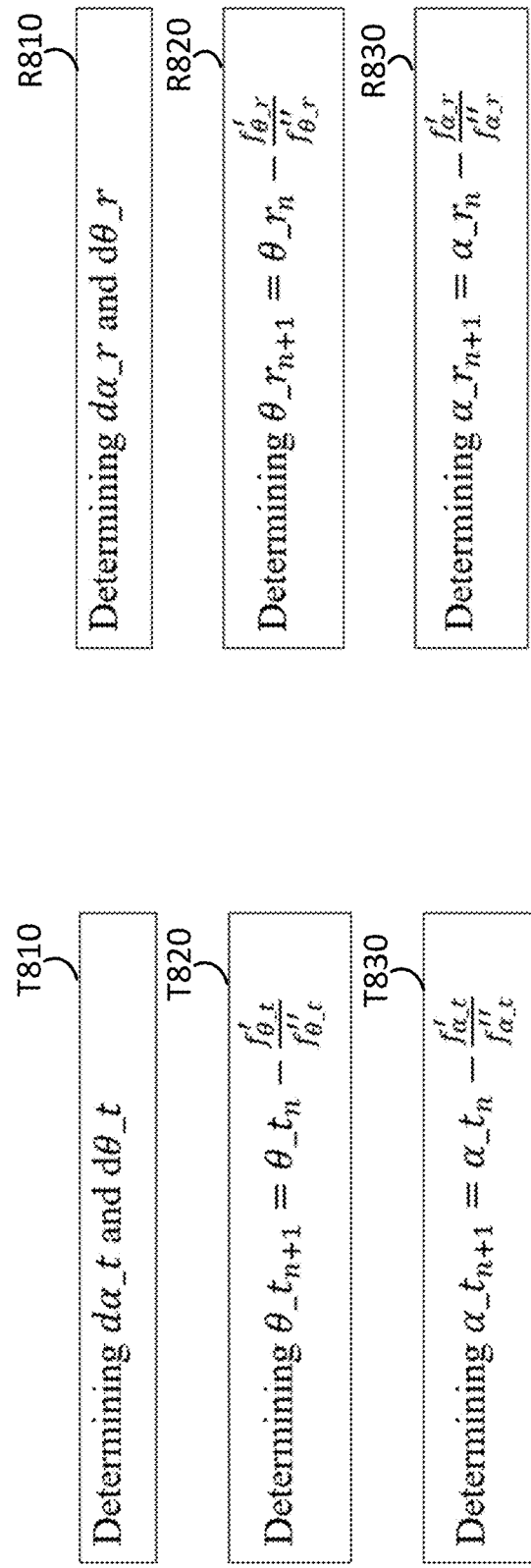
FIGS. 8A and 8B illustrate example update operations for a transceiver system.

FIGS. 8A and 8B illustrate example update operations that may be performed by a transceiver system. When the transceiver system 100 is in a transmitter calibration mode, the transceiver system may perform update operations. The update operations may include updating a Tx amplitude offset and a Tx phase offset. Referring to FIG. 8A, the update operations for the transmitter calibration mode may include some or all of the following operations:

determining dα_t and dθ_t (e.g., T810);

determining $\theta\_t_{n+1} = \theta\_t_n - \frac{f'_{\theta\_t}}{f''_{\theta\_t}}$ (e.g., T820); and determining $\alpha\_t_{n+1} = \alpha\_t_n - \frac{f'_{\alpha\_t}}{f''_{\alpha\_t}}$ (e.g., T830), wherein: $\text{IRR\_t} = \frac{(\cos\theta\_t)^2 + \alpha\_t^2(\sin\theta\_t)^2}{\alpha\_t^2(\cos\theta\_t)^2 + (\sin\theta\_t)^2} \approx \frac{1}{\alpha\_t^2 + \theta\_t^2}$; and $f(\alpha\_t, \theta\_t) = \frac{1}{\text{IRR\_t}} \approx (\alpha\_t_0 - \alpha\_t)^2 + (\theta\_t_0 - \theta\_t)^2$, and wherein:
α_$t_0$ is an initial Tx amplitude offset;
θ_$t_0$ is an initial Tx phase offset;
α_t is a Tx amplitude offset variable;
θ_t is a Tx phase offset variable;
dα_t is a tuning step of α_t;
dθ_t is a tuning step of θ_t;
IRR_t is a Tx image rejection ratio;
$f_{\theta\_t}'$ is a first partial derivative of f(α_t, θ_t) with respect to θ_t;
$f_{\theta\_t}''$ is a second partial derivative of f(α_t, θ_t) with respect to θ_t;
$f_{\alpha\_t}'$ is a first partial derivative of f(α_t, θ_t) with respect to α_t;
$f_{\alpha\_t}''$ is a second partial derivative of f(α_t, θ_t) with respect to α_t; and
n for updating the Tx amplitude offset and the Tx phase offset is a Tx iteration index, which is an integer.

When the transceiver system 100 is in a receiver calibration mode, the transceiver system may perform update operations. The update operations may include updating an Rx amplitude offset and an Rx phase offset. Referring to FIG. 8B, the update operations for the receiver calibration mode may include some or all of the following operations:

determining dα_r and dθ_r (e.g., R810);

determining $\theta\_r_{n+1} = \theta\_r_n - \frac{f'_{\theta\_r}}{f''_{\theta\_r}}$ (e.g., R820); and determining $\alpha\_r_{n+1} = \alpha\_r_n - \frac{f'_{\alpha\_r}}{f''_{\alpha\_r}}$ (e.g., R820), wherein: $\text{IRR\_r} = \frac{(\cos\theta\_r)^2 + \alpha\_r^2(\sin\theta\_r)^2}{\alpha\_r^2(\cos\theta\_r)^2 + (\sin\theta\_r)^2} \approx \frac{1}{\alpha\_r^2 + \theta\_r^2}$; and $f(\alpha\_r, \theta\_r) = \frac{1}{\text{IRR\_r}} \approx (\alpha\_r_0 - \alpha\_r)^2 + (\theta\_r_0 - \theta\_r)^2$, wherein:
α_$r_0$ is an initial Rx amplitude offset;
θ_$r_0$ is an initial Rx phase offset;
α_r is an Rx amplitude offset variable;
θ_r is an Rx phase offset variable;
dα_r is a tuning step of α_r;
dθ_r is a tuning step of θ_r;
IRR_r is an Rx image rejection ratio;
$f_{\theta\_r}'$ is a first partial derivative of f(α_r, θ_r) with respect to θ_r;
$f_{\theta\_r}''$ is a second partial derivative of f(α_r, θ_r) with respect to θ_r;
$f_{\alpha\_r}'$ is a first partial derivative of f(α_r, θ_r) with respect to α_r;
$f_{\alpha\_r}''$ is a second partial derivative of f(α_r, θ_r) with respect to α_r; and
n for updating the Rx amplitude offset and the Rx phase offset is an Rx iteration index, which is an integer. In one or more examples, an Rx iteration index is different from a Tx iteration index. A total number of iterations for a transmitter calibration mode may be different from a total number of iterations for a receiver calibration mode.

In the above equations for IRR_t, f($\alpha$_t, $\theta$_t), IRR_r, and f($\alpha$_r, $\theta$_r), the approximations may simplify and optimize the calibration process, allows the Tx amplitude offset and Tx phase offset to be computed separately, and allows the Rx amplitude offset and Rx phase offset to be computed separately. Around the IRR optimal point, the amplitude and phase contribution to IRR can be decoupled and calibrated separately. Accordingly, in one or more implementations, the amplitude and phase calibrations are decoupled. The above equations also enable the recursive calibration loops. Further, the equations shown at T820, T830, R820 and R830 utilize Newton's method of optimization. The IRR quadratic functions using Newton's method can provide fast convergence as shown in the equation below:

$$|x_{n+1} - x_*| \le \frac{1}{2}\left|\frac{f'''(x_n)}{f''(x_n)}(x_n - x_*)^2\right|$$

In the above equations, the initial Tx and Rx amplitude offsets and phase offsets may be predetermined values (e.g., predetermined values based on prior observations of amplitude and phase impairments).

Frequency Response Variation

FIGS. 9A, 9B, 10A, 10B, 10C and 13 illustrate an example process of determining a frequency response variation of an RF front end (a DFRV process). In one or more implementations, a DFRV process is performed before the calibration operations (e.g., the Tx and Rx calibration operations). In one or more examples, a DFRV process may be performed prior to the calibration operations (e.g., prior to T1210, R1210 or 1291) using a single path Tx and Rx channel setup. In one or more examples, a DFRV process is performed only once before any of the Tx and Rx calibration operations.

Figure 10A:
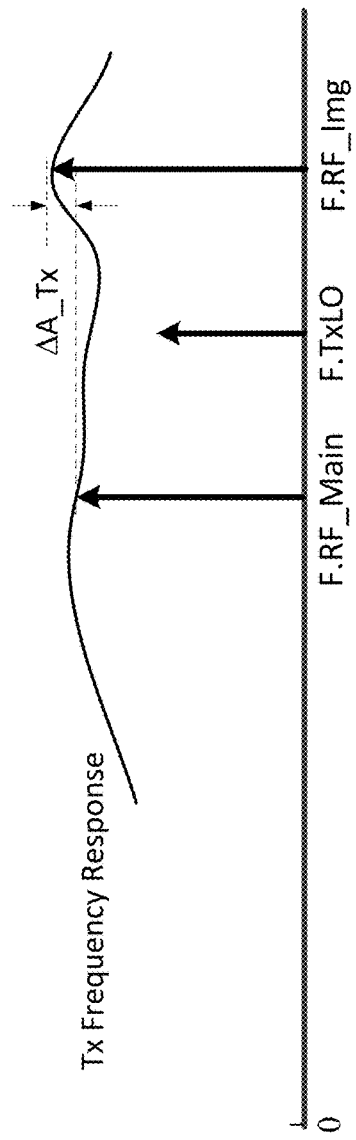
FIGS. 10A, 10B and 10C illustrate example frequency response variations of an RF front end.
Figure 10B:
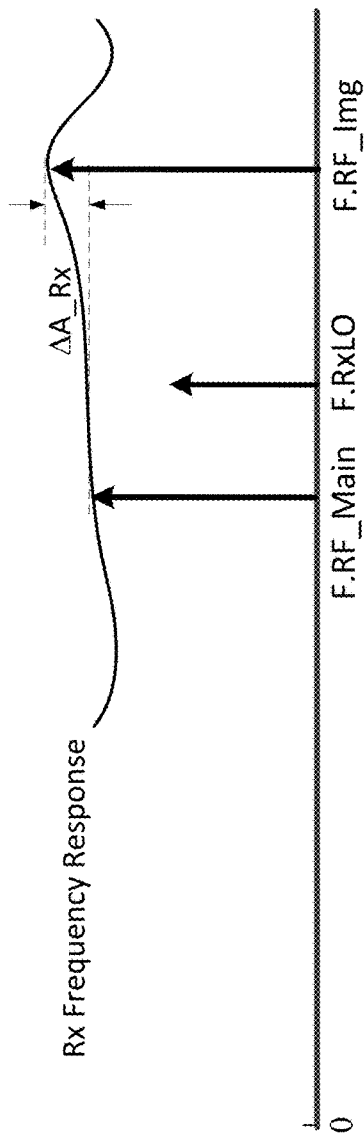
Figure 10C:
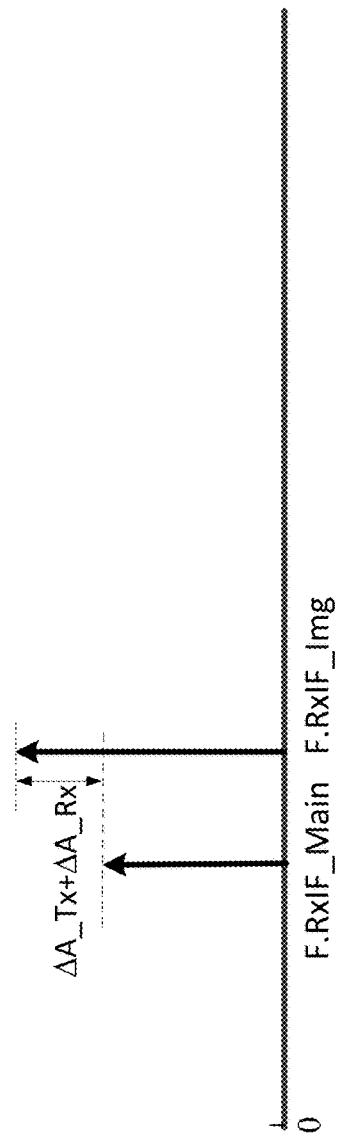
Figure 13:
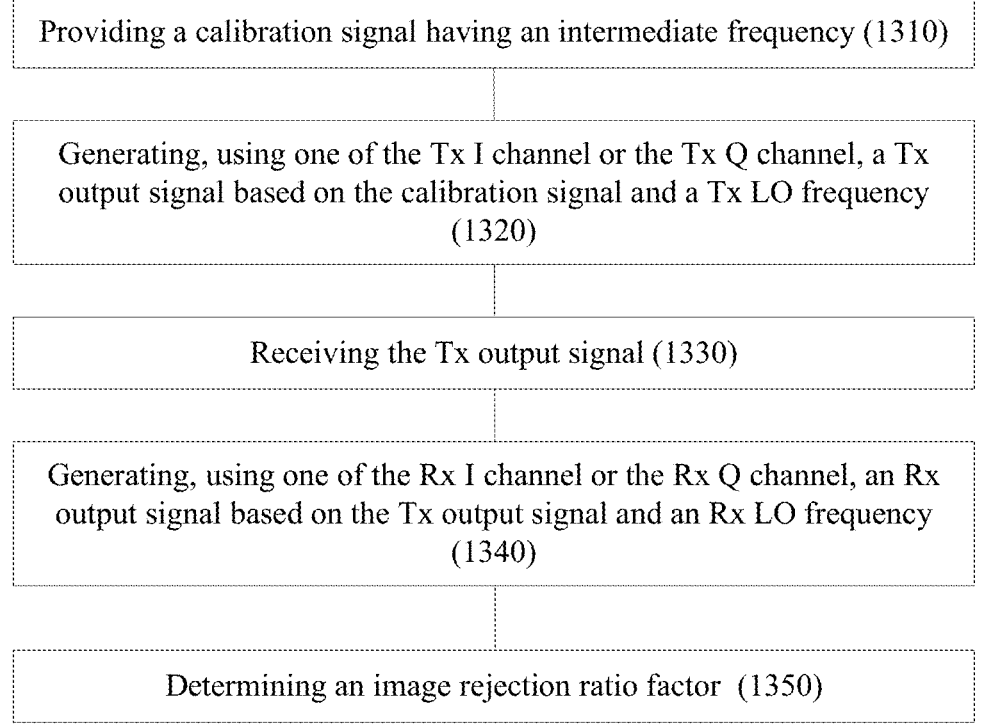
FIG. 13 illustrates an example method of determining a frequency response variation of an RF front end.

FIG. 9A illustrates an example of a transmitter and a receiver used for a DFRV process. FIG. 9B illustrates another example of a transmitter and a receiver used for a DFRV process. In one or more examples, an RF front end includes a transmitter T145 (or the components between T155 and T195). In one or more examples, an RF front end further includes a receiver R145 (or the components between R195 and R155). FIG. 10A illustrates an example of a Tx frequency response of a DFRV process. FIG. 10B illustrates an example of an Rx frequency response of a DFRV process. FIG. 10C illustrates an example of a frequency response variation of an RF front end in a DFRV process. FIG. 13 illustrates an example method of a DFRV process.

Referring to FIGS. 9A, 9B, 10A, 10B, 10C and 13, an example DFRV process may include some or all of the following.

A DFRV process uses only one of the Tx I channel or the Tx Q channel, and the other Tx channel is disabled. Furthermore, this process uses only one of the Rx I channel or the Rx Q channel, and the other Rx channel is disabled.

In one example, in FIG. 9A, the controller 130 of FIG. 1B sets the control signal D1_I to an enable signal, and thus the Tx I channel T160 is enabled and used; and the controller 130 sets the control signal D1_Q to a disable signal, and thus the Tx Q channel T180 is disabled and not used. Still referring to FIG. 9A, the controller 130 of FIG. 1B sets the control signal D2_I to an enable signal, and thus the Rx I channel R160 is enabled and used; and the controller 130 sets the control signal D2_Q to a disable signal, and thus the Rx Q channel R180 is disabled and not used.

FIG. 9B illustrates another example. In this examples, the controller 130 sets D1_Q and D2_Q to enable signals and sets D1_I and D2_I to disable signals so that the Tx Q channel T180 and Rx Q channel R180 are enabled and used, while the Tx I channel T160 and Rx I channel R160 are disabled and not used.

In yet another example (not shown), the Tx I channel T160 and Rx Q channel R180 are enabled and used, while the Tx Q channel T180 and Rx I channel R160 are disabled and not used. In yet another example (not shown), the Tx Q channel T180 and Rx I channel R160 are enabled and used, while the Tx I channel T160 and Rx Q channel R180 are disabled and not used.

For a DFRV process, a signal may take a path from a DAC T150, to a splitter T155, to one of the Tx I channel or the Tx Q channel, to a Tx amplifier T190, to a Tx antenna T195, to an Rx antenna R195, to an Rx amplifier R190, to one of the Rx I channel or the Rx Q channel, to an Rx combiner R155, and to an ADC R150.

Still referring to FIGS. 9A, 9B, 10A, 10B, 10C and 13, for a DFRV process, a DAC T150 may provide a calibration signal for the Tx I and Tx Q channels (see, e.g., 1310). The selected Tx channel (i.e., one of the Tx I channel or the Tx Q channel) may generate its output signal (including a form of an RF main signal and an RF image signal having frequencies at, for example, F.RF_Main and F.RF_Img, respectively) based on the calibration signal and the Tx LO frequency (e.g., F.TxLO) without using any Tx amplitude offset or any Tx phase offset (see, e.g., 1320). The Tx amplifier T190 may receive the output signal of the selected Tx channel and generate a Tx output signal based on the output of the selected Tx channel (see, e.g., 1320). The Tx output signal may be an amplified signal of the output of the selected Tx channel. The Tx output signal includes another form of an RF main signal and an RF image signal having frequencies at, for example, F.RF_Main and F.RF_Img, respectively. If the Tx amplifier T190 is an ideal amplifier, then the Tx amplifier T190 would not introduce a frequency response variation into its signals, and its RF main signal and its RF image signal would have the same magnitude. However, when the Tx amplifier T190 is not ideal, the Tx amplifier T190 may produce a Tx frequency response as shown in FIG. 10A, which shows a magnitude difference (e.g., $\Delta$A_Tx) between its RF main signal and its RF image signal.

Still referring to FIGS. 9A, 9B, 10A, 10B, 10C and 13, for a DFRV process, the Tx antenna T195 may transmit the Tx output signal over the air. The Rx antenna R195 may receive the Tx output signal (see, e.g., 1330) and provide it to the Rx amplifier R190 for amplification. The Rx amplifier R190 may provide its output signal to the selected Rx channel (i.e., one of the Rx I channel or the Rx Q channel). If the Rx amplifier R190 is an ideal amplifier, then the Rx amplifier R190 would not introduce a frequency response variation into the Tx output signal (e.g., its RF main signal and its RF image signal). However, when the Rx amplifier R190 is not ideal, the Rx amplifier R190 may produce an Rx frequency response as shown in FIG. 10B, which shows a magnitude difference (e.g., $\Delta$A_Rx) between its RF main signal and its RF image signal. It should be noted that for ease of understanding, FIG. 10B shows the frequency response variation introduced only by the Rx amplifier R190 (not other components such as the Tx amplifier T190).

Still referring to FIGS. 9A, 9B, 10A, 10B, 10C and 13, for a DFRV process, the selected Rx channel (i.e., one of R160 or R180) may generate its output signal based on the Tx output signal and an Rx LO frequency (e.g., F.RxLO) without using any Rx amplitude offset or any Rx phase offset (see, e.g., 1340). The Rx combiner R155 may generate an Rx output signal based on the output of the selected Rx channel (see, e.g., 1340). An Rx output signal includes an Rx IF main signal and an Rx IF image signal. The ADC R150 may convert the Rx output signal, in an analog form, to an Rx output signal, in a digital form. An Rx output signal, in a digital form, may include an Rx IF main signal and an Rx IF image signal, each in a digital form.

The controller 130 may receive the Rx IF main signal (in a digital form) and the Rx IF image signal (in a digital form) from the ADC R150 and determine a magnitude of the Rx IF main signal and a magnitude of the Rx IF image signal. The controller 130 may then determine an IRR correction factor ($\Delta A\_Tx+\Delta A\_Rx$), which comprises or is a magnitude difference between the Rx IF main signal and the Rx IF image signal, as illustrated in FIG. 10C (see, e.g., 1350). An IRR correction factor may reflect a magnitude difference amount ($\Delta A\_Tx+\Delta A\_Rx$) due to a variation of the RF front end frequency response.

When the Tx calibration operations are performed after a DFRV process, a Tx IRR may be adjusted or corrected based on or by an IRR correction factor. In one or more implementations, a Tx IRR comprises or is a magnitude difference between an Rx IF main signal and an Rx IF image signal of the Tx calibration operations, adjusted by an IRR correction factor (e.g., subtracted by the IRR correction factor). In one or more examples, a Tx IRR comprises an IRR correction factor; hence, in one or more examples, a Tx IRR comprises or is a magnitude difference between an Rx IF main signal and an Rx IF image signal of the Tx calibration operations, that is corrected with an IRR correction factor.

When the Rx calibration operations are performed after a DFRV process, an Rx IRR may be adjusted or corrected based on or by an IRR correction factor. In one or more implementations, an Rx IRR comprises or is a magnitude difference between an Rx IF main signal and an Rx IF image signal of the Rx calibration operations, adjusted by an IRR correction factor (e.g., subtracted by the IRR correction factor). In one or more examples, an Rx IRR comprises an IRR correction factor; hence, in one or more examples, an Rx IRR comprises or is a magnitude difference between an Rx IF main signal and an Rx IF image signal of the Rx calibration operations, that is corrected with an IRR correction factor.

In one or more examples of a DFRV process, the Tx LO frequency and the Rx LO frequency are different, as illustrated in FIGS. 10A and 10B. In one or more examples, a Tx LO frequency for a DFRV process (e.g., as shown in FIG. 10A) is the same as the Tx LO frequency used in the Tx and Rx calibration operations (see, e.g., FIGS. 3A, 4A and 5A). Likewise, in one or more examples, an Rx LO frequency for a DFRV process (e.g., as shown in FIG. 10B) is the same as the Rx LO frequency used in the Tx and Rx calibration operations (see, e.g., FIGS. 3B, 4C and 5C).

In one or more examples, the third calibration signal of the DFRV process is the same as the calibration signal of the Tx or Rx calibration operations in magnitude, frequency and phase. In one or more examples, the third Tx output signal, the third RF main signal, the third RF image signal, the third Rx output signal, the third Rx IF main signal and the third Rx IF image signal of a DFRV process are different from the Tx output signal, the RF main signal, the RF image signal, the Rx output signal, the Rx IF main signal and the Rx IF image signal, respectively, of the Tx and Rx calibration operations.

In one or more examples, the components used for a DFRV process (see, e.g., FIGS. 9A and 9B) are the same as the components used for the Tx and Rx calibration operations described with respect to FIGS. 1B, 6A and 6B). However, the operations of some of the components are different for the DFRV process and the Tx and Rx calibration operations. For example, for a DFRV process, (i) only one of the Tx I channel or the Tx Q channel is enabled and used, and the other Tx channel is disabled and not used, (ii) only one of the Rx I channel or the Rx Q channel is enabled and use, and the other Rx channel is disabled and not used, and (iii) none of the Tx and Rx amplitude offsets and phase offsets are used.

Iterations of Calibration Process

FIG. 11 illustrates example iterations of the calibration process. In FIG. 11, the horizontal axis represents an amplitude imbalance (in %), the vertical axis represents a phase imbalance (in degrees), and the elliptic curves represent an image rejection ratio (in dB). In this example, $\alpha_0=-7\%$, and $\theta_0=8$ degrees, where $\alpha_0$ is an initial amplitude offset, and $\theta_0$ is an initial phase offset. The calibration converges in two iterations and the resulted IRR is better than 65 dB. FIG. 11 may represent an example transmitter calibration or an example receiver calibration.

Examples and Implementations

In one or more implementations, a frequency of an RF main signal may be between 1 GHz and 100 GHz; an IF may be between 100 MHz and 20 GHz; an initial Tx amplitude offset and an initial Tx phase offset may be between +/−1% and +/−10% and between 0 and +/−10 degrees, respectively; an initial Rx amplitude offset and an initial Rx phase offset may be between +/−1% and +/−10% and between 0 and +/−10 degrees, respectively; a final Tx amplitude offset and a final Tx phase offset (meeting the Tx threshold IRR) may be between +/−0.05% and +/−0.2% and between 0 and +/−0.5 degrees, respectively; a final Rx amplitude offset and a final Rx phase offset (meeting the Rx threshold IRR) may be between +/−0.05% and +/−0.2% and between 0 and +/−0.5 degrees, respectively; a difference between an Rx LO frequency (e.g., F.RxLO) and a Tx LO frequency (e.g., F.TxLO) may be greater than 0% and up to +/−10% of an IF; a Tx threshold IRR may be 50 dB or greater; and an Rx threshold IRR may be 50 dB or greater. In one or more examples, the values of a Tx threshold IRR and an Rx threshold IRR may be determined based on a system requirement. In one or more examples, the values of a Tx threshold IRR and an Rx threshold IRR may be predetermined. For an array of elements, its size may be, for example, 8×8, 16×16, 128×128, or 1024×1024 elements. When a modulated signal is used as a calibration signal (or a test signal), the modulated signal may have a center frequency (e.g., between 1 GHz and 50 GHz) and a channel bandwidth (e.g., between 20 MHz and 3 GHz). The ranges, sizes and values described herein are examples, and the subject technology is not limited to these examples.

While FIGS. 3A through 5D illustrate examples of a frequency plan, where a frequency of an RF image signal is greater than a frequency of an RF main signal, and a frequency of an Rx IF image signal is greater than a frequency of an Rx IF main signal, the subject technology is not limited to these examples. In one or more other implementations, a frequency of an RF image signal may be less than a frequency of an RF main signal, and a frequency of an Rx IF image signal may be less than a frequency of an Rx IF main signal.

While FIGS. 6A and 6B illustrate examples of providing Tx I and Tx Q amplitude adjustments (e.g., TxIAmpA_n and TxQAmpA_n) to gain tuners (e.g., T162, T182, R162, and/or R182), in one or more other implementations, Tx I and Tx Q amplitude adjustments may be provided to mixers (e.g., T163, T183, R163, and/or R183). In one or more yet other implementations, Tx I and Tx Q amplitude adjustments may be provided to other components along the Tx I and Tx Q channels and along the Rx I and Tx Q channels.

In one or more examples, a calibration signal (e.g., from a DAC T150) for a transmitter calibration mode is the same as a calibration signal (e.g., a second calibration signal) for a receiver calibration mode in frequency, amplitude and phase. In one or more other examples, a calibration signal for a transmitter calibration mode may be different from a calibration signal for a receiver calibration mode.

In one or more examples, a Tx LO frequency, an Rx LO frequency and an IF for a transmitter calibration mode is the same as a Tx LO frequency, an Rx LO frequency and an IF for a receiver calibration mode, respectively.

In one or more examples, (i) a Tx output signal at an output node of a Tx amplifier (e.g., T190) during a transmitter calibration mode and (ii) a Tx output signal (e.g., a second Tx output signal) at the output node of the Tx amplifier during a receiver calibration mode, may be different in amplitude and phase, and may be the same in frequency.

In one or more examples, (i) an Rx output signal at an output node of an Rx combiner (e.g., R155) during a transmitter calibration mode and (ii) an Rx output signal (e.g., a second Rx output signal) at the output node of the Rx combiner during a receiver calibration mode, may be different in amplitude and phase, and may be the same in frequency.

In one or more implementations, during a transmitter calibration mode, Tx amplitude offsets, Tx phase offsets, and Tx I and Tx Q amplitude adjustments and phase adjustments may be provided to and used by a transmitter, while Rx amplitude offsets, Rx phase offsets and Rx I and Rx Q amplitude adjustments and phase adjustments are not provided to and are not used by a receiver. In one or more examples, a controller 130 may provide Tx amplitude offsets and Tx phase offsets to a Tx tuning circuit, and the Tx tuning circuit may provide Tx I and Tx Q amplitude adjustments and phase adjustments to Tx I and Tx Q channels (or their components).

In one or more implementations, during a receiver calibration mode, Rx amplitude offsets, Rx phase offsets and Rx I and Rx Q amplitude adjustments and phase adjustments may be provided to and used by a receiver, while Tx amplitude offsets, Tx phase offsets and Tx I and Tx Q amplitude adjustments and phase adjustments are not provided to and are not used by a transmitter. In one or more examples, a controller 130 may provide Rx amplitude offsets and Rx phase offsets to an Rx tuning circuit, and the Rx tuning circuit may provide Rx I and Rx Q amplitude adjustments and phase adjustments to Rx I and Rx Q channels (or their components).

In one or more examples, a Tx threshold IRR and an Rx threshold IRR are the same. In one or more other examples, a Tx threshold IRR and an Rx threshold IRR may be different.

In one or more examples, Tx I and Tx Q channels may be enabled by default, and control signals D1_I and D1_Q may be used to provide disable signals to disable one of them, for example, during a receiver calibration mode. In one or more other examples, instead of having the capability to enable and disable each of the Tx I and Tx Q channels, one of the Tx I and Tx Q channels may be always enabled for calibration, and a controller 130 may be configured to provide a disable signal to the other one of the Tx I and Tx Q channels to disable the other one of the Tx I and Tx Q channels during a receiver calibration mode.

In one or more examples, Rx I and Rx Q channels may be enabled by default, and control signals D2_I and D2_Q may be used to provide disable signals to disable one of them, for example, during a transmitter calibration mode. In one or more other examples, instead of having the capability to enable and disable each of the Rx I and Rx Q channels, one of the Rx I and Rx Q channels may be always enabled for calibration, and a controller 130 may be configured to provide a disable signal to the other one of the Rx I and Rx Q channels to disable the other one of the Rx I and Rx Q channels during a transmitter calibration mode.

In one aspect, an input signal and an output signal of a Tx amplifier T190 may have the same frequency and the same phase. As such, both the input signal and the output signals of the Tx amplifier T190 may be sometimes referred to as a Tx output signal (or a second Tx output signal). In this regard, a combined Tx channel output signal may be sometimes referred to as a Tx output signal. A Tx selected output signal may be sometimes referred to as a Tx output signal (or a second Tx output signal).

In one aspect, an input signal and an output signal of an Rx amplifier R190 may have the same frequency and the same phase. As such, both the input signal and the output signals of the Rx amplifier R190 may be sometimes referred to as a Tx output signal (or a second Tx output signal).

In one aspect, a selected channel may be sometimes referred to as an enabled channel. In one aspect, a selected Tx channel may be sometimes referred to as an enabled Tx channel. In one aspect, a selected Rx channel may be sometimes referred to as an enabled Rx channel. In one aspect, a selected signal may be sometimes referred to as an enabled signal. In one or more examples, Tx may refer to transmitter or transmit, and Rx may refer to receiver or receive. In one or more examples, the term transmit may refer to a transmitter, and the term receive may refer to a receiver. In one or more examples, a magnitude may be a magnitude in power.

In one or more examples, the signals provided between the DAC T150 and the Tx antenna T195 are differential signals, and the signals provided between the Rx antenna R195 and the ADC R150 are differential signals.

In one or more examples, the control signals (e.g., D1_I, D1_Q, D2_I, D2_Q) may be provided on other locations along a Tx I channel, a Tx Q channel, an Rx I channel and an Rx Q channel (besides the locations shown in the figures) to enable or disable the Tx I channel, the Tx Q channel, the Rx I channel and the Rx Q channel.

In one or more examples, a transmitter/receiver pair is selected from different elements of an array. In another example, a transmitter/receiver pair is selected from the same element of an array, where the Tx LO frequency for the transmitter and the Rx LO frequency for the receiver are different for the Tx and Rx calibration operations.

In one or more implementations, a transceiver system is a heterodyne transceiver or a superheterodyne transceiver having a single DAC for a transmitter and a single ADC for a receiver. In one or more implementations, the compensation (or the correction) and the calibration of the IQ impairment (or the IQ imbalance) of a transmitter and a receiver are performed in an analog domain, not in a digital domain. In one or more implementations, an amplitude calibration and a phase calibration are performed separately. In one or more implementations, a transceiver system excludes a front-end image rejection filter.

In one or more implementations, a Tx calibration is performed in an analog domain. For example, a Tx amplitude offset and a Tx phase offset are provided directly to a Tx tuning circuit (e.g., T170), which is in an analog domain, and the Tx tuning circuit may provide Tx I and Tx Q amplitude adjustments and Tx I and Tx Q phase adjustments to the Tx I and Tx Q channels that are in the analog domain. Tx I and Tx Q amplitude and phase adjustments may be analog signals.

In one or more implementations, an Rx calibration is performed in an analog domain. For example, an Rx amplitude offset and an Rx phase offset are provided directly to an Rx tuning circuit (e.g., R170), which is in an analog domain, and the Rx tuning circuit may provide Rx I and Rx Q amplitude adjustments and Rx I and Rx Q phase adjustments to the Rx I and Rx Q channels that are in the analog domain. Rx I and Rx Q amplitude and phase adjustments may be analog signals.

In one or more implementations, as the Tx/Rx calibrations use a high IF (e.g., a frequency between 1 GHz and 20 GHz) and a high frequency for an RF main signal (e.g., a frequency between 20 GHz and 100 GHz), the Tx/Rx calibrations of the subject technology performed in an analog domain are challenging as described herein, and thus calibration techniques used in a digital domain or used for low frequencies (even if used in an analog domain) are not applicable, cannot address the problems solved by one or more implementations of the subject technology, and cannot be used to realize the results achieved by one or more implementations of the subject technology described herein.

In one or more implementations, a Tx IRR and an Rx IRR are determined by a controller 130 using an Rx IF main signal and an Rx IF image signal (both in a digital form) received from an ADC R150. In one or more other examples, a Tx IRR may be determined, using an envelope detector, based on an Rx IF main signal and an Rx IF image signal (both in an analog form) received from an Rx combiner R155. In one or more other examples, an Rx IRR may be determined, using an envelope detector, based on a second Rx IF main signal and a second Rx IF image signal (both in an analog form) received from an Rx combiner R155.

One or more preferred example implementations of the subject technology are directed to self-contained IQ image rejection calibration on heterodyne transceivers in a massive millimeter-wave phase array system. One or more other example implementations are directed to self-contained IQ image rejection calibration on heterodyne transceivers in a phase array system. One or more other example implementations are directed to self-contained IQ image rejection calibration on heterodyne transceivers. The foregoing implementations are examples, and the subject technology is not limited to the foregoing. In one or more examples, a millimeter wave may include a frequency between 20 GHz and 300 GHz.

In one or more examples, a self-contained IQ image rejection calibration (including, for example, a DFRV process and Tx and Rx calibration operations) utilizes the components of a transceiver system (e.g., 100) that are the same as the components of the transceiver system (e.g., 100) used for normal operations, without using external components or devices. However, the operations of some of the components are different for the self-contained IQ image rejection calibration and the normal operations.

In one or more aspects, the self-contained IQ image rejection calibration may be performed before the normal operations (e.g., during a setup process of the transceiver system). In one or more aspects, the self-contained IQ image rejection calibration may be repeated between normal operations, as needed. For example, a process may include a self-contained IQ image rejection calibration followed by one or more normal operations, followed by a self-contained IQ image rejection calibration, and followed by one or more normal operations. This process may be repeated as needed.

In one or more aspects, a calibration mode is different from a normal mode. A calibration mode may include a mode for self-contained IQ image rejection calibration. A normal mode may include normal operations. A calibration mode may include a mode for a DFRV process, a Tx calibration mode and an Rx calibration mode.

Various Examples of Aspects and Implementations

Various examples of aspects of the disclosure are described below as clauses for convenience. These are provided as examples, and do not limit the subject technology. As an example, some of the clauses described below are illustrated with respect to the figures disclosed herein. In this regard, FIGS. 12A, 12B, and 12C illustrate example calibration operations. For instance, FIG. 12A illustrates an example of Tx calibration operations. FIG. 12B illustrates an example of Rx calibration operations. FIG. 12C illustrates another example of Tx calibration operations. FIG. 13 illustrates an example method of determining a frequency response variation of an RF front end.

In one or more implementations, an example clause provides a transceiver system (e.g., 100), comprising: a transmitter (e.g., T145); and a receiver (e.g., R145), wherein the transmitter comprises: a digital-to-analog converter (DAC) (e.g., T150); a transmitter in-phase (Tx I) channel (e.g., T160); and a transmitter quadrature (Tx Q) channel (e.g., T180) arranged in parallel with the Tx I channel, wherein the receiver comprises: a receiver (Rx) antenna (e.g., R195); a receiver in-phase (Rx I) channel (e.g., R160); a receiver quadrature (Rx Q) channel arranged (e.g., R180) in parallel with the Rx I channel; and an analog-to-digital converter (ADC) (e.g., R150), wherein the DAC is for both the Tx I channel and the Tx Q channel, wherein the ADC is for both the Rx I channel and the Rx Q channel, wherein the Tx I channel, the Tx Q channel, the Rx I channel, and the Rx Q channel are configured to operate in an analog domain, wherein when the transceiver system is in a transmitter calibration mode, the transceiver system is configured to cause performing Tx calibration operations until a Tx image rejection ratio is greater than a Tx threshold image rejection ratio, the Tx calibration operations comprising: providing, by the DAC, a calibration signal having an intermediate frequency (IF) (e.g., FIG. 12A, T1210); generating, by the transmitter using both the Tx I channel and the Tx Q channel, a Tx output signal, based on the calibration signal, a transmitter local oscillator (Tx LO) frequency, a Tx amplitude offset and a Tx phase offset, wherein the Tx output signal comprises a radio frequency (RF) main signal and an RF image signal, and wherein the RF main signal has an RF main frequency, and the RF image signal has an RF image frequency (e.g., T1220); receiving, by the Rx antenna, the Tx output signal (e.g., T1230); generating, by the receiver using one of the Rx I channel or the Rx Q channel without using the other one of the Rx I channel or the Rx Q channel, an Rx output signal, based on the Tx output signal and an Rx LO frequency, wherein the Rx output signal comprises an Rx IF main signal and an Rx IF image signal, and wherein the other one of the Rx I channel or the Rx Q channel is disabled (e.g., T1240); determining whether the Tx image rejection ratio is greater than the Tx threshold image rejection ratio (e.g., T1250); and when the Tx image rejection ratio is not greater than the Tx threshold image rejection ratio, updating the Tx amplitude offset and the Tx phase offset, and performing the Tx calibration operations (e.g., T1260), wherein the Tx image rejection ratio is based on a magnitude difference between the Rx IF main signal and the Rx IF image signal, and wherein the Tx amplitude offset and the Tx phase offset are for compensating an amplitude imbalance and a phase imbalance of the Tx I and Tx Q channels.

Any of the clauses or phases, wherein when the transceiver system is in a receiver calibration mode, the transceiver system is configured to cause performing Rx calibration operations until an Rx image rejection ratio is greater than an Rx threshold image rejection ratio, the Rx calibration operations comprising: providing, by the DAC, a second calibration signal having the IF; generating, by the transmitter using one of the Tx I channel or the Tx Q channel without using the other one of the Tx I channel or the Tx Q channel, a second Tx output signal, based on the second calibration signal and the Tx LO frequency, wherein the second Tx output signal comprises a second RF main signal and a second RF image signal, wherein the second RF main signal has the RF main frequency, and the second RF image signal has the RF image frequency, and wherein the other one of the Tx I channel or the Tx Q channel is disabled; receiving, by the Rx antenna, the second Tx output signal; generating, by the receiver using both the Rx I channel and the Rx Q channel, a second Rx output signal, based on the second Tx output signal, the Rx LO frequency, an Rx amplitude offset and an Rx phase offset, wherein the second Rx output signal comprises a second Rx IF main signal and a second Rx IF image signal; determining whether the Rx image rejection ratio is greater than the Rx threshold image rejection ratio; and when the Rx image rejection ratio is not greater than the Rx threshold image rejection ratio, updating the Rx amplitude offset and the Rx phase offset, and performing the Rx calibration operations, and wherein the Rx image rejection ratio is based on a magnitude difference between the second Rx IF main signal and the second Rx IF image signal, wherein the Rx amplitude offset and the Rx phase offset are for compensating an amplitude imbalance and a phase imbalance of the Rx I and Rx Q channels, and wherein in the transmitter calibration mode, the generation of the Rx output signal by the receiver is not based the Rx amplitude offset or the Rx phase offset, and in the receiver calibration mode, the generation of the second Rx output signal by the receiver is at least in part based the Rx amplitude offset and the Rx phase offset.

Any of the clauses or phases, wherein: the Rx LO frequency is different from the Tx LO frequency; the Rx IF main signal has a first Rx IF; the Rx IF image signal has a second Rx IF; the first Rx IF and the second Rx IF are different from the IF; and the first Rx IF is different from the second Rx IF.

Any of the clauses or phases, wherein: the Rx LO frequency is different from the Tx LO frequency; the Rx threshold image rejection ratio is the same as the Tx threshold image rejection ratio; the second calibration signal is the same as the calibration signal in magnitude, frequency and phase; and the second Tx output signal, the second RF main signal, the second RF image signal, the second Rx output signal, the second Rx IF main signal and the second Rx IF image signal are different from the Tx output signal, the RF main signal, the RF image signal, the Rx output signal, the Rx IF main signal and the Rx IF image signal, respectively.

Any of the clauses or phases, comprising: an array of elements (e.g., 140), wherein: each element (e.g., E00, E01, etc.) of the array comprises a respective transmitter and a respective receiver; the transmitter is within one element of the array; the receiver is within another element of the array; and the another element is different from the one element.

Any of the clauses or phases, wherein: the Tx I channel comprises a Tx I gain tuner (e.g., T162) and a Tx I mixer (e.g., T163); the Tx Q channel comprises a Tx Q gain tuner (e.g., T182) and a Tx Q mixer (e.g., T183); the Rx I channel comprises an Rx I mixer (e.g., R163) and an Rx I gain tuner (e.g., R162); the Rx Q channel comprises an Rx Q mixer (e.g., R183) and an Rx Q gain tuner (e.g., R182); the transmitter comprises a Tx amplifier (e.g., T190) coupled to the Tx I and Tx Q channels; the transmitter comprises a Tx antenna (e.g., T195) coupled to the Tx amplifier; and the receiver comprises an Rx combiner coupled to the Rx I and Rx Q channels and located after the Rx I and Rx Q channels and before the ADC, and wherein when the transceiver system is in the transmitter calibration mode: the Tx I gain tuner is configured to amplify its input signal based on a Tx gain value and the Tx amplitude offset to generate a Tx I amplified signal; the Tx I mixer is configured to up-convert the Tx I amplified signal based on a Tx I LO signal (e.g., LO1_I) and the Tx phase offset and configured to generate a Tx I output signal comprising a Tx I RF main signal and a Tx I RF image signal; the Tx Q gain tuner is configured to amplify its input signal based on the Tx gain value and the Tx amplitude offset to generate a Tx Q amplified signal; the Tx Q mixer is configured to up-convert the Tx Q amplified signal based on a Tx Q LO signal (e.g., LO1_Q) and the Tx phase offset and configured to generate a Tx Q output signal comprising a Tx Q RF main signal and a Tx Q RF image signal; the input signal of the Tx I gain tuner is derived from the calibration signal; the input signal of the Tx Q gain tuner is derived from the calibration signal; a phase difference between the input signal of the Tx I gain tuner and the input signal of the Tx Q gain tuner is 90 degrees; a phase difference between the Tx I amplified signal and the Tx Q amplified signal is 90 degrees; a phase difference between the Tx I LO signal and the Tx Q LO signal is 90 degrees; when the Tx I mixer and the Tx Q mixer output the Tx I output signal and the Tx Q output signal, respectively, the transmitter is configured to combine the Tx I output signal and the Tx Q output signal to produce a combined Tx channel output signal, by adding the Tx I RF main signal and the Tx Q RF main signal, and by subtracting one of the Tx I RF image signal or the Tx Q RF image signal from the other one of the Tx I RF image signal or the Tx Q RF image signal; the Tx amplifier is configured to amplify the combined Tx channel output signal to produce the Tx output signal; the Tx antenna is configured to transmit the Tx output signal; the one of the Rx I channel or the Rx Q channel selected for the generation of the Rx output signal comprises an Rx selected mixer and an Rx selected gain tuner, the Rx selected mixer is one of the Rx I mixer or the Rx Q mixer within the one of the Rx I channel or the Rx Q channel, the Rx selected gain tuner is one of the Rx I gain tuner or the Rx Q gain tuner within the one of the Rx I channel or the Rx Q channel, an Rx selected LO signal for the one of the Rx I channel or the Rx Q channel is one of an Rx I LO signal or an Rx Q LO signal, and each of the Rx selected LO signal, the Rx I LO signal and the Rx Q LO signal has the Rx LO frequency; the Rx selected mixer is configured to down-convert its input signal based on the Rx selected LO signal and configured to generate an Rx down-converted signal; the Rx selected gain tuner is configured to amplify the Rx down-converted signal based on an Rx gain value to generate an Rx selected amplified signal; the Rx combiner is configured to receive a signal derived from the Rx selected amplified signal and configured to provide the Rx output signal to the ADC; and the input signal of the Rx selected mixer is derived from the Tx output signal.

Any of the clauses or phases, wherein when the transceiver system is in the receiver calibration mode: the one of the Tx I channel or the Tx Q channel selected for the generation of the second Tx output signal comprises a Tx selected gain tuner (e.g., T162 or T182) and a Tx selected mixer (e.g., T163 or T183), the Tx selected gain tuner is one of the Tx I gain tuner or the Tx Q gain tuner within the one of the Tx I channel or the Tx Q channel, and the Tx selected mixer is one of the Tx I mixer or the Tx Q mixer within the one of the Tx I channel or the Tx Q channel; the Tx selected gain tuner is configured to amplify its input signal based on a Tx gain value to generate a Tx selected amplified signal; the Tx selected mixer is configured to up-convert the Tx selected amplified signal based on a Tx selected LO signal (e.g., LO1_I) and configured to generate a Tx selected output signal comprising a Tx selected RF main signal and a Tx selected RF image signal; the input signal of the Tx selected gain tuner is derived from the calibration signal; the Tx selected RF main signal has the RF main frequency, and the Tx selected RF image signal has the RF image frequency; the Tx amplifier is configured to amplify the Tx selected output signal to produce the second Tx output signal; the Tx antenna is configured to transmit the second Tx output signal; the Rx I mixer is configured to down-convert its input signal based on the Rx I LO signal and the Rx phase offset and configured to generate an Rx I down-converted signal; the Rx I gain tuner is configured to amplify the Rx I down-converted signal based on the Rx gain value and the Rx amplitude offset to generate an Rx I amplified signal; the Rx Q mixer is configured to down-convert its input signal based on the Rx Q LO signal and the Rx phase offset and configured to generate an Rx Q down-converted signal; the Rx Q gain tuner is configured to amplify the Rx Q down-converted signal based on the Rx gain value and the Rx amplitude offset to generate an Rx Q amplified signal; the input signal of the Rx I mixer is derived from the second Tx output signal; the input signal of the Rx Q mixer is derived from the second Tx output signal; a phase difference between the Rx I LO signal and the Rx Q LO signal is 90 degrees; the Rx combiner is configured to receive its first input signal from the Rx I channel and its second input signal from the Rx Q channel; the first input signal of the Rx combiner is derived from the Rx I amplified signal and comprises an Rx I IF main signal and an Rx I IF image signal; the second input signal of the Rx combiner is derived from the Rx Q amplified signal and comprises an Rx Q IF main signal and an Rx Q IF image signal; the receiver is configured to provide a phase difference between the first and second input signals of the Rx combiner in a manner to allow the Rx combiner to combine its first and second input signals to produce the second Rx output signal, by adding the Rx I IF main signal and the Rx Q IF main signal, and by subtracting one of the Rx I IF image signal or the Rx Q IF image signal from the other one of the Rx I IF image signal or the Rx Q IF image signal; and the Rx combiner is configured to provide the second Rx output signal to the ADC. The transceiver system of claim 1, wherein: determining whether the Tx image rejection ratio is greater than the Tx threshold image rejection ratio comprises: determining a magnitude of the Rx IF main signal and a magnitude of the Rx IF image signal; and determining whether a difference between the magnitude of the Rx IF main signal and the magnitude of the Rx IF image signal is greater than the Tx threshold image rejection ratio.

Any of the clauses or phases, wherein: determining whether the Rx image rejection ratio is greater than the Rx threshold image rejection ratio comprises: determining a magnitude of the second Rx IF main signal and a magnitude of the second Rx IF image signal; and determining whether a difference between the magnitude of the second Rx IF main signal and the magnitude of the second Rx IF image signal is greater than the Rx threshold image rejection ratio.

Any of the clauses or phases, wherein: updating the Tx amplitude offset and the Tx phase offset comprises: determining a next Tx amplitude offset based on the Tx amplitude offset, a first partial derivative of a Tx function with respect to a Tx amplitude offset variable, and a second partial derivative of the Tx function with respect to the Tx amplitude offset variable; and determining a next Tx phase offset based on the Tx phase offset, a first partial derivative of the Tx function with respect to a Tx phase offset variable, and a second partial derivative of the Tx function with respect to the Tx phase offset variable; updating the Rx amplitude offset and the Rx phase offset comprises: determining a next Rx amplitude offset based on the Rx amplitude offset, a first partial derivative of an Rx function with respect to an Rx amplitude offset variable, and a second partial derivative of the Rx function with respect to the Rx amplitude offset variable; and determining a next Rx phase offset based on the Rx phase offset, a first partial derivative of the Rx function with respect to an Rx phase offset variable, and a second partial derivative of the Rx function with respect to the Rx phase offset variable; the Tx function is based on an initial Tx amplitude offset, the Tx amplitude offset variable, an initial Tx phase offset and the Tx phase offset variable; and the Rx function is based on an initial Rx amplitude offset, the Rx amplitude offset variable, an initial Rx phase offset and the Rx phase offset variable.

Any of the clauses or phases, wherein updating the Tx amplitude offset and the Tx phase offset comprises:

determining $d\alpha\_t$ and $d\theta\_t$;

determining $\theta\_t_{n+1} = \theta\_t_n - \dfrac{f'_{\theta\_t}}{f''_{\theta\_t}}$; and determining $\alpha\_t_{n+1} = \alpha\_t_n - \dfrac{f'_{\alpha\_t}}{f''_{\alpha\_t}}$, wherein: $IRR\_t = \dfrac{(\cos\theta\_t)^2 + \alpha\_t^2(\sin\theta\_t)^2}{\alpha\_t^2(\cos\theta\_t)^2 + (\sin\theta\_t)^2} \approx \dfrac{1}{\alpha\_t^2 + \theta\_t^2}$; and $f(\alpha\_t, \theta\_t) = \dfrac{1}{IRR\_t} \approx (\alpha\_t_0 - \alpha\_t)^2 + (\theta\_t_0 - \theta\_t)^2$, and wherein: $\alpha\_t_0$ is an initial Tx amplitude offset; $\theta\_t_0$ is an initial Tx phase offset; $\alpha\_t$ is a Tx amplitude offset variable; $\theta\_t$ is a Tx phase offset variable; $d\alpha\_t$ is a tuning step of $\alpha\_t$; $d\theta\_t$ is a tuning step of $\theta\_t$; $IRR\_t$ is the Tx image rejection ratio; $f'_{\theta\_t}$ is a first partial derivative of $f(\alpha\_t, \theta\_t)$ with respect to $\theta\_t$; $f''_{\theta\_t}$ is a second partial derivative of $f(\alpha\_t, \theta\_t)$ with respect to $\theta\_t$; $f'_{\alpha\_t}$ is a first partial derivative of $f(\alpha\_t, \theta\_t)$ with respect to $\alpha\_t$; $f''_{\alpha\_t}$ is a second partial derivative of f(α_t, θ_t) with respect to α_t; and n for updating the Tx amplitude offset and the Tx phase offset is a Tx iteration index, and wherein updating the Rx amplitude offset and the Rx phase offset comprises:

determining $d\alpha\_r$ and $d\theta\_r$;

determining $\theta\_r_{n+1} = \theta\_r_n - \frac{f'_{\theta\_r}}{f''_{\theta\_r}}$; and determining $\alpha\_r_{n+1} = \alpha\_r_n - \frac{f'_{\alpha\_r}}{f''_{\alpha\_r}}$, wherein: $IRR\_r = \frac{(\cos\theta\_r)^2 + \alpha\_r^2(\sin\theta\_r)^2}{\alpha\_r^2(\cos\theta\_r)^2 + (\sin\theta\_r)^2} \approx \frac{1}{\alpha\_r^2 + \theta\_r^2}$; and $f(\alpha\_r, \theta\_r) = \frac{1}{IRR\_r} \approx (\alpha\_r_0 - \alpha\_r)^2 + (\theta\_r_0 - \theta\_r)^2$, wherein: $\alpha\_r_0$ is an initial Rx amplitude offset; $\theta\_r_0$ is an initial Rx phase offset; $\alpha\_r$ is an Rx amplitude offset variable; $\theta\_r$ is an Rx phase offset variable; $d\alpha\_r$ is a tuning step of $\alpha\_r$; $d\theta\_r$ is a tuning step of $\theta\_r$; $IRR\_r$ is the Rx image rejection ratio; $f_{\theta\_r}'$ is a first partial derivative of $f(\alpha\_r, \theta\_r)$ with respect to $\theta\_r$; $f_{\theta\_r}''$ is a second partial derivative of $f(\alpha\_r, \theta\_r)$ with respect to $\theta\_r$; $f_{\alpha\_r}'$ is a first partial derivative of $f(\alpha\_r, \theta\_r)$ with respect to $\alpha\_r$; $f_{\alpha\_r}''$ is a second partial derivative of $f(\alpha\_r, \theta\_r)$ with respect to $\alpha\_r$; and n for updating the Rx amplitude offset and the Rx phase offset is an Rx iteration index.

Any of the clauses or phases, wherein when the transceiver system is in a calibration mode, the transceiver system is configured to cause performing a process of determining a frequency response variation (a DFRV process) that comprises: providing, by the DAC, a third calibration signal having the IF (e.g., 1310 of FIG. 13); generating, by the transmitter using one of the Tx I channel or the Tx Q channel, a third Tx output signal, based on the third calibration signal and the Tx LO frequency without using the Tx amplitude offset or the Tx phase offset, wherein the third Tx output signal comprises a third RF main signal and a third RF image signal, wherein the third RF main signal has the RF main frequency, and the third RF image signal has the RF image frequency, and wherein the other one of the Tx I channel or the Tx Q channel is disabled (e.g., 1320); receiving, by the Rx antenna, the third Tx output signal (e.g., 1330); generating, by the receiver using one of the Rx I channel or the Rx Q channel, a third Rx output signal, based on the third Tx output signal and the Rx LO frequency without using an Rx amplitude offset or an Rx phase offset, wherein the third Rx output signal comprises a third Rx IF main signal and a third Rx IF image signal, and wherein the other one of the Rx I channel or the Rx Q channel is disabled (e.g., 1340); and determining an image rejection ratio (IRR) correction factor, wherein the IRR correction factor comprises a magnitude difference between the third Rx IF main signal and the third Rx IF image signal (e.g., 1350), and wherein the Tx image rejection ratio is adjusted based on or by the IRR correction factor.

Any of the clauses or phases, wherein the Rx image rejection ratio is adjusted based on or by the IRR correction factor.

Any of the clauses or phases, wherein the DFRV process is performed prior to performing the Tx calibration operations and prior to performing the Rx calibration operations.

Any of the clauses or phases, wherein: at least one of the Tx I and Tx Q channels is disableable; and at least one of the Rx I and Rx Q channels is disableable.

Any of the clauses or phases, wherein the Tx I channel comprises a Tx I bandpass filter (e.g., T161), a Tx I gain tuner (e.g., T162) and a Tx I mixer (e.g., T163) sequentially, wherein the Tx Q channel comprises a Tx Q bandpass filter (e.g., T181), a Tx Q gain tuner (e.g., T182) and a Tx Q mixer (e.g., T184) sequentially, wherein the transmitter comprises: a splitter located after the DAC and before the Tx I channel and the Tx Q channel; one or more phase shifters in one or both of the Tx I and Tx Q channels to produce a 90-degree phase difference between an input signal of the Tx I bandpass filter and an input signal of the Tx Q bandpass filter; a Tx tuning circuit (e.g., T170) coupled to the Tx I and Tx Q gain tuners and the Tx I and Tx Q mixers; a Tx amplifier (e.g., T190) coupled to outputs of the Tx I and Tx Q channels; and a Tx antenna (e.g., T195) coupled to the Tx amplifier, the Tx antenna configured to transmit the Tx output signal, wherein the Rx I channel comprises an Rx I mixer, an Rx I gain tuner and an Rx I bandpass filter sequentially, wherein the Rx Q channel comprises an Rx Q mixer, an Rx Q gain tuner and an Rx Q bandpass filter sequentially, wherein the receiver comprises: an Rx amplifier located after the Rx antenna and located before the Rx I and Rx Q mixers; an Rx tuning circuit coupled to the Rx I and Rx Q mixers and the Rx I and Rx Q gain tuners; one or more phase shifters in one or both of the Rx I and Rx Q channels to produce a 90-degree phase difference between an output signal of the Rx I channel and an output signal of the Rx Q channel; and an Rx combiner coupled to the Rx I channel, Rx Q channel and the ADC, and wherein the transceiver system comprises one or more controllers (e.g., 130) configured to cause: providing a Tx I LO signal (e.g., LO1_I) for the Tx I channel, a Tx Q LO signal (e.g., LO1_Q) for the Tx Q channel, an Rx I LO signal (e.g., LO2_I) for the Rx I channel, and an Rx Q LO signal (e.g., LO2_Q) for the Rx Q channel; disabling the other one of the Tx I channel or the Tx Q channel when the transceiver system is in the receiver calibration mode; disabling the other one of the Rx I channel or the Rx Q channel when the transceiver system is in the transmitter calibration mode; determining whether the Tx image rejection ratio is greater than the Tx threshold image rejection ratio; determining whether the Rx image rejection ratio is greater than the Rx threshold image rejection ratio; providing the Tx amplitude offset and the Tx phase offset to the Tx tuning circuit; and providing the Rx amplitude offset and the Rx phase offset to the Rx tuning circuit.

In one or more implementations, an example clause provides a transceiver system (e.g., 100), comprising: a transmitter (e.g., T145); and a receiver (e.g., R145), wherein the transmitter comprises: a digital-to-analog converter (DAC); a transmitter in-phase (Tx I) channel; and a transmitter quadrature (Tx Q) channel, wherein the receiver comprises: a receiver in-phase (Rx I) channel; a receiver quadrature (Rx Q) channel; and an analog-to-digital converter (ADC), wherein the DAC is for both the Tx I channel and the Tx Q channel, wherein the ADC is for both the Rx I channel and the Rx Q channel, wherein the Tx I channel, the Tx Q channel, the Rx I channel, and the Rx Q channel are configured to operate in an analog domain, wherein when the transceiver system is in a receiver calibration mode, the transceiver system is configured to cause performing Rx calibration operations, the Rx calibration operations comprising: providing a calibration signal having an intermediate frequency (IF) (e.g., FIG. 12B, R1210); generating, by the transmitter using one of the Tx I channel or the Tx Q channel, a Tx output signal, based on the calibration signal and a transmitter local oscillator (Tx LO) frequency, wherein the other one of the Tx I channel or the Tx Q channel is disabled (e.g., R1220); receiving, by the receiver, the Tx output signal (e.g., R1230); generating, by the receiver using both the Rx I channel and the Rx Q channel, an Rx output signal, based on the Tx output signal, an Rx LO frequency, an Rx amplitude offset and an Rx phase offset, wherein the Rx output signal comprises an Rx IF main signal and an Rx IF image signal (e.g., R1240); determining whether an Rx image rejection ratio is greater than an Rx threshold image rejection ratio (e.g., R1250); and when the Rx image rejection ratio is not greater than the Rx threshold image rejection ratio, updating the Rx amplitude offset and the Rx phase offset, and performing the Rx calibration operations (e.g., R1260), and wherein the Rx image rejection ratio is based on a magnitude difference between the Rx IF main signal and the Rx IF image signal, wherein the Rx amplitude offset and the Rx phase offset are for compensating an imbalance of the Rx I and Rx Q channels.

Any of the clauses or phases, wherein when the transceiver system is in a transmitter calibration mode, the transceiver system is configured to cause performing Tx calibration operations, the Tx calibration operations comprising: generating, by the transmitter using both the Tx I channel and the Tx Q channel, a Tx output signal, based on a second calibration signal, the Tx LO frequency, a Tx amplitude offset and a Tx phase offset; and generating, by the receiver using one of the Rx I channel or the Rx Q channel, a second Rx output signal, based on the Tx output signal and the Rx LO frequency, wherein the second Rx output signal comprises a second Rx IF main signal and a second Rx IF image signal, and wherein the other one of the Rx I channel or the Rx Q channel is disabled; when a Tx image rejection ratio is not greater than a Tx threshold image rejection ratio, updating the Tx amplitude offset and the Tx phase offset, and performing the Tx calibration operations, wherein the Tx image rejection ratio is based on a magnitude difference between the second Rx IF main signal and the second Rx IF image signal, and wherein the Tx amplitude offset and the Tx phase offset are for compensating an imbalance of the Tx I and Tx Q channels.

Any of the clauses or phases, wherein: the Rx LO frequency is different from the Tx LO frequency; each of the Rx IF main signal and the second Rx IF main signal has a first Rx IF; each of the Rx IF image signal and the second Rx IF image signal has a second Rx IF; the first Rx IF and the second Rx IF are different from the IF; and the first Rx IF is different from the second Rx IF.

In one or more implementations, an example clause provides a transceiver system (e.g., 100), comprising: a plurality of elements (e.g., 140), wherein each (e.g., E00, E01, etc.) of the plurality of elements comprises a transmitter (e.g., T145) and a receiver (e.g., R145); wherein each transmitter of the plurality of elements comprises: a digital-to-analog converter (DAC); a transmitter in-phase (Tx I) channel; and a transmitter quadrature (Tx Q) channel, wherein each receiver of the plurality of elements comprises: a receiver in-phase (Rx I) channel; a receiver quadrature (Rx Q) channel; and an analog-to-digital converter (ADC), wherein the DAC is for both the Tx I channel and the Tx Q channel, wherein the ADC is for both the Rx I channel and the Rx Q channel, wherein the Tx I channel, the Tx Q channel, the Rx I channel, and the Rx Q channel are configured to operate in an analog domain, wherein when the transceiver system is in a transmitter calibration mode, the transceiver system is configured to cause: determining a Tx amplitude offset and a Tx phase offset for the transmitter of a first one of the plurality of elements, using both the Tx I channel and the Tx Q channel and using one of the Rx I channel or the Rx Q channel, wherein the other one of the Rx I channel or the Rx Q channel is disabled (e.g., FIG. 12C, 1291), wherein the Tx I and the Tx Q channels are within the transmitter of the first one of the plurality of elements, wherein the Rx I and Rx Q channels are within the receiver of a second one of the plurality of elements, wherein the second one is different from the first one, and wherein the Tx amplitude offset and the Tx phase offset are for compensating an imbalance of the Tx I and Tx Q channels of the transmitter of the first one of the plurality of elements (e.g., 1293).

Any of the clauses or phases, wherein when the transceiver system is in a receiver calibration mode, the transceiver system is configured to cause: determining an Rx amplitude offset and an Rx phase offset for the receiver of the second one of the plurality of elements, using one of the Tx I channel or the Tx Q channel and using both the Rx I channel and the Rx Q channel, wherein the other one of the Tx I channel or the Tx Q channel is disabled, and wherein the Rx amplitude offset and the Rx phase offset are for compensating an imbalance of the Rx I and Rx Q channels of the receiver of the second one of the plurality of elements.

Any of the clauses or phases, wherein: the transmitter of the first one of the plurality of elements is configured to use a transmitter local oscillator (Tx LO) frequency for up-conversion; the receiver of the second one of the plurality of elements is configured to use an Rx LO frequency for down-conversion; and the Rx LO frequency is different from the Tx LO frequency.

Any of the clauses or phases, wherein: at least one of the Tx I and Tx Q channels is disableable; and at least one of the Rx I and Rx Q channels is disableable.

In one or more aspects, examples of additional clauses are described as follows. A method comprising one or more methods, operations or portions thereof described herein. An apparatus comprising one or more memories or registers (e.g., 135) and one or more controllers (e.g., 130, 132), the one or more controllers configured to cause performing one or more methods, operations or portions thereof described herein. An apparatus comprising means (e.g., 100, components thereof) adapted for performing one or more methods, operations or portions thereof described herein. A processor (e.g., 130, 132) comprising modules for carrying out one or more methods, operations or portions thereof described herein. A hardware apparatus comprising circuits (e.g., 100, components thereof) configured to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims in this subject disclosure. In one aspect, a clause may depend from any other clauses, sentences or phrases in this subject disclosure.

To illustrate the interchangeability of hardware and software, items such as the various illustrative blocks, modules, components, methods, operations, instructions, and algorithms have been described generally in terms of their functionality. Whether such functionality is implemented as hardware, software (or firmware) or a combination of hardware and software (or firmware) depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements. Furthermore, while the subject disclosure may provide many example ranges and values, these are non-limiting examples, and other ranges and values are within the scope of the subject technology.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" refers to only A, only B, or only C; any combination of A, B, and C; and/or at least one of each of A, B, and C.

In one aspect, the blocks or components described in this present disclosure (e.g., components in FIGS. 1A, 1B, 2A-2D, 6A and 6B) may be implemented in circuits and integrated circuits including transistors, such as (i) one or more bipolar junction transistors (BJTs), which may refer to any of a variety of multi-terminal transistors generally operating on the principal of carrying current using both electrons and holes, including, but not limited to, an n-p-n BJT and a p-n-p BJT, and/or (ii) one or more field effect transistors (FETs), which may refer to any of a variety of multi-terminal transistors generally operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET). Unless otherwise mentioned, various configurations described in the present disclosure may be implemented on a Silicon, Silicon-Germanium (SiGe), Gallium Arsenide (GaAs), Indium Phosphide (InP) or Indium Gallium Phosphide (InGaP) substrate, or any other suitable substrate.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A transceiver system, comprising:
a transmitter; and
a receiver,
wherein the transmitter comprises:
a digital-to-analog converter (DAC);
a transmitter in-phase (Tx I) channel; and
a transmitter quadrature (Tx Q) channel arranged in parallel with the Tx I channel,
wherein the receiver comprises:
a receiver (Rx) antenna;
a receiver in-phase (Rx I) channel;
a receiver quadrature (Rx Q) channel arranged in parallel with the Rx I channel; and
an analog-to-digital converter (ADC),
wherein the DAC is for both the Tx I channel and the Tx Q channel,
wherein the ADC is for both the Rx I channel and the Rx Q channel,
wherein the Tx I channel, the Tx Q channel, the Rx I channel, and the Rx Q channel are configured to operate in an analog domain,
wherein when the transceiver system is in a transmitter calibration mode, the transceiver system is configured to cause performing Tx calibration operations until a Tx image rejection ratio is greater than a Tx threshold image rejection ratio, the Tx calibration operations comprising:
providing, by the DAC, a calibration signal having an intermediate frequency (IF);
generating, by the transmitter using both the Tx I channel and the Tx Q channel, a Tx output signal, based on the calibration signal, a transmitter local oscillator (Tx LO) frequency, a Tx amplitude offset and a Tx phase offset, wherein the Tx output signal comprises a radio frequency (RF) main signal and an RF image signal, and wherein the RF main signal has an RF main frequency, and the RF image signal has an RF image frequency;
receiving, by the Rx antenna, the Tx output signal,
generating, by the receiver using one of the Rx I channel or the Rx Q channel without using the other one of the Rx I channel or the Rx Q channel, an Rx output signal, based on the Tx output signal and an Rx LO frequency, wherein the Rx output signal comprises an Rx IF main signal and an Rx IF image signal, and wherein the other one of the Rx I channel or the Rx Q channel is disabled;
determining whether the Tx image rejection ratio is greater than the Tx threshold image rejection ratio; and
when the Tx image rejection ratio is not greater than the Tx threshold image rejection ratio, updating the Tx amplitude offset and the Tx phase offset, and performing the Tx calibration operations,
wherein the Tx image rejection ratio is based on a magnitude difference between the Rx IF main signal and the Rx IF image signal, and
wherein the Tx amplitude offset and the Tx phase offset are for compensating an amplitude imbalance and a phase imbalance of the Tx I and Tx Q channels.

2. The transceiver system of claim 1,
wherein when the transceiver system is in a receiver calibration mode, the transceiver system is configured to cause performing Rx calibration operations until an Rx image rejection ratio is greater than an Rx threshold image rejection ratio, the Rx calibration operations comprising:
providing, by the DAC, a second calibration signal having the IF;
generating, by the transmitter using one of the Tx I channel or the Tx Q channel without using the other one of the Tx I channel or the Tx Q channel, a second Tx output signal, based on the second calibration signal and the Tx LO frequency, wherein the second Tx output signal comprises a second RF main signal and a second RF image signal, wherein the second RF main signal has the RF main frequency, and the second RF image signal has the RF image frequency, and wherein the other one of the Tx I channel or the Tx Q channel is disabled;
receiving, by the Rx antenna, the second Tx output signal;
generating, by the receiver using both the Rx I channel and the Rx Q channel, a second Rx output signal, based on the second Tx output signal, the Rx LO frequency, an Rx amplitude offset and an Rx phase offset, wherein the second Rx output signal comprises a second Rx IF main signal and a second Rx IF image signal;
determining whether the Rx image rejection ratio is greater than the Rx threshold image rejection ratio; and
when the Rx image rejection ratio is not greater than the Rx threshold image rejection ratio, updating the Rx amplitude offset and the Rx phase offset, and performing the Rx calibration operations, and
wherein the Rx image rejection ratio is based on a magnitude difference between the second Rx IF main signal and the second Rx IF image signal,
wherein the Rx amplitude offset and the Rx phase offset are for compensating an amplitude imbalance and a phase imbalance of the Rx I and Rx Q channels, and
wherein in the transmitter calibration mode, the generation of the Rx output signal by the receiver is not based the Rx amplitude offset or the Rx phase offset, and in the receiver calibration mode, the generation of the second Rx output signal by the receiver is at least in part based the Rx amplitude offset and the Rx phase offset.

3. The transceiver system of claim 1, wherein:
the Rx LO frequency is different from the Tx LO frequency;
the Rx IF main signal has a first Rx IF;
the Rx IF image signal has a second Rx IF;
the first Rx IF and the second Rx IF are different from the IF;
the first Rx IF is different from the second Rx IF; and
the IF is a frequency between 1 GHz and 20 GHz.

4. The transceiver system of claim 2, wherein:
the Rx LO frequency is different from the Tx LO frequency;
the Rx threshold image rejection ratio is the same as the Tx threshold image rejection ratio;

the second calibration signal is the same as the calibration signal in magnitude, frequency and phase; and the second Tx output signal, the second RF main signal, the second RF image signal, the second Rx output signal, the second Rx IF main signal and the second Rx IF image signal are different from the Tx output signal, the RF main signal, the RF image signal, the Rx output signal, the Rx IF main signal and the Rx IF image signal, respectively.

5. The transceiver system of claim 1, comprising:
an array of elements,
wherein:
each element of the array comprises a respective transmitter and a respective receiver;
the transmitter is within one element of the array;
the receiver is within another element of the array; and
the another element is different from the one element.

6. The transceiver system of claim 1, wherein:
the Tx I channel comprises a Tx I gain tuner and a Tx I mixer;
the Tx Q channel comprises a Tx Q gain tuner and a Tx Q mixer;
the Rx I channel comprises an Rx I mixer and an Rx I gain tuner;
the Rx Q channel comprises an Rx Q mixer and an Rx Q gain tuner;
the transmitter comprises a Tx amplifier coupled to the Tx I and Tx Q channels;
the transmitter comprises a Tx antenna coupled to the Tx amplifier; and
the receiver comprises an Rx combiner coupled to the Rx I and Rx Q channels and located after the Rx I and Rx Q channels and before the ADC, and
wherein when the transceiver system is in the transmitter calibration mode:
the Tx I gain tuner is configured to amplify its input signal based on a Tx gain value and the Tx amplitude offset to generate a Tx I amplified signal;
the Tx I mixer is configured to up-convert the Tx I amplified signal based on a Tx I LO signal and the Tx phase offset and configured to generate a Tx I output signal comprising a Tx I RF main signal and a Tx I RF image signal;
the Tx Q gain tuner is configured to amplify its input signal based on the Tx gain value and the Tx amplitude offset to generate a Tx Q amplified signal;
the Tx Q mixer is configured to up-convert the Tx Q amplified signal based on a Tx Q LO signal and the Tx phase offset and configured to generate a Tx Q output signal comprising a Tx Q RF main signal and a Tx Q RF image signal;
the input signal of the Tx I gain tuner is derived from the calibration signal;
the input signal of the Tx Q gain tuner is derived from the calibration signal;
a phase difference between the input signal of the Tx I gain tuner and the input signal of the Tx Q gain tuner is 90 degrees;
a phase difference between the Tx I amplified signal and the Tx Q amplified signal is 90 degrees;
a phase difference between the Tx I LO signal and the Tx Q LO signal is 90 degrees;
when the Tx I mixer and the Tx Q mixer output the Tx I output signal and the Tx Q output signal, respectively, the transmitter is configured to combine the Tx I output signal and the Tx Q output signal to produce a combined Tx channel output signal, by adding the Tx I RF main signal and the Tx Q RF main signal, and by subtracting one of the Tx I RF image signal or the Tx Q RF image signal from the other one of the Tx I RF image signal or the Tx Q RF image signal;
the Tx amplifier is configured to amplify the combined Tx channel output signal to produce the Tx output signal;
the Tx antenna is configured to transmit the Tx output signal;
the one of the Rx I channel or the Rx Q channel selected for the generation of the Rx output signal comprises an Rx selected mixer and an Rx selected gain tuner, the Rx selected mixer is one of the Rx I mixer or the Rx Q mixer within the one of the Rx I channel or the Rx Q channel, the Rx selected gain tuner is one of the Rx I gain tuner or the Rx Q gain tuner within the one of the Rx I channel or the Rx Q channel, an Rx selected LO signal for the one of the Rx I channel or the Rx Q channel is one of an Rx I LO signal or an Rx Q LO signal, and each of the Rx selected LO signal, the Rx I LO signal and the Rx Q LO signal has the Rx LO frequency;
the Rx selected mixer is configured to down-convert its input signal based on the Rx selected LO signal and configured to generate an Rx down-converted signal;
the Rx selected gain tuner is configured to amplify the Rx down-converted signal based on an Rx gain value to generate an Rx selected amplified signal;
the Rx combiner is configured to receive a signal derived from the Rx selected amplified signal and configured to provide the Rx output signal to the ADC; and
the input signal of the Rx selected mixer is derived from the Tx output signal.

7. The transceiver system of claim 2, wherein:
the Tx I channel comprises a Tx I gain tuner and a Tx I mixer;
the Tx Q channel comprises a Tx Q gain tuner and a Tx Q mixer;
the Rx I channel comprises an Rx I mixer and an Rx I gain tuner;
the Rx Q channel comprises an Rx Q mixer and an Rx Q gain tuner;
the transmitter comprises a Tx amplifier coupled to the Tx I and Tx Q channels;
the transmitter comprises a Tx antenna coupled to the Tx amplifier; and
the receiver comprises an Rx combiner coupled to the Rx I and Rx Q channels and located after the Rx I and Rx Q channels and before the ADC, and
wherein when the transceiver system is in the receiver calibration mode:
the one of the Tx I channel or the Tx Q channel selected for the generation of the second Tx output signal comprises a Tx selected gain tuner and a Tx selected mixer, the Tx selected gain tuner is one of the Tx I gain tuner or the Tx Q gain tuner within the one of the Tx I channel or the Tx Q channel, and the Tx selected mixer is one of the Tx I mixer or the Tx Q mixer within the one of the Tx I channel or the Tx Q channel;
the Tx selected gain tuner is configured to amplify its input signal based on a Tx gain value to generate a Tx selected amplified signal;
the Tx selected mixer is configured to up-convert the Tx selected amplified signal based on a Tx selected LO signal and configured to generate a Tx selected output signal comprising a Tx selected RF main signal and a Tx selected RF image signal;

the input signal of the Tx selected gain tuner is derived from the calibration signal;

the Tx selected RF main signal has the RF main frequency, and the Tx selected RF image signal has the RF image frequency;

the Tx amplifier is configured to amplify the Tx selected output signal to produce the second Tx output signal;

the Tx antenna is configured to transmit the second Tx output signal;

the Rx I mixer is configured to down-convert its input signal based on the Rx I LO signal and the Rx phase offset and configured to generate an Rx I down-converted signal;

the Rx I gain tuner is configured to amplify the Rx I down-converted signal based on the Rx gain value and the Rx amplitude offset to generate an Rx I amplified signal;

the Rx Q mixer is configured to down-convert its input signal based on the Rx Q LO signal and the Rx phase offset and configured to generate an Rx Q down-converted signal;

the Rx Q gain tuner is configured to amplify the Rx Q down-converted signal based on the Rx gain value and the Rx amplitude offset to generate an Rx Q amplified signal;

the input signal of the Rx I mixer is derived from the second Tx output signal;

the input signal of the Rx Q mixer is derived from the second Tx output signal;

a phase difference between the Rx I LO signal and the Rx Q LO signal is 90 degrees;

the Rx combiner is configured to receive its first input signal from the Rx I channel and its second input signal from the Rx Q channel;

the first input signal of the Rx combiner is derived from the Rx I amplified signal and comprises an Rx I IF main signal and an Rx I IF image signal;

the second input signal of the Rx combiner is derived from the Rx Q amplified signal and comprises an Rx Q IF main signal and an Rx Q IF image signal;

the receiver is configured to provide a phase difference between the first and second input signals of the Rx combiner in a manner to allow the Rx combiner to combine its first and second input signals to produce the second Rx output signal, by adding the Rx I IF main signal and the Rx Q IF main signal, and by subtracting one of the Rx I IF image signal or the Rx Q IF image signal from the other one of the Rx I IF image signal or the Rx Q IF image signal; and the Rx combiner is configured to provide the second Rx output signal to the ADC.

8. The transceiver system of claim 1, wherein:
determining whether the Tx image rejection ratio is greater than the Tx threshold image rejection ratio comprises:
determining a magnitude of the Rx IF main signal and a magnitude of the Rx IF image signal; and
determining whether a difference between the magnitude of the Rx IF main signal and the magnitude of the Rx IF image signal is greater than the Tx threshold image rejection ratio.

9. The transceiver system of claim 2, wherein:
determining whether the Rx image rejection ratio is greater than the Rx threshold image rejection ratio comprises:
determining a magnitude of the second Rx IF main signal and a magnitude of the second Rx IF image signal; and
determining whether a difference between the magnitude of the second Rx IF main signal and the magnitude of the second Rx IF image signal is greater than the Rx threshold image rejection ratio.

10. The transceiver system of claim 2, wherein:
updating the Tx amplitude offset and the Tx phase offset comprises:
determining a next Tx amplitude offset based on the Tx amplitude offset, a first partial derivative of a Tx function with respect to a Tx amplitude offset variable, and a second partial derivative of the Tx function with respect to the Tx amplitude offset variable; and
determining a next Tx phase offset based on the Tx phase offset, a first partial derivative of the Tx function with respect to a Tx phase offset variable, and a second partial derivative of the Tx function with respect to the Tx phase offset variable;
updating the Rx amplitude offset and the Rx phase offset comprises:
determining a next Rx amplitude offset based on the Rx amplitude offset, a first partial derivative of an Rx function with respect to an Rx amplitude offset variable, and a second partial derivative of the Rx function with respect to the Rx amplitude offset variable; and
determining a next Rx phase offset based on the Rx phase offset, a first partial derivative of the Rx function with respect to an Rx phase offset variable, and a second partial derivative of the Rx function with respect to the Rx phase offset variable;
the Tx function is based on an initial Tx amplitude offset, the Tx amplitude offset variable, an initial Tx phase offset and the Tx phase offset variable; and
the Rx function is based on an initial Rx amplitude offset, the Rx amplitude offset variable, an initial Rx phase offset and the Rx phase offset variable.

11. The transceiver system of claim 2,
wherein updating the Tx amplitude offset and the Tx phase offset comprises:

determining $d\alpha\_t$ and $d\theta\_t$;

determining $\theta\_t_{n+1} = \theta\_t_n - \dfrac{f'_{\theta\_t}}{f''_{\theta\_t}}$; and determining $\alpha\_t_{n+1} = \alpha\_t_n - \dfrac{f'_{\alpha\_t}}{f''_{\alpha\_t}}$, wherein: $IRR\_t = \dfrac{(\cos\theta\_t)^2 + \alpha\_t^2(\sin\theta\_t)^2}{\alpha\_t^2(\cos\theta\_t)^2 + (\sin\theta\_t)^2} \approx \dfrac{1}{\alpha\_t^2 + \theta\_t^2}$; and $f(\alpha\_t, \theta\_t) = \dfrac{1}{IRR\_t} \approx (\alpha\_t_0 - \alpha\_t)^2 + (\theta\_t_0 - \theta\_t)^2$, and
wherein:
$\alpha\_t_0$ is an initial Tx amplitude offset;
$\theta\_t_0$ is an initial Tx phase offset;
$\alpha\_t$ is a Tx amplitude offset variable;
$\theta\_t$ is a Tx phase offset variable;
$d\alpha\_t$ is a tuning step of $\alpha\_t$;

dθ_t is a tuning step of θ_t;

IRR_t is the Tx image rejection ratio;

$f_{\theta\_t}'$ is a first partial derivative of f(α_t, θ_t) with respect to θ_t;

$f_{\theta\_t}''$ is a second partial derivative of f(α_t, θ_t) with respect to θ_t;

$f_{\alpha\_t}'$ is a first partial derivative of f(α_t, θ_t) with respect to α_t;

$f_{\alpha\_t}''$ is a second partial derivative of f(α_t, θ_t) with respect to α_t; and n for updating the Tx amplitude offset and the Tx phase offset is a Tx iteration index, and wherein updating the Rx amplitude offset and the Rx phase offset comprises:

determining $d\alpha\_r$ and $d\theta\_r$;

determining $\theta\_r_{n+1} = \theta\_r_n - \dfrac{f_{\theta\_r}'}{f_{\theta\_r}''}$; and determining $\alpha\_r_{n+1} = \alpha\_r_n - \dfrac{f_{\alpha\_r}'}{f_{\alpha\_r}''}$, wherein: $IRR\_r = \dfrac{(\cos\theta\_r)^2 + \alpha\_r^2(\sin\theta\_r)^2}{\alpha\_r^2(\cos\theta\_r)^2 + (\sin\theta\_r)^2} \approx \dfrac{1}{\alpha\_r^2 + \theta\_r^2}$; and $f(\alpha\_r, \theta\_r) = \dfrac{1}{IRR\_r} \approx (\alpha\_r_0 - \alpha\_r)^2 + (\theta\_r_0 - \theta\_r)^2$, and wherein:

α_r₀ is an initial Rx amplitude offset;

θ_r₀ is an initial Rx phase offset;

α_r is an Rx amplitude offset variable;

θ_r is an Rx phase offset variable;

dα_r is a tuning step of α_r;

dθ_r is a tuning step of θ_r;

IRR_r is the Rx image rejection ratio;

$f_{\theta\_r}'$ is a first partial derivative of f(α_r, θ_r) with respect to θ_r;

$f_{\theta\_r}''$ is a second partial derivative of f(α_r, θ_r) with respect to θ_r;

$f_{\alpha\_r}'$ is a first partial derivative of f(α_r, θ_r) with respect to α_r;

$f_{\alpha\_r}''$ is a second partial derivative of f(α_r, θ_r) with respect to α_r; and n for updating the Rx amplitude offset and the Rx phase offset is an Rx iteration index.

12. The transceiver system of claim 1,
wherein when the transceiver system is in a calibration mode, the transceiver system is configured to cause performing a frequency response variation determination process that comprises:
providing, by the DAC, a third calibration signal having the IF;
generating, by the transmitter using one of the Tx I channel or the Tx Q channel, a third Tx output signal, based on the third calibration signal and the Tx LO frequency without using the Tx amplitude offset or the Tx phase offset, wherein the third Tx output signal comprises a third RF main signal and a third RF image signal, wherein the third RF main signal has the RF main frequency, and the third RF image signal has the RF image frequency, and wherein the other one of the Tx I channel or the Tx Q channel is disabled;
receiving, by the Rx antenna, the third Tx output signal;
generating, by the receiver using one of the Rx I channel or the Rx Q channel, a third Rx output signal, based on the third Tx output signal and the Rx LO frequency without using an Rx amplitude offset or an Rx phase offset, wherein the third Rx output signal comprises a third Rx IF main signal and a third Rx IF image signal, and wherein the other one of the Rx I channel or the Rx Q channel is disabled; and
determining an image rejection ratio correction factor, wherein the image rejection ratio correction factor comprises a magnitude difference between the third Rx IF main signal and the third Rx IF image signal, and
wherein the Tx image rejection ratio is adjusted based on the image rejection ratio correction factor.

13. The transceiver system of claim 2,
wherein the Tx I channel comprises a Tx I bandpass filter, a Tx I gain tuner and a Tx I mixer sequentially,
wherein the Tx Q channel comprises a Tx Q bandpass filter, a Tx Q gain tuner and a Tx Q mixer sequentially,
wherein the transmitter comprises:
a splitter located after the DAC and before the Tx I channel and the Tx Q channel;
one or more phase shifters in one or both of the Tx I and Tx Q channels to produce a 90-degree phase difference between an input signal of the Tx I bandpass filter and an input signal of the Tx Q bandpass filter;
a Tx tuning circuit coupled to the Tx I and Tx Q gain tuners and the Tx I and Tx Q mixers;
a Tx amplifier coupled to outputs of the Tx I and Tx Q channels; and
a Tx antenna coupled to the Tx amplifier, the Tx antenna configured to transmit the Tx output signal,
wherein the Rx I channel comprises an Rx I mixer, an Rx I gain tuner and an Rx I bandpass filter sequentially,
wherein the Rx Q channel comprises an Rx Q mixer, an Rx Q gain tuner and an Rx Q bandpass filter sequentially,
wherein the receiver comprises:
an Rx amplifier located after the Rx antenna and located before the Rx I and Rx Q mixers;
an Rx tuning circuit coupled to the Rx I and Rx Q mixers and the Rx I and Rx Q gain tuners;
one or more phase shifters in one or both of the Rx I and Rx Q channels to produce a 90-degree phase difference between an output signal of the Rx I channel and an output signal of the Rx Q channel; and
an Rx combiner coupled to the Rx I channel, Rx Q channel and the ADC, and
wherein the transceiver system comprises one or more controllers configured to cause:
providing a Tx I LO signal for the Tx I channel, a Tx Q LO signal for the Tx Q channel, an Rx I LO signal for the Rx I channel, and an Rx Q LO signal for the Rx Q channel;
disabling the other one of the Tx I channel or the Tx Q channel when the transceiver system is in the receiver calibration mode;
disabling the other one of the Rx I channel or the Rx Q channel when the transceiver system is in the transmitter calibration mode;
determining whether the Tx image rejection ratio is greater than the Tx threshold image rejection ratio;
determining whether the Rx image rejection ratio is greater than the Rx threshold image rejection ratio;
providing the Tx amplitude offset and the Tx phase offset to the Tx tuning circuit; and providing the Rx amplitude offset and the Rx phase offset to the Rx tuning circuit.

14. A transceiver system, comprising:
a transmitter; and
a receiver,
wherein the transmitter comprises:
   a digital-to-analog converter (DAC);
   a transmitter in-phase (Tx I) channel; and
   a transmitter quadrature (Tx Q) channel,
wherein the receiver comprises:
   a receiver in-phase (Rx I) channel;
   a receiver quadrature (Rx Q) channel; and
   an analog-to-digital converter (ADC),
wherein the DAC is for both the Tx I channel and the Tx Q channel,
wherein the ADC is for both the Rx I channel and the Rx Q channel,
wherein the Tx I channel, the Tx Q channel, the Rx I channel, and the Rx Q channel are configured to operate in an analog domain,
wherein when the transceiver system is in a receiver calibration mode, the transceiver system is configured to cause performing Rx calibration operations, the Rx calibration operations comprising:
   providing a calibration signal having an intermediate frequency (IF);
   generating, by the transmitter using one of the Tx I channel or the Tx Q channel, a Tx output signal, based on the calibration signal and a transmitter local oscillator (Tx LO) frequency, wherein the other one of the Tx I channel or the Tx Q channel is disabled;
   receiving, by the receiver, the Tx output signal;
   generating, by the receiver using both the Rx I channel and the Rx Q channel, an Rx output signal, based on the Tx output signal, an Rx LO frequency, an Rx amplitude offset and an Rx phase offset, wherein the Rx output signal comprises an Rx IF main signal and an Rx IF image signal;
   determining whether an Rx image rejection ratio is greater than an Rx threshold image rejection ratio; and
   when the Rx image rejection ratio is not greater than the Rx threshold image rejection ratio, updating the Rx amplitude offset and the Rx phase offset, and performing the Rx calibration operations, and
wherein the Rx image rejection ratio is based on a magnitude difference between the Rx IF main signal and the Rx IF image signal,
wherein the Rx amplitude offset and the Rx phase offset are for compensating an amplitude imbalance and a phase imbalance of the Rx I and Rx Q channels.

15. The transceiver system of claim 14,
wherein when the transceiver system is in a transmitter calibration mode, the transceiver system is configured to cause performing Tx calibration operations, the Tx calibration operations comprising:
   generating, by the transmitter using both the Tx I channel and the Tx Q channel, a Tx output signal, based on a second calibration signal, the Tx LO frequency, a Tx amplitude offset and a Tx phase offset; and
   generating, by the receiver using one of the Rx I channel or the Rx Q channel, a second Rx output signal, based on the Tx output signal and the Rx LO frequency, wherein the second Rx output signal comprises a second Rx IF main signal and a second Rx IF image signal, and wherein the other one of the Rx I channel or the Rx Q channel is disabled;
   when a Tx image rejection ratio is not greater than a Tx threshold image rejection ratio, updating the Tx amplitude offset and the Tx phase offset, and performing the Tx calibration operations,
wherein the Tx image rejection ratio is based on a magnitude difference between the second Rx IF main signal and the second Rx IF image signal, and
wherein the Tx amplitude offset and the Tx phase offset are for compensating an amplitude imbalance and a phase imbalance of the Tx I and Tx Q channels.

16. The transceiver system of claim 15, wherein:
the Rx LO frequency is different from the Tx LO frequency;
each of the Rx IF main signal and the second Rx IF main signal has a first Rx IF;
each of the Rx IF image signal and the second Rx IF image signal has a second Rx IF;
the first Rx IF and the second Rx IF are different from the IF; and
the first Rx IF is different from the second Rx IF.

17. A transceiver system, comprising:
a plurality of elements,
wherein each of the plurality of elements comprises a transmitter and a receiver;
wherein each transmitter of the plurality of elements comprises:
   a digital-to-analog converter (DAC);
   a transmitter in-phase (Tx I) channel; and
   a transmitter quadrature (Tx Q) channel,
wherein each receiver of the plurality of elements comprises:
   a receiver in-phase (Rx I) channel;
   a receiver quadrature (Rx Q) channel; and
   an analog-to-digital converter (ADC),
wherein the DAC is for both the Tx I channel and the Tx Q channel,
wherein the ADC is for both the Rx I channel and the Rx Q channel,
wherein the Tx I channel, the Tx Q channel, the Rx I channel, and the Rx Q channel are configured to operate in an analog domain,
wherein when the transceiver system is in a transmitter calibration mode, the transceiver system is configured to cause:
   determining a Tx amplitude offset and a Tx phase offset for the transmitter of a first one of the plurality of elements, using both the Tx I channel and the Tx Q channel and using one of the Rx I channel or the Rx Q channel, wherein the other one of the Rx I channel or the Rx Q channel is disabled,
wherein the Tx I and the Tx Q channels are within the transmitter of the first one of the plurality of elements,
wherein the Rx I and Rx Q channels are within the receiver of a second one of the plurality of elements,
wherein the second one is different from the first one, and
wherein the Tx amplitude offset and the Tx phase offset are for compensating an imbalance of the Tx I and Tx Q channels of the transmitter of the first one of the plurality of elements.

18. The transceiver system of claim 17,
wherein when the transceiver system is in a receiver calibration mode, the transceiver system is configured to cause:
   determining an Rx amplitude offset and an Rx phase offset for the receiver of the second one of the plurality of elements, using one of the Tx I channel or the Tx Q channel and using both the Rx I channel and the Rx Q channel, wherein the other one of the Tx I channel or the Tx Q channel is disabled, and wherein the Rx amplitude offset and the Rx phase offset are for compensating an imbalance of the Rx I and Rx Q channels of the receiver of the second one of the plurality of elements.

19. The transceiver system of claim 17, wherein:

the transmitter of the first one of the plurality of elements is configured to use a transmitter local oscillator (Tx LO) frequency for up-conversion;

the receiver of the second one of the plurality of elements is configured to use an Rx LO frequency for down-conversion; and the Rx LO frequency is different from the Tx LO frequency.

20. The transceiver system of claim 17, wherein:

at least one of the Tx I and Tx Q channels is disableable; and at least one of the Rx I and Rx Q channels is disableable.

* * * * *